United States Patent
Bruce et al.

(10) Patent No.: US 10,210,084 B1
(45) Date of Patent: Feb. 19, 2019

(54) MULTI-LEVELED CACHE MANAGEMENT IN A HYBRID STORAGE SYSTEM

(71) Applicant: BiTMICRO LLC, Reston, VA (US)

(72) Inventors: Rolando H. Bruce, South San Francisco, CA (US); Elmer Paule Dela Cruz, Pasay (PH); Mark Ian Alcid Arcedera, Metro Manila (PH)

(73) Assignee: BiTMICRO LLC, Reston, VA (US)

( * ) Notice: Subject to any disclaimer, the term of this patent is extended or adjusted under 35 U.S.C. 154(b) by 0 days.

(21) Appl. No.: 15/249,475

(22) Filed: Aug. 29, 2016

Related U.S. Application Data

(63) Continuation of application No. 14/217,436, filed on Mar. 17, 2014, now Pat. No. 9,430,386.
(Continued)

(51) Int. Cl.
*G06F 12/0804* (2016.01)
*G06F 12/0811* (2016.01)
(Continued)

(52) U.S. Cl.
CPC ...... *G06F 12/0804* (2013.01); *G06F 12/0811* (2013.01); *G06F 12/0842* (2013.01);
(Continued)

(58) Field of Classification Search
CPC ............ G06F 12/0804; G06F 12/0811; G06F 12/0842; G06F 12/0844; G06F 12/0868;
(Continued)

(56) References Cited

U.S. PATENT DOCUMENTS

| 4,402,040 A | 8/1983 | Evett |
| 4,403,283 A | 9/1983 | Myntii et al. |

(Continued)

FOREIGN PATENT DOCUMENTS

| JP | 2005142859 A | 6/2005 |
| JP | 2005-309847 | 11/2005 |

(Continued)

OTHER PUBLICATIONS

Office Action for U.S. Appl. No. 14/217,291 dated Jun. 15, 2016.
(Continued)

*Primary Examiner* — Eric T Oberly
(74) *Attorney, Agent, or Firm* — Jackson Walker L.L.P.

(57) ABSTRACT

A hybrid storage system is described having a mixture of different types of storage devices comprising rotational drives, flash devices, SDRAM, and SRAM. The rotational drives are used as the main storage, providing lowest cost per unit of storage memory. Flash memory is used as a higher-level cache for rotational drives. Methods for managing multiple levels of cache for this storage system is provided having a very fast Level 1 cache which consists of volatile memory (SRAM or SDRAM), and a non-volatile Level 2 cache using an array of flash devices. It describes a method of distributing the data across the rotational drives to make caching more efficient. It also describes efficient techniques for flushing data from L1 cache and L2 cache to the rotational drives, taking advantage of concurrent flash devices operations, concurrent rotational drive operations, and maximizing sequential access types in the rotational drives rather than random accesses which are relatively slower. Methods provided here may be extended for systems that have more than two cache levels.

19 Claims, 35 Drawing Sheets

Hybrid Storage Device connected directly to a host and to hard disk drives via IO interfaces

Related U.S. Application Data

(60) Provisional application No. 61/801,422, filed on Mar. 15, 2013.

(51) Int. Cl.
  *G06F 12/0842* (2016.01)
  *G06F 12/0844* (2016.01)
  *G06F 12/0868* (2016.01)

(52) U.S. Cl.
  CPC ...... *G06F 12/0844* (2013.01); *G06F 12/0868* (2013.01); *G06F 2212/1016* (2013.01); *G06F 2212/152* (2013.01); *G06F 2212/222* (2013.01); *G06F 2212/225* (2013.01); *G06F 2212/305* (2013.01)

(58) Field of Classification Search
  CPC ....... G06F 2212/1016; G06F 2212/152; G06F 2212/222; G06F 2212/225; G06F 2212/305
  See application file for complete search history.

(56) References Cited

U.S. PATENT DOCUMENTS

| | | |
|---|---|---|
| 4,752,871 A | 6/1988 | Sparks |
| 4,967,344 A | 10/1990 | Scavezze et al. |
| 5,111,058 A | 5/1992 | Martin |
| RE34,100 E | 10/1992 | Hartness |
| 5,222,046 A | 6/1993 | Kreifels et al. |
| 5,297,148 A | 3/1994 | Harari et al. |
| 5,339,404 A | 8/1994 | Vandling, III |
| 5,341,339 A | 8/1994 | Wells |
| 5,371,709 A | 12/1994 | Fisher et al. |
| 5,379,401 A | 1/1995 | Robinson et al. |
| 5,388,083 A | 2/1995 | Assar et al. |
| 5,396,468 A | 3/1995 | Harari et al. |
| 5,406,529 A | 4/1995 | Asano |
| 5,432,748 A | 7/1995 | Hsu et al. |
| 5,448,577 A | 9/1995 | Wells et al. |
| 5,459,850 A | 10/1995 | Clay et al. |
| 5,479,638 A | 12/1995 | Assar et al. |
| 5,485,595 A | 1/1996 | Assar et al. |
| 5,488,711 A | 1/1996 | Hewitt et al. |
| 5,500,826 A | 3/1996 | Hsu et al. |
| 5,509,134 A | 4/1996 | Fandrich et al. |
| 5,513,138 A | 4/1996 | Manabe et al. |
| 5,524,231 A | 6/1996 | Brown |
| 5,530,828 A | 6/1996 | Kaki et al. |
| 5,535,328 A | 7/1996 | Harari et al. |
| 5,535,356 A | 7/1996 | Kim et al. |
| 5,542,042 A | 7/1996 | Manson |
| 5,542,082 A | 7/1996 | Solhjell |
| 5,548,741 A | 8/1996 | Watanabe |
| 5,559,956 A | 9/1996 | Sukegawa |
| 5,568,423 A | 10/1996 | Jou et al. |
| 5,568,439 A | 10/1996 | Harari |
| 5,572,466 A | 11/1996 | Sukegawa |
| 5,594,883 A | 1/1997 | Pricer |
| 5,602,987 A | 2/1997 | Harari et al. |
| 5,603,001 A | 2/1997 | Sukegawa et al. |
| 5,606,529 A | 2/1997 | Honma et al. |
| 5,606,532 A | 2/1997 | Lambrache et al. |
| 5,619,470 A | 4/1997 | Fukumoto |
| 5,627,783 A | 5/1997 | Miyauchi |
| 5,640,349 A | 6/1997 | Kakinuma et al. |
| 5,644,784 A | 7/1997 | Peek |
| 5,682,509 A | 10/1997 | Kabenjian |
| 5,737,742 A | 4/1998 | Achiwa et al. |
| 5,765,023 A | 6/1998 | Leger et al. |
| 5,787,466 A | 7/1998 | Berliner |
| 5,796,182 A | 8/1998 | Martin |
| 5,799,200 A | 8/1998 | Brant et al. |
| 5,802,554 A | 9/1998 | Caceres et al. |
| 5,818,029 A | 10/1998 | Thomson |
| 5,819,307 A | 10/1998 | Iwamoto et al. |
| 5,822,251 A | 10/1998 | Bruce et al. |
| 5,864,653 A | 1/1999 | Tavallaei et al. |
| 5,870,627 A | 2/1999 | O'Toole et al. |
| 5,875,351 A | 2/1999 | Riley |
| 5,881,264 A | 3/1999 | Kurosawa |
| 5,913,215 A | 6/1999 | Rubinstein et al. |
| 5,918,033 A | 6/1999 | Heeb et al. |
| 5,930,481 A | 7/1999 | Benhase |
| 5,933,849 A | 8/1999 | Srbljic et al. |
| 5,943,421 A | 8/1999 | Grabon |
| 5,956,743 A | 9/1999 | Bruce et al. |
| 5,978,866 A | 11/1999 | Nain |
| 5,987,621 A | 11/1999 | Duso |
| 6,000,006 A | 12/1999 | Bruce et al. |
| 6,014,709 A | 1/2000 | Gulick et al. |
| 6,076,137 A | 6/2000 | Asnaashari |
| 6,098,119 A * | 8/2000 | Surugucchi ........... G06F 3/0626 710/10 |
| 6,128,303 A | 10/2000 | Bergantino |
| 6,138,200 A | 10/2000 | Ogilvie |
| 6,138,247 A | 10/2000 | McKay et al. |
| 6,151,641 A | 11/2000 | Herbert |
| 6,215,875 B1 | 4/2001 | Nohda |
| 6,230,269 B1 | 5/2001 | Spies et al. |
| 6,298,071 B1 | 10/2001 | Taylor et al. |
| 6,341,342 B1 | 1/2002 | Thompson et al. |
| 6,363,441 B1 | 3/2002 | Beniz et al. |
| 6,363,444 B1 | 3/2002 | Platko et al. |
| 6,397,267 B1 | 5/2002 | Chong, Jr. |
| 6,404,772 B1 | 6/2002 | Beach et al. |
| 6,452,602 B1 | 9/2002 | Morein |
| 6,496,939 B2 | 12/2002 | Portman et al. |
| 6,526,506 B1 | 2/2003 | Lewis |
| 6,529,416 B2 | 3/2003 | Bruce et al. |
| 6,557,095 B1 | 4/2003 | Henstrom |
| 6,574,142 B2 | 6/2003 | Gelke |
| 6,601,126 B1 | 7/2003 | Zaidi et al. |
| 6,678,754 B1 | 1/2004 | Soulier |
| 6,728,840 B1 | 4/2004 | Shatil et al. |
| 6,744,635 B2 | 6/2004 | Portman et al. |
| 6,785,746 B1 | 8/2004 | Mahmoud et al. |
| 6,757,845 B2 | 12/2004 | Bruce |
| 6,857,076 B1 | 2/2005 | Klein |
| 6,901,499 B2 | 5/2005 | Aasheim et al. |
| 6,922,391 B1 | 7/2005 | King et al. |
| 6,961,805 B2 | 11/2005 | Lakhani et al. |
| 6,970,446 B2 | 11/2005 | Krischar et al. |
| 6,970,890 B1 | 11/2005 | Bruce et al. |
| 6,973,546 B2 | 12/2005 | Johnson |
| 6,980,795 B1 | 12/2005 | Hermann et al. |
| 7,103,684 B2 | 9/2006 | Chen et al. |
| 7,174,438 B2 | 2/2007 | Homma et al. |
| 7,194,766 B2 | 3/2007 | Noehring et al. |
| 7,263,006 B2 | 8/2007 | Aritome |
| 7,283,629 B2 | 10/2007 | Kaler et al. |
| 7,305,548 B2 | 12/2007 | Pierce et al. |
| 7,330,954 B2 | 2/2008 | Nangle |
| 7,372,962 B2 | 6/2008 | Fujimoto et al. |
| 7,386,662 B1 | 6/2008 | Kekre et al. |
| 7,412,631 B2 | 8/2008 | Uddenberg et al. |
| 7,415,549 B2 | 8/2008 | Vemula et al. |
| 7,424,553 B1 | 9/2008 | Borrelli et al. |
| 7,430,650 B1 | 9/2008 | Ross |
| 7,474,926 B1 | 1/2009 | Carr et al. |
| 7,478,186 B1 | 1/2009 | Onufryk et al. |
| 7,490,177 B2 | 2/2009 | Kao |
| 7,496,699 B2 | 2/2009 | Pope et al. |
| 7,500,063 B2 | 3/2009 | Zohar et al. |
| 7,506,098 B2 | 3/2009 | Arcedera et al. |
| 7,613,876 B2 | 11/2009 | Bruce et al. |
| 7,620,748 B1 | 11/2009 | Bruce et al. |
| 7,620,749 B2 | 11/2009 | Biran et al. |
| 7,624,239 B2 | 11/2009 | Bennett et al. |
| 7,636,801 B1 | 12/2009 | Kekre et al. |
| 7,660,941 B2 | 2/2010 | Lee et al. |
| 7,668,925 B1 | 2/2010 | Liao et al. |
| 7,676,640 B2 | 3/2010 | Chow |
| 7,681,188 B1 | 3/2010 | Tirumalai et al. |

(56) References Cited

U.S. PATENT DOCUMENTS

| | | |
|---|---|---|
| 7,716,389 B1 | 5/2010 | Bruce et al. |
| 7,719,287 B2 | 5/2010 | Marks et al. |
| 7,729,370 B1 | 6/2010 | Orcine et al. |
| 7,743,202 B2 | 6/2010 | Tsai et al. |
| 7,765,359 B2 | 7/2010 | Kang et al. |
| 7,877,639 B2 | 1/2011 | Hoang |
| 7,913,073 B2 | 3/2011 | Choi |
| 7,921,237 B1 | 4/2011 | Holland et al. |
| 7,934,052 B2 | 4/2011 | Prins et al. |
| 7,958,295 B1 | 6/2011 | Liao et al. |
| 7,979,614 B1 | 7/2011 | Yang |
| 7,996,581 B2 | 8/2011 | Bond et al. |
| 8,010,740 B2 | 10/2011 | Arcedera et al. |
| 8,032,700 B2 | 10/2011 | Bruce et al. |
| 8,156,279 B2 | 4/2012 | Tanaka et al. |
| 8,156,320 B2 | 4/2012 | Borras |
| 8,161,223 B2 | 4/2012 | Chamseddine et al. |
| 8,165,301 B1 | 4/2012 | Bruce et al. |
| 8,200,879 B1 | 6/2012 | Falik et al. |
| 8,219,719 B1 | 7/2012 | Parry et al. |
| 8,225,022 B2 | 7/2012 | Caulkins |
| 8,341,300 B1 | 12/2012 | Karamcheti |
| 8,341,311 B1 | 12/2012 | Szewerenko et al. |
| 8,375,257 B2 | 2/2013 | Hong et al. |
| 8,447,908 B2 | 5/2013 | Bruce et al. |
| 8,489,914 B2 | 7/2013 | Cagno |
| 8,510,631 B2 | 8/2013 | Wu et al. |
| 8,560,804 B2 | 10/2013 | Bruce et al. |
| 8,583,868 B2 | 11/2013 | Belluomini et al. |
| 8,677,042 B2 | 3/2014 | Gupta et al. |
| 8,707,134 B2 | 4/2014 | Takahashi et al. |
| 8,713,417 B2 | 4/2014 | Jo |
| 8,762,609 B1 | 6/2014 | Lam et al. |
| 8,788,725 B2 | 7/2014 | Bruce et al. |
| 8,832,371 B2 | 9/2014 | Uehara et al. |
| 8,856,392 B2 | 10/2014 | Myrah et al. |
| 8,959,307 B1 | 2/2015 | Bruce et al. |
| 9,043,669 B1 | 5/2015 | Bruce et al. |
| 9,099,187 B2 | 8/2015 | Bruce et al. |
| 9,135,190 B1 | 9/2015 | Bruce et al. |
| 9,147,500 B2 | 9/2015 | Kim et al. |
| 9,158,661 B2 | 10/2015 | Blaine et al. |
| 9,201,790 B2 | 12/2015 | Keeler |
| 9,400,617 B2 | 7/2016 | Ponce et al. |
| 2001/0010066 A1 | 7/2001 | Chin et al. |
| 2002/0011607 A1 | 1/2002 | Gelke et al. |
| 2002/0013880 A1 | 1/2002 | Gappisch et al. |
| 2002/0044486 A1 | 4/2002 | Chan et al. |
| 2002/0073324 A1 | 6/2002 | Hsu et al. |
| 2002/0083262 A1 | 6/2002 | Fukuzumi |
| 2002/0083264 A1 | 6/2002 | Coulson |
| 2002/0141244 A1 | 10/2002 | Bruce et al. |
| 2003/0023817 A1 | 1/2003 | Rowlands et al. |
| 2003/0065836 A1 | 4/2003 | Pecone |
| 2003/0097248 A1 | 5/2003 | Terashima et al. |
| 2003/0120864 A1 | 6/2003 | Lee et al. |
| 2003/0126451 A1 | 7/2003 | Gorobets |
| 2003/0131201 A1 | 7/2003 | Khare et al. |
| 2003/0161355 A1 | 8/2003 | Falcomato et al. |
| 2003/0163624 A1 | 8/2003 | Matsui et al. |
| 2003/0163647 A1 | 8/2003 | Cameron et al. |
| 2003/0163649 A1 | 8/2003 | Kapur et al. |
| 2003/0182576 A1 | 9/2003 | Morlang et al. |
| 2003/0188100 A1 | 10/2003 | Solomon et al. |
| 2003/0204675 A1 | 10/2003 | Dover et al. |
| 2003/0217202 A1 | 11/2003 | Zilberman et al. |
| 2003/0223585 A1 | 12/2003 | Tardo et al. |
| 2004/0073721 A1 | 4/2004 | Goff et al. |
| 2004/0078632 A1 | 4/2004 | Infante et al. |
| 2004/0128553 A1 | 7/2004 | Buer et al. |
| 2004/0215868 A1 | 10/2004 | Solomon et al. |
| 2005/0050245 A1 | 3/2005 | Miller et al. |
| 2005/0055481 A1 | 3/2005 | Chou et al. |
| 2005/0078016 A1 | 4/2005 | Neff |
| 2005/0097368 A1 | 5/2005 | Peinado et al. |
| 2005/0120146 A1 | 6/2005 | Chen et al. |
| 2005/0210149 A1 | 9/2005 | Kimball |
| 2005/0210159 A1 | 9/2005 | Voorhees et al. |
| 2005/0226407 A1 | 10/2005 | Kasuya et al. |
| 2005/0240707 A1 | 10/2005 | Hayashi et al. |
| 2005/0243610 A1 | 11/2005 | Guha et al. |
| 2005/0289361 A1 | 12/2005 | Sutardja |
| 2006/0004957 A1 | 1/2006 | Hand, III et al. |
| 2006/0026329 A1 | 2/2006 | Yu |
| 2006/0031450 A1 | 2/2006 | Unrau et al. |
| 2006/0039406 A1 | 2/2006 | Day et al. |
| 2006/0064520 A1 | 3/2006 | Anand et al. |
| 2006/0095709 A1 | 5/2006 | Achiwa |
| 2006/0112251 A1 | 5/2006 | Karr et al. |
| 2006/0129876 A1 | 6/2006 | Uemura |
| 2006/0173970 A1 | 8/2006 | Pope et al. |
| 2006/0184723 A1 | 8/2006 | Sinclair et al. |
| 2007/0019573 A1 | 1/2007 | Nishimura |
| 2007/0028040 A1 | 2/2007 | Sinclair |
| 2007/0058478 A1 | 3/2007 | Murayama |
| 2007/0073922 A1 | 3/2007 | Go et al. |
| 2007/0079017 A1 | 4/2007 | Brink et al. |
| 2007/0083680 A1 | 4/2007 | King et al. |
| 2007/0088864 A1 | 4/2007 | Foster |
| 2007/0093124 A1 | 4/2007 | Varney et al. |
| 2007/0094450 A1 | 4/2007 | VanderWiel |
| 2007/0096785 A1 | 5/2007 | Maeda |
| 2007/0121499 A1 | 5/2007 | Pal et al. |
| 2007/0130439 A1 | 6/2007 | Andersson et al. |
| 2007/0159885 A1 | 7/2007 | Gorobets |
| 2007/0168754 A1 | 7/2007 | Zohar et al. |
| 2007/0174493 A1 | 7/2007 | Irish et al. |
| 2007/0174506 A1 | 7/2007 | Tsuruta |
| 2007/0195957 A1 | 8/2007 | Arulambalam et al. |
| 2007/0288686 A1 | 12/2007 | Arcedera et al. |
| 2007/0288692 A1* | 12/2007 | Bruce ............. G06F 3/061 711/113 |
| 2007/0294572 A1 | 12/2007 | Kalwitz et al. |
| 2008/0005481 A1 | 1/2008 | Walker |
| 2008/0052456 A1 | 2/2008 | Ash et al. |
| 2008/0052585 A1 | 2/2008 | LaBerge et al. |
| 2008/0072031 A1 | 3/2008 | Choi |
| 2008/0104264 A1 | 5/2008 | Duerk et al. |
| 2008/0140724 A1 | 6/2008 | Flynn et al. |
| 2008/0147963 A1 | 6/2008 | Tsai et al. |
| 2008/0189466 A1 | 8/2008 | Hemmi |
| 2008/0195800 A1 | 8/2008 | Lee et al. |
| 2008/0218230 A1 | 9/2008 | Shim |
| 2008/0228959 A1 | 9/2008 | Wang |
| 2008/0276037 A1 | 11/2008 | Chang et al. |
| 2008/0301256 A1 | 12/2008 | McWilliams et al. |
| 2009/0028229 A1 | 1/2009 | Cagno et al. |
| 2009/0037565 A1 | 2/2009 | Andresen et al. |
| 2009/0055573 A1 | 2/2009 | Ito |
| 2009/0077306 A1 | 3/2009 | Arcedera et al. |
| 2009/0083022 A1 | 3/2009 | Bin Mohd Nordin et al. |
| 2009/0094411 A1 | 4/2009 | Que |
| 2009/0132620 A1 | 5/2009 | Arakawa |
| 2009/0132752 A1 | 5/2009 | Poo et al. |
| 2009/0150643 A1 | 6/2009 | Jones et al. |
| 2009/0158085 A1 | 6/2009 | Kern et al. |
| 2009/0172250 A1 | 7/2009 | Allen et al. |
| 2009/0172261 A1 | 7/2009 | Prins et al. |
| 2009/0172466 A1 | 7/2009 | Royer et al. |
| 2009/0240873 A1 | 9/2009 | Yu et al. |
| 2010/0058045 A1 | 3/2010 | Borras et al. |
| 2010/0095053 A1 | 4/2010 | Bruce et al. |
| 2010/0125695 A1 | 5/2010 | Wu et al. |
| 2010/0250806 A1 | 9/2010 | Devilla et al. |
| 2010/0268904 A1 | 10/2010 | Sheffield et al. |
| 2010/0299538 A1 | 11/2010 | Miller |
| 2010/0318706 A1 | 12/2010 | Kobayashi |
| 2011/0022778 A1 | 1/2011 | Schibilla et al. |
| 2011/0022783 A1 | 1/2011 | Moshayedi |
| 2011/0022801 A1 | 1/2011 | Flynn |
| 2011/0087833 A1 | 4/2011 | Jones |
| 2011/0093648 A1 | 4/2011 | Belluomini et al. |
| 2011/0113186 A1 | 5/2011 | Bruce et al. |
| 2011/0133826 A1 | 6/2011 | Jones et al. |

(56) References Cited

U.S. PATENT DOCUMENTS

| | | |
|---|---|---|
| 2011/0145479 A1 | 6/2011 | Talagala et al. |
| 2011/0161568 A1 | 6/2011 | Bruce et al. |
| 2011/0167204 A1 | 7/2011 | Estakhri et al. |
| 2011/0173383 A1 | 7/2011 | Gorobets |
| 2011/0197011 A1 | 8/2011 | Suzuki et al. |
| 2011/0202709 A1 | 8/2011 | Rychlik |
| 2011/0208901 A1 | 8/2011 | Kim et al. |
| 2011/0208914 A1 | 8/2011 | Winokur et al. |
| 2011/0219150 A1 | 9/2011 | Piccirillo et al. |
| 2011/0258405 A1 | 10/2011 | Asaki et al. |
| 2011/0264884 A1 | 10/2011 | Kim |
| 2011/0264949 A1 | 10/2011 | Ikeuchi et al. |
| 2011/0270979 A1 | 11/2011 | Schlansker et al. |
| 2012/0005405 A1 | 1/2012 | Wu et al. |
| 2012/0005410 A1 | 1/2012 | Ikeuchi |
| 2012/0017037 A1 | 1/2012 | Riddle et al. |
| 2012/0079352 A1 | 3/2012 | Frost et al. |
| 2012/0102263 A1 | 4/2012 | Aswadhati |
| 2012/0102268 A1 | 4/2012 | Smith et al. |
| 2012/0137050 A1 | 5/2012 | Wang et al. |
| 2012/0159029 A1 | 6/2012 | Krishnan et al. |
| 2012/0161568 A1 | 6/2012 | Umemoto et al. |
| 2012/0173795 A1 | 7/2012 | Schuette et al. |
| 2012/0215973 A1 | 8/2012 | Cagno et al. |
| 2012/0249302 A1 | 10/2012 | Szu |
| 2012/0260102 A1 | 10/2012 | Zaks et al. |
| 2012/0271967 A1 | 10/2012 | Hirschman |
| 2012/0303924 A1 | 11/2012 | Ross |
| 2012/0311197 A1 | 12/2012 | Larson et al. |
| 2012/0324277 A1 | 12/2012 | Weston-Lewis et al. |
| 2013/0010058 A1 | 1/2013 | Pmeroy |
| 2013/0019053 A1 | 1/2013 | Somanache et al. |
| 2013/0073821 A1 | 3/2013 | Flynn et al. |
| 2013/0094312 A1 | 4/2013 | Jang et al. |
| 2013/0099838 A1 | 4/2013 | Kim et al. |
| 2013/0111135 A1* | 5/2013 | Bell, Jr. ............... G06F 12/08 711/122 |
| 2013/0206837 A1 | 8/2013 | Szu |
| 2013/0208546 A1 | 8/2013 | Kim et al. |
| 2013/0212337 A1 | 8/2013 | Maruyama |
| 2013/0212349 A1 | 8/2013 | Maruyama |
| 2013/0212425 A1 | 8/2013 | Blaine et al. |
| 2013/0246694 A1 | 9/2013 | Bruce et al. |
| 2013/0254435 A1 | 9/2013 | Shapiro et al. |
| 2013/0262750 A1 | 10/2013 | Yamasaki et al. |
| 2013/0282933 A1 | 10/2013 | Jokinen et al. |
| 2013/0304775 A1 | 11/2013 | Davis et al. |
| 2013/0339578 A1 | 12/2013 | Ohya et al. |
| 2013/0339582 A1 | 12/2013 | Olbrich et al. |
| 2013/0346672 A1 | 12/2013 | Sengupta et al. |
| 2014/0068177 A1 | 3/2014 | Raghavan |
| 2014/0095803 A1 | 4/2014 | Kim et al. |
| 2014/0104949 A1 | 4/2014 | Bruce et al. |
| 2014/0108869 A1 | 4/2014 | Brewerton et al. |
| 2014/0189203 A1 | 7/2014 | Suzuki et al. |
| 2014/0258788 A1 | 9/2014 | Maruyama |
| 2014/0285211 A1 | 9/2014 | Raffinan |
| 2014/0331034 A1 | 11/2014 | Ponce et al. |
| 2015/0006766 A1 | 1/2015 | Ponce et al. |
| 2015/0012690 A1 | 1/2015 | Bruce et al. |
| 2015/0032937 A1 | 1/2015 | Salessi |
| 2015/0032938 A1 | 1/2015 | Salessi |
| 2015/0067243 A1 | 3/2015 | Salessi et al. |
| 2015/0149697 A1 | 5/2015 | Salessi et al. |
| 2015/0149706 A1 | 5/2015 | Salessi et al. |
| 2015/0153962 A1 | 6/2015 | Salessi et al. |
| 2015/0169021 A1 | 6/2015 | Salessi et al. |
| 2015/0261456 A1 | 9/2015 | Alcantara et al. |
| 2015/0261475 A1 | 9/2015 | Alcantara et al. |
| 2015/0261797 A1 | 9/2015 | Alcantara et al. |
| 2015/0370670 A1 | 12/2015 | Lu |
| 2015/0371684 A1 | 12/2015 | Mataya |
| 2015/0378932 A1 | 12/2015 | Souri et al. |
| 2016/0026402 A1 | 1/2016 | Alcantara et al. |
| 2016/0027521 A1 | 1/2016 | Lu |
| 2016/0041596 A1 | 2/2016 | Alcantara et al. |

FOREIGN PATENT DOCUMENTS

| | | |
|---|---|---|
| TW | 489308 | 6/2002 |
| TW | 200428219 A | 12/2004 |
| TW | 436689 | 12/2005 |
| TW | I420316 | 12/2013 |
| WO | WO 94/06210 | 3/1994 |
| WO | WO 98/38568 | 9/1998 |

OTHER PUBLICATIONS

Notice of allowance/allowability for U.S. Appl. No. 14/217,365 dated Oct. 18, 2016.
Notice of allowance/allowability for U.S. Appl. No. 14/214,216 dated Apr. 27, 2016.
Notice of allowance/allowability for U.S. Appl. No. 14/217,436 dated May 6, 2016.
Notice of Allowance for U.S. Appl. No. 14/215,414 dated Jan. 20, 2017.
Advisory Action for U.S. Appl. No. 14/217,249 dated Jan. 26, 2017.
Notice of Allowance for U.S. Appl. No. 14/687,700 dated Jan. 27, 2016.
Office Action for U.S. Appl. No. 14/690,339 dated Feb. 3, 2017.
Office Action for U.S. Appl. No. 14/616,700 dated Feb. 9, 2017.
Notice of Allowance for U.S. Appl. No. 14/217,365 dated Feb. 10, 2017.
Office Action for U.S. Appl. No. 14/690,305 dated Feb. 10, 2017.
Office Action for U.S. Appl. No. 14/690,349 dated Feb. 8, 2017.
Advisory Action for U.S. Appl. No. 14/689,019 dated Feb. 17, 2017.
Office Action for U.S. Appl. No. 14/690,349 dated Feb. 27, 2017.
Office Action for U.S. Appl. No. 14/855,245 dated Oct. 26, 2016.
Office Action for U.S. Appl. No. 14/217,249 dated Oct. 28, 2016.
Office Action for U.S. Appl. No. 14/217,399 dated Nov. 1, 2016.
Office Action for U.S. Appl. No. 14/217,291 dated Nov. 3, 2016.
Office Action for U.S. Appl. No. 14/217,947 dated Nov. 4, 2016.
Office Action for U.S. Appl. No. 14/216,627 dated Nov. 7, 2016.
Office Action for U.S. Appl. No. 14/689,019 dated Nov. 18, 2016.
Office Action for U.S. Appl. No. 14/684,399 dated Nov. 21, 2016.
Notice of Allowance for U.S. Appl. No. 14/689,045 dated Nov. 21, 2016.
Notice of Allowance for U.S. Appl. No. 14/217,334 dated Nov. 23, 2016.
Office Action dated Sep. 11, 2015 for U.S. Appl. No. 14/217,436.
Office Action dated Sep. 24, 2015 for U.S. Appl. No. 14/217,334.
Office Action dated Sep. 18, 2015 for Taiwanese Patent Application No. 102144165.
Office Action dated Sep. 29, 2015 for U.S. Appl. No. 14/217,316.
Office Action dated Sep. 28, 2015 for U.S. Appl. No. 14/689,045.
National Science Fountation,Award Abstract #1548968, SBIR Phase I: SSD In-Situ Processing, http://www.nsf.gov/awardsearch/showAward?AWD_ID=1548968 printed on Feb. 13, 2016.
Design-Reuse, NxGn Data Emerges from Stealth Mode to provide a paradigm shift in enterprise storage solution. http://www.design-reuse.com/news/35111/nxgn-data-intelligent-solutions.html, printed on Feb. 13, 2016.
Office Action for U.S. Appl. No. 14/215,414 dated May 20, 2016.
Office Action for U.S. Appl. No. 14/616,700 dated May 20, 2016.
Office Action for U.S. Appl. No. 14/689,019 dated May 20, 2016.
Advisory Action for U.S. Appl. No. 14/217,316 dated May 19, 2016.
Notice of allowance/allowability for U.S. Appl. No. 14/803,107 dated Mar. 28, 2016.
Office Action for U.S. Appl. No. 14/217,334 dated Apr. 4, 2016.
Office Action dated Oct. 8, 2015 for U.S. Appl. No. 14/217,291.
Final Office Action dated Nov. 19, 2015 for U.S. Appl. No. 14/217,249.
Final Office Action dated Nov. 18, 2015 for U.S. Appl. No. 14/217,467.
Office Action dated Nov. 25, 2015 for U.S. Appl. No. 14/217,041.

(56) References Cited

OTHER PUBLICATIONS

Robert Cooksey et al., A Stateless, Content-Directed Data Prefetching Mechanism, Copyright 2002 ACM.
Office Action for U.S. Appl. No. 14/866,946 dated Jul. 27 2017.
Office Action for U.S. Appl. No. 14/616,700 dated Jun. 2, 2017.
Office Action for U.S. Appl. No. 15/268,533 dated Jun. 2, 2017.
Office Action for U.S. Appl. No. 15/268,536 dated Apr. 27, 2017.
Office Action for U.S. Appl. No. 15/368,598 dated May 19, 2017.
Office Action for U.S. Appl. No. 12/876,113 dated Mar. 13, 2014.
Advisory Action for U.S. Appl. No. 12/876,113 dated Sep. 6, 2013.
Office Action for U.S. Appl. No. 12/876,113 dated May 14, 2013.
Office Action for U.S. Appl. No. 12/876,113 dated Dec. 21, 2012.
Security Comes to SNMP: The New SNMPv3 Proposed Internet Standard, The Internet Protocol Journal, vol. 1, No. 3, Dec. 1998.
Notice of Allowability for U.S. Appl. No. 12/882,059 dated May 30, 2013.
Notice of Allowability for U.S. Appl. No. 12/882,059 dated Feb. 14, 2013.
Office Action for U.S. Appl. No. 12/882,059 dated May 11, 2012.
Notice of Allowability for U.S. Appl. No. 14/038,684 dated Aug. 1, 2014.
Office Action for U.S. Appl. No. 14/038,684 dated Mar. 17, 2014.
Notice of allowance/allowability for U.S. Appl. No. 13/253,912 dated Mar. 21, 2016.
Notice of allowance/allowability for U.S. Appl. No. 14/217,041 dated Apr. 11, 2016.
Office Action dated Oct. 5, 2015 for Taiwanese Application No. 103105076.
Office Action dated Nov. 19, 2015 for U.S. Appl. No. 14/217,249.
Office Action dated Nov. 18, 2015 for U.S. Appl. No. 14/217,467.
Office Action dated Dec. 4, 2015 for U.S. Appl. No. 14/616,700.
Office Action dated Jun. 4, 2015 for U.S. Appl. No. 14/215,414.
Advisory Action for U.S. Appl. No. 14/217,334 dated Jun. 13, 2016.
Office Action for U.S. Appl. No. 14/616,700 dated Oct. 20, 2016.
Office Action for U.S. Appl. No. 15/665,321 dated Sep. 25, 2017.
USPTO Notice of Allowability & attachment(s) dated Jan. 7, 2013 for U.S. Appl. No. 12/876,247.
Office Action dated Sep. 14, 2012 for U.S. Appl. No. 12/876,247.
Office Action dated Feb. 1, 2012 for U.S. Appl. No. 12/876,247.
Notice of Allowance/Allowability dated Mar. 31, 2015 for U.S. Appl. No. 13/475,878.
Office Action dated May 22, 2015 for U.S. Appl. No. 13/253,912.
Office Action for U.S. Appl. No. 14/217,316 dated Aug. 25, 2016.
Office Action for U.S. Appl. No. 14/690,305 dated Aug. 26, 2016.
Advisory Action for U.S. Appl. No. 14/217,291 dated Sep. 9, 2016.
Advisory Action for U.S. Appl. No. 14/689,045 dated Sep. 16, 2016.
Notice of Allowance for U.S. Appl. No. 14/182,303 dated Sep. 12, 2016.
Advisory Action for U.S. Appl. No. 14/690,114 dated Sep. 12, 2016.
Notice of Allowance for U.S. Appl. No. 14/215,414 dated Sep. 23, 2016.
Advisory Action for U.S. Appl. No. 14/866,946 dated Oct. 13, 2016.
Office Action for U.S. Appl. No. 14/687,700 dated Sep. 26, 2016.
Office Action for U.S. Appl. No. 15/170,768 dated Oct. 6, 2016.
Advisory Action for U.S. Appl. No. 14/690,305 dated Nov. 25, 2016.
Office Action for U.S. Appl. No. 14/216,937 dated Aug. 15, 2016.
Notice of Allowance for U.S. Appl. No. 14/217,096 dated Dec. 5, 2016.
Notice of Allowance for U.S. Appl. No. 14/217,161 dated Dec. 30, 2016.
Office Action for U.S. Appl. No. 14/866,946 dated Jan. 5, 2017.
Office Action for U.S. Appl. No. 14/688,209 dated Jan. 11, 2017.
Amazon Route 53 Developer Guide API Version Apr. 1, 2013, copyright 2017 by Amazon Web Services.
Host Bus Adapters (HBAs): What you need to know about networking workhorse by Alan Earls, Feb. 2003.
Office Action for U.S. Appl. No. 14/690,243 dated Jan. 13, 2017.
Office Action for U.S. Appl. No. 14/232,801 dated Jan. 19, 2017.
Office Action dated Dec. 5, 2014 for U.S. Appl. No. 14/038,684.
Office Action for U.S. Appl. No. 13/253,912 dated Jul. 16, 2014.
Office Action for U.S. Appl. No. 13/475,878 dated Jun. 23, 2014.
Office Action for U.S. Appl. No. 12/876,113 dated Jul. 11, 2014.
Office Action for U.S. Appl. No. 12/876,113 dated Oct. 16, 2014.
Notice of Allowance for U.S. Appl. No. 12/270,626 dated Oct. 3, 2014.
Office Action for U.S. Appl. No. 12/270,626 dated May 23, 2014.
Office Action for U.S. Appl. No. 12/270,626 dated Apr. 4, 2011.
Office Action for U.S. Appl. No. 12/270,626 dated Dec. 18, 2013.
Office Action for U.S. Appl. No. 12/270,626 dated Mar. 15, 2013.
Office Action for U.S. Appl. No. 12/270,626 dated Aug. 23, 2012.
Office Action dated Dec. 15, 2015 for U.S. Appl. No. 13/253,912.
Office Action dated Dec. 17, 2015 for U.S. Appl. No. 14/214,216.
Office Action dated Dec. 17, 2015 for U.S. Appl. No. 14/215,414.
Office Action dated Dec. 17, 2015 for U.S. Appl. No. 14/803,107.
Office Action dated Jan. 15, 2016 for U.S. Appl. No. 14/866,946.
Office Action dated Jan. 11, 2016 for U.S. Appl. No. 14/217,399.
Office Action dated Jan. 15, 2016 for U.S. Appl. No. 14/216,937.
Notice of Allowance and Examiner-Initiated Interview Summary, dated Jan. 29, 2016 for U.S. Appl. No. 14/297,628.
Office Action for U.S. Appl. No. 14/217,365 dated Feb. 18, 2016.
Office Action for U.S. Appl. No. 14/217,365 dated Mar. 2, 2016.
Office Action for U.S. Appl. No. 14/690,305 dated Feb. 25, 2016.
Office Action for U.S. Appl. No. 14/217,436 dated Feb. 25, 2016.
Office Action for U.S. Appl. No. 14/217,316 dated Feb. 26, 2016.
Office Action for U.S. Appl. No. 14/215,414 dated Mar. 1, 2016.
Office Action for U.S. Appl. No. 14/616,700 dated Mar. 8, 2016.
Notice of Allowance/Allowability for U.S. Appl. No. 13/890,229 dated Feb. 20, 2014.
Office Action for U.S. Appl. No. 13/890,229 dated Oct. 8, 2013.
Office Action for U.S. Appl. No. 12/876,113 dated Dec. 5, 2014.
Notice of Allowance/Allowabilty for U.S. Appl. No. 12/876,113 dated Jun. 22, 2015.
Office Action for U.S. Appl. No. 14/217,249 dated Apr. 23, 2015.
Office Action for U.S. Appl. No. 14/217,467 dated Apr. 27, 2015.
Office Action for U.S. Appl. No. 14/616,700 dated Apr. 30, 2015.
Office Action for U.S. Appl. No. 14/217,436 dated Sep. 11, 2015.
Office Action for U.S. Appl. No. 12/270,626 dated Feb. 3, 2012.
Notice of Allowance/Allowability for U.S. Appl. No. 12/270,626 dated Oct. 3, 2014.
Advisory Action for U.S. Appl. No. 12/876,113 dated Oct. 16, 2014.
Office Action for U.S. Appl. No. 14/297,628 dated Jul. 17, 2015.
Office Action for U.S. Appl. No. 13/475,878 dated Dec. 4, 2014.
Office Action for U.S. Appl. No. 14/217,096 dated Jul. 12, 2015.
Notice of Allowance for U.S. Appl. No. 14/217,399 dated Jul. 20, 2016 (Mailed in this current application).
Office Action for U.S. Appl. No. 14/866,946 dated Jul. 29, 2016.
Notice of Allowance for U.S. Appl. No. 14/217,334 dated Jul. 29, 2016.
Office Action for U.S. Appl. No. 14/690,243 dated Aug. 11, 2016.
Office Action for U.S. Appl. No. 14/690,370 dated Aug. 12, 2016.
Working Draft American National Standard Project T10/1601-D Information Technology Serial Attached SCSI-1.1 (SAS-1.1), Mar. 13, 2004 Revision 4.
Office Action for U.S. Appl. No. 14/217,249 dated Apr. 21, 2016.
Notice of allowance/allowability for U.S. Appl. No. 14/217,467 dated Apr. 20, 2016.

* cited by examiner

Hybrid Storage Device connected directly to a host
and to hard disk drives via IO interfaces Hybrid Storage Device that is part of the host and connected directly or indirectly to hard disk drives via IO interfaces Hybrid Storage Device connected directly to a network
and to hard disk drives via IO interfaces Striping in a singe drive,
where:
　　N = total number of stripes Striping across multiple drives - sequential split,
where:
　　N = number of stripes per HDD
　　M = number of HDD Set-Associative L2 Cache Directly-Mapped L2 Cache

| L1 Idx | HDD ID | HDD LBA | L1 Address | L2 Address | L1 Cache State | L2 Cache State | Cache Sub-State |
|---|---|---|---|---|---|---|---|
| 0 | | | Entry for L1 Idx 0 | | | | |
| 1 | | | Entry for L1 Idx 1 | | | | |
| 2 | | | Entry for L1 Idx 2 | | | | |
| 3 | | | • | • | • | | |
| 4 | | | • | • | • | | |
| 5 | | | • | • | • | | |
| 6 | | | | | | | |

FIG. 10

WRITE COMMAND-RELATED DATA FLOWS

| | L1 State | L2 State | Sub-State | EVENT | L1 State | L2 State | Sub-State |
|---|---|---|---|---|---|---|---|
| | | | | DATA TRANSFER FROM HOST TO L1 | | | |
| 15000 | INVLD | INVLD | NOP | start of host to L1 transfer | INVLD | INVLD | H2S |
| 15001 | INVLD | VPCD | NOP | start of host to L1 transfer | INVLD | VPCD | H2S |
| 15002 | INVLD | VFC | NOP | start of host to L1 transfer | INVLD | VFC | H2S |
| 15003 | INVLD | VFCPD | NOP | start of host to L1 transfer | INVLD | VFCPD | H2S |
| 15004 | INVLD | VFD | NOP | start of host to L1 transfer | INVLD | VFD | H2S |
| 15005 | INVLD | VPCC | NOP | start of host to L1 transfer | INVLD | VPCC | H2S |
| 15006 | VPCD | INVLD | NOP | start of host to L1 transfer | VPCD | INVLD | H2S |
| 15007 | VPCD | VPCD | NOP | start of host to L1 transfer | VPCD | VPCD | H2S |
| 15008 | VPCD | VFC | NOP | NA-4 | | | |
| 15009 | VPCD | VFCPD | NOP | start of host to L1 transfer | VPCD | VFCPD | H2S |
| 15010 | VPCD | VFD | NOP | start of host to L1 transfer | VPCD | VFD | H2S |
| 15011 | VPCD | VPCC | NOP | start of host to L1 transfer | VPCD | VPCC | H2S |
| 15012 | VFC | INVLD | NOP | start of host to L1 transfer | VFC | INVLD | H2S |
| 15013 | VFC | VPCD | NOP | NA-1 | | | |
| 15014 | VFC | VFC | NOP | start of host to L1 transfer | VFC | VFC | H2S |
| 15015 | VFC | VFCPD | NOP | NA-1 | | | |
| 15016 | VFC | VFD | NOP | NA-1 | | | |
| 15017 | VFC | VPCC | NOP | start of host to L1 transfer | VFC | VPCC | H2S |
| 15018 | VFCPD | INVLD | NOP | start of host to L1 transfer | VFCPD | INVLD | H2S |
| 15019 | VFCPD | VPCD | NOP | start of host to L1 transfer | VFCPD | VPCD | H2S |
| 15020 | VFCPD | VFC | NOP | NA-4 | VFCPD | VFC | H2S |
| 15021 | VFCPD | VFCPD | NOP | start of host to L1 transfer | VFCPD | VFCPD | H2S |
| 15022 | VFCPD | VFD | NOP | NA-2 | | | |
| 15023 | VFCPD | VPCC | NOP | start of host to L1 transfer | VFCPD | VPCC | H2S |
| 15024 | VFD | INVLD | NOP | start of host to L1 transfer | VFD | INVLD | H2S |
| 15025 | VFD | VPCD | NOP | start of host to L1 transfer | VFD | VPCD | H2S |
| 15026 | VFD | VFC | NOP | NA-4 | | | |
| 15027 | VFD | VFCPD | NOP | NA-3 | | | |
| 15028 | VFD | VFD | NOP | start of host to L1 transfer | VFD | VFD | H2S |
| 15029 | VFD | VPCC | NOP | NA-3 | | | |
| 15030 | VPCC | INVLD | NOP | start of host to L1 transfer | VPCC | INVLD | H2S |
| 15031 | VPCC | VPCD | NOP | start of host to L1 transfer | VPCC | VPCD | H2S |
| 15032 | VPCC | VFC | NOP | start of host to L1 transfer | VPCC | VFC | H2S |
| 15033 | VPCC | VFCPD | NOP | NA-1 | | | |
| 15034 | VPCC | VFD | NOP | NA-1 | | | |
| 15035 | VPCC | VPCC | NOP | start of host to L1 transfer | VPCC | VPCC | H2S |

NA-1 - If L1 is full clean, L2 cannot be dirty. It's either clean also or invalid.
NA-2 - L1 cannot be fully cached and partially dirty if L2 is full dirty. Either L1 is full dirty also or L1 is partially dirty and L2 is invalid
NA-3 - Full dirty L1 invalidates L2
NA-4 - If L1 is dirty, L2 cannot be full clean.
NA-5 - Invalid so there's no data to transfer
NA-6 - Same data
NA-7 - L1 is consistent with L2, no need for sdram2flash
NA-8 - Dirty L1/L2 must be flushed to HDD first (fua) or get data from L2 instead (normal access)

FIG. 15A

| | L1 State | L2 State | Sub-State | EVENT | L1 State | L2 State | Sub-State |
|---|---|---|---|---|---|---|---|
| | | | | HOST COMPLETES WRITING TO L1 | | | |
| 15036 | INVLD | INVLD | H2S | data size equal or greater than cache line | VFD | INVLD | NOP |
| 15037 | | | | data size less than cache line | VPCD | INVLD | NOP |
| 15038 | INVLD | VPCD | H2S | data size equal or greater than cache line | VFD | INVLD | NOP |
| 15039 | | | | data size less than cache line and does not overlap with all dirty data in L2 | VPCD | VPCD | NOP |
| 15040 | | | | data size less than cache line but overlaps with all dirty data in L2 | VPCD | INVLD | NOP |
| 15041 | INVLD | VFC | H2S | data size equal or greater than cache line | VFD | INVLD | NOP |
| 15042 | | | | data size less than cache line | VPCD | VPCC | NOP |
| 15043 | INVLD | VFCPD | H2S | data size equal or greater than cache line | VFD | INVLD | NOP |
| 15044 | | | | data size less than cache line and does not overlap with all dirty data in L2 | VPCD | VPCD | NOP |
| 15045 | | | | data size less than cache line but overlaps with all dirty data in L2 | VPCD | VPCC | NOP |
| 15046 | INVLD | VFD | H2S | data size equal or greater than cache line | VFD | INVLD | NOP |
| 15047 | | | | data size less than cache line | VPCD | VPCD | NOP |
| 15048 | INVLD | VPCC | H2S | data size equal or greater than cache line | VFD | INVLD | NOP |
| 15049 | | | | data size less than cache line and does not overlap with clean data in L2 | VPCD | VPCC | NOP |
| 15050 | | | | data size less than cache line but overlaps with all clean data in L2 | VPCD | INVLD | NOP |
| 15051 | VPCD | INVLD | H2S | data size equal or greater than cache line | VFD | INVLD | NOP |
| 15052 | | | | data size less than cache line, and filled-up all un-filled and clean cache bytes | VFD | INVLD | NOP |
| 15053 | | | | data size less than cache line, and did not fill-up all un-filled cache bytes | VPCD | INVLD | NOP |
| 15054 | | | | data size less than cache line, and filled-up all un-filled cache bytes but did not fill all clean bytes | VFCPD | INVLD | NOP |
| 15055 | VPCD | VPCD | H2S | data size equal or greater than cache line | VFD | INVLD | NOP |
| 15056 | | | | data size less than cache line, and filled-up all un-filled and clean cache bytes in L1, and does not overlap with dirty bytes in L2 | VFD | VPCD | NOP |
| 15057 | | | | data size less than cache line, and filled-up all un-filled and clean cache bytes in L1, and overlaps with all dirty bytes in L2 | VFD | INVLD | NOP |
| 15058 | | | | data size less than cache line, and did not fill-up all un-filled cache bytes in L1, and does not overlap with all dirty bytes in L2 | VPCD | VPCD | NOP |
| 15059 | | | | data size less than cache line, and did not fill-up all un-filled cache bytes in L1, and overlaps with all dirty bytes in L2 | VPCD | INVLD | NOP |
| 15060 | | | | data size less than cache line, and filled-up all un-filled cache bytes but did not fill all clean bytes in L1 | VFCPD | INVLD | NOP |
| 15061 | VPCD | VFC | H2S | NA-4 | | | |

FIG. 15B

| | | | | | | |
|---|---|---|---|---|---|---|
| 15062 | VPCD | VFCPD | H2S | data size equal or greater than cache line | VFD | INVLD | NOP |
| 15063 | | | | data size less than cache line, and filled-up all un-filled cache bytes and all clean bytes | VFD | VPCD | NOP |
| 15064 | | | | data size less than cache line, and filled-up all un-filled and dirty cache bytes but not all clean bytes | VFCPD | VPCC | NOP |
| 15065 | | | | data size less than cache line, and filled-up all un-filled and clean cache bytes but not all dirty bytes | VFD | VPCD | NOP |
| 15066 | | | | data size less than cache line, and did not fill-up all un-filled cache bytes but filled all dirty bytes | VPCD | VPCC | NOP |
| 15067 | | | | data size less than cache line, and did not fill-up all un-filled cache bytes but filled all clean bytes | VPCD | VPCD | NOP |
| 15068 | VPCD | VFD | H2S | data size equal or greater than cache line | VFD | INVLD | NOP |
| 15069 | | | | data size less than cache line, and filled-up all un-filled cache bytes | VFD | VPCD | NOP |
| 15070 | | | | data size less than cache line, and did not fill-up all un-filled cache bytes | VPCD | VPCD | NOP |
| 15071 | VPCD | VPCC | H2S | data size equal or greater than cache line | VFD | INVLD | NOP |
| 15072 | | | | data size less than cache line, and filled-up all un-filled cache bytes and all clean bytes | VFD | INVLD | NOP |
| 15073 | | | | data size less than cache line, and filled-up all un-filled and dirty cache bytes but not all clean bytes | VFCPD | VPCC | NOP |
| 15074 | | | | data size less than cache line, and filled-up all un-filled and clean cache bytes but not all dirty bytes | VFD | INVLD | NOP |
| 15075 | | | | data size less than cache line, and did not fill-up all un-filled cache bytes but filled all dirty bytes | VPCD | VPCC | NOP |
| 15076 | | | | data size less than cache line, and did not fill-up all un-filled cache bytes but filled all clean bytes | VPCD | INVLD | NOP |
| 15077 | VFC | INVLD | H2S | data size equal or greater than cache line | VFD | INVLD | NOP |
| 15078 | | | | data size less than cache line | VFCPD | INVLD | NOP |
| 15079 | VFC | VPCD | H2S | NA-1 | | | |
| 15080 | VFC | VFC | H2S | data size equal or greater than cache line | VFD | INVLD | NOP |
| 15081 | | | | data size less than cache line | VFCPD | VPCC | NOP |
| 15082 | VFC | VFCPD | H2S | NA-1 | | | |
| 15083 | VFC | VFD | H2S | NA-1 | | | |
| 15084 | VFC | VPCC | H2S | data size equal or greater than cache line | VFD | INVLD | NOP |

MATCH LINE TO FIG 15C₂

FIG. 15C₁

MATCH LINE TO FIG 15C₁

| | | | | | | | |
|---|---|---|---|---|---|---|---|
| 15085 | | | | data size less than cache line and overwrites all data in L2 | VFCPD | INVLD | NOP |
| 15086 | | | | data size less than cache line but do not overwrite all data in L2 | VFCPD | VPCC | NOP |
| 15087 | VFCPD | INVLD | H2S | data size equal or greater than cache line | VFD | INVLD | NOP |
| 15088 | | | | data size less than cache line, and filled-up all clean cache bytes | VFD | INVLD | NOP |
| 15089 | | | | data size less than cache line, and did not fill-up all clean cache bytes | VFCPD | INVLD | NOP |
| 15090 | VFCPD | VPCD | H2S | data size equal or greater than cache line | VFD | INVLD | NOP |
| 15091 | | | | data size less than cache line, and filled-up all clean bytes | VFD | VPCD | NOP |
| 15092 | | | | data size less than cache line, and filled-up all dirty cache bytes but not all clean bytes | VFCPD | VPCC | NOP |
| 15093 | | | | data size less than cache line, and filled-up all clean cache bytes but not all dirty bytes | VFD | VPCD | NOP |
| 15094 | VFCPD | VFC | H2S | NA-4 | | | |
| 15095 | VFCPD | VFCPD | H2S | data size equal or greater than cache line | VFD | INVLD | NOP |
| 15096 | | | | data size less than cache line, and filled-up all clean cache bytes | VFD | INVLD | NOP |
| 15097 | | | | data size less than cache line, and did not fill-up all clean cache bytes | VFCPD | VPCC | NOP |
| 15098 | | | | data size less than cache line, and did not fill-up all dirty cache bytes | VFCPD | VPCD | NOP |
| 15099 | VFCPD | VFD | H2S | NA-2 | | | |
| 15100 | VFCPD | VPCC | H2S | data size equal or greater than cache line | VFD | INVLD | NOP |
| 15101 | | | | data size less than cache line, and filled-up all clean cache bytes | VFD | INVLD | NOP |
| 15102 | | | | data size less than cache line, and did not fill-up all clean cache bytes in L1, and do not overlap with all data in L2 | VFCPD | VPCC | NOP |
| 15103 | | | | data size less than cache line, and did not fill-up all clean cache bytes in L1, but overlaps with all data in L2 | VFCPD | INVLD | NOP |

FIG. 15C₂

| | | | | | | |
|---|---|---|---|---|---|---|
| 15104 | VFD | INVLD | H2S | host completes writing to L1 | VFD | INVLD | NOP |
| 15105 | VFD | VPCD | H2S | data overlaps with all data in L2 | VFD | INVLD | NOP |
| 15106 | | | | data do not overlap with all data in L2 | VFD | VPCD | NOP |
| 15107 | VFD | VFC | H2S | NA-4 | | | |
| 15108 | VFD | VFCPD | H2S | NA-3 | | | |
| 15109 | VFD | VFD | H2S | data size equal or greater than cache line | VFD | INVLD | NOP |
| 15110 | | | | data size less than cache line | VFD | VPCD | NOP |
| 15111 | VFD | VPCC | H2S | NA-3 | | | |
| 15112 | VPCC | INVLD | H2S | data size equal or greater than cache line | VFD | INVLD | NOP |
| 15113 | | | | data size less than cache line, and filled-up all un-filled cache bytes | VFCPD | INVLD | NOP |
| 15114 | | | | data size less than cache line, and did not fill-up all un-filled cache bytes | VPCD | INVLD | NOP |
| 15115 | VPCC | VPCD | H2S | data size equal or greater than cache line | VFD | INVLD | NOP |
| 15116 | | | | data size less than cache line, and filled-up all un-filled cache bytes | VFCPD | INVLD | NOP |
| 15117 | | | | data size less than cache line, and did not fill-up all un-filled cache bytes in L1, and does not overlap with all dirty bytes in L2 | VPCD | VPCD | NOP |
| 15118 | | | | data size less than cache line, and did not fill-up all un-filled cache bytes in L1, and does not overlap with all clean bytes in L2 | VPCD | VPCC | NOP |
| 15119 | VPCC | VFC | H2S | data size equal or greater than cache line | VFD | INVLD | NOP |
| 15120 | | | | data size less than cache line, and filled-up all un-filled cache bytes | VFCPD | INVLD | NOP |
| 15121 | | | | data size less than cache line, and did not fill-up all un-filled cache bytes | VPCD | VPCC | NOP |
| 15122 | VPCC | VFCPD | H2S | NA-1 | | | |
| 15123 | VPCC | VFD | H2S | NA-1 | | | |
| 15124 | VPCC | VPCC | H2S | data size equal or greater than cache line | VFD | INVLD | NOP |
| 15125 | | | | data size less than cache line, and filled-up all un-filled cache bytes, and overlaps with all data in L2 | VFCPD | INVLD | NOP |
| 15126 | | | | data size less than cache line, and filled-up all un-filled cache bytes, and does not overlap with all data in L2 | VFCPD | VPCC | NOP |
| 15127 | | | | data size less than cache line, and did not fill-up all un-filled cache bytes, and overlaps with all data in L2 | VPCD | INVLD | NOP |
| 15128 | | | | data size less than cache line, and did not fill-up all un-filled cache bytes, and does not overlap with all data in L2 | VPCD | VPCC | NOP |

FIG. 15D

| | L1 State | L2 State | Sub-State | EVENT | L1 State | L2 State | Sub-State |
|---|---|---|---|---|---|---|---|
| | | | | DATA TRANSFER FROM L1 TO HOST | | | |
| 16000 | INVLD | INVLD | NOP | NA-5 | | | |
| 16001 | INVLD | VPCD | NOP | NA-5 | | | |
| 16002 | INVLD | VFC | NOP | NA-5 | | | |
| 16003 | INVLD | VFCPD | NOP | NA-5 | | | |
| 16004 | INVLD | VFD | NOP | NA-5 | | | |
| 16005 | INVLD | VPCC | NOP | NA-5 | | | |
| 16006 | VPCD | INVLD | NOP | host reads data | VPCD | INVLD | S2H |
| 16007 | VPCD | VPCD | NOP | host reads data | VPCD | VPCD | S2H |
| 16008 | VPCD | VFC | NOP | NA-4 | | | |
| 16009 | VPCD | VFCPD | NOP | host reads data | VPCD | VFCPD | S2H |
| 16010 | VPCD | VFD | NOP | host reads data | VPCD | VFD | S2H |
| 16011 | VPCD | VPCC | NOP | host reads data | VPCD | VPCC | S2H |
| 16012 | VFC | INVLD | NOP | host reads data | VFC | INVLD | S2H |
| 16013 | VFC | VPCD | NOP | NA-1 | | | |
| 16014 | VFC | VFC | NOP | host reads data | VFC | VFC | S2H |
| 16015 | VFC | VFCPD | NOP | NA-1 | | | |
| 16016 | VFC | VFD | NOP | NA-1 | | | |
| 16017 | VFC | VPCC | NOP | host reads data | VFC | VPCC | S2H |
| 16018 | VFCPD | INVLD | NOP | host reads data | VFCPD | INVLD | S2H |
| 16019 | VFCPD | VPCD | NOP | host reads data | VFCPD | VPCD | S2H |
| 16020 | VFCPD | VFC | NOP | NA-4 | | | |
| 16021 | VFCPD | VFCPD | NOP | host reads data | VFCPD | VFCPD | S2H |
| 16022 | VFCPD | VFD | NOP | NA-2 | | | |
| 16023 | VFCPD | VPCC | NOP | host reads data | VFCPD | VPCC | S2H |
| 16024 | VFD | INVLD | NOP | host reads data | VFD | INVLD | S2H |
| 16025 | VFD | VPCD | NOP | host reads data | VFD | VPCD | S2H |
| 16026 | VFD | VFC | NOP | NA-4 | | | |
| 16027 | VFD | VFCPD | NOP | NA-3 | | | |
| 16028 | VFD | VFD | NOP | host reads data | VFD | VFD | S2H |
| 16029 | VFD | VPCC | NOP | NA-3 | | | |
| 16030 | VPCC | INVLD | NOP | host reads data | VPCC | INVLD | S2H |
| 16031 | VPCC | VPCD | NOP | host reads data | VPCC | VPCD | S2H |
| 16032 | VPCC | VFC | NOP | host reads data | VPCC | VFC | S2H |
| 16033 | VPCC | VFCPD | NOP | NA-1 | | | |
| 16034 | VPCC | VFD | NOP | NA-1 | | | |
| 16035 | VPCC | VPCC | NOP | host reads data | VPCC | VPCC | S2H |

NA-1 - If L1 is full clean, L2 cannot be dirty. It's either clean also or invalid.
NA-2 - L1 cannot be fully cached and partially dirty if L2 is full dirty. Either L1 is full dirty also or L1 is partially dirty and L2 is invalid
NA-3 - Full dirty L1 invalidates L2
NA-4 - If L1 is dirty, L2 cannot be full clean.
NA-5 - Invalid so there's no data to transfer
NA-6 - Same data
NA-7 - L1 is consistent with L2, no need for sdram2flash
NA-8 - Dirty L1/L2 must be flushed to HDD first (fua) or get data from L2 instead (normal access)

FIG. 16A

| | L1 State | L2 State | Sub-State | EVENT | L1 State | L2 State | Sub-State |
|---|---|---|---|---|---|---|---|
| | | | | HOST COMPLETES READING FROM L1 | | | |
| 16036 | INVLD | INVLD | S2H | NA-5 | | | |
| 16037 | INVLD | VPCD | S2H | NA-5 | | | |
| 16038 | INVLD | VFC | S2H | NA-5 | | | |
| 16039 | INVLD | VFCPD | S2H | NA-5 | | | |
| 16040 | INVLD | VFD | S2H | NA-5 | | | |
| 16041 | INVLD | VPCC | S2H | NA-5 | | | |
| 16042 | VPCD | INVLD | S2H | host completes reading from L1 | VPCD | INVLD | NOP |
| 16043 | VPCD | VPCD | S2H | host completes reading from L1 | VPCD | VPCD | NOP |
| 16044 | VPCD | VFC | S2H | NA-4 | | | |
| 16045 | VPCD | VFCPD | S2H | host completes reading from L1 | VPCD | VFCPD | NOP |
| 16046 | VPCD | VFD | S2H | host completes reading from L1 | VPCD | VFD | NOP |
| 16047 | VPCD | VPCC | S2H | host completes reading from L1 | VPCD | VPCC | NOP |
| 16048 | VFC | INVLD | S2H | host completes reading from L1 | VFC | INVLD | NOP |
| 16049 | VFC | VPCD | S2H | NA-1 | | | |
| 16050 | VFC | VFC | S2H | host completes reading from L1 | VFC | VFC | NOP |
| 16051 | VFC | VFCPD | S2H | NA-1 | | | |
| 16052 | VFC | VFD | S2H | NA-1 | | | |
| 16053 | VFC | VPCC | S2H | host completes reading from L1 | VFC | VPCC | NOP |
| 16054 | VFCPD | INVLD | S2H | host completes reading from L1 | VFCPD | INVLD | NOP |
| 16055 | VFCPD | VPCD | S2H | host completes reading from L1 | VFCPD | VPCD | NOP |
| 16056 | VFCPD | VFC | S2H | NA-4 | | | |
| 16057 | VFCPD | VFCPD | S2H | host completes reading from L1 | VFCPD | VFCPD | NOP |
| 16058 | VFCPD | VFD | S2H | NA-2 | | | |
| 16059 | VFCPD | VPCC | S2H | host completes reading from L1 | VFCPD | VPCC | NOP |
| 16060 | VFD | INVLD | S2H | host completes reading from L1 | VFD | INVLD | NOP |
| 16061 | VFD | VPCD | S2H | host completes reading from L1 | VFD | VPCD | NOP |
| 16062 | VFD | VFC | S2H | NA-4 | | | |
| 16063 | VFD | VFCPD | S2H | NA-3 | | | |
| 16064 | VFD | VFD | S2H | host completes reading from L1 | VFD | VFD | NOP |
| 16065 | VFD | VPCC | S2H | NA-3 | | | |
| 16066 | VPCC | INVLD | S2H | host completes reading from L1 | VPCC | INVLD | NOP |
| 16067 | VPCC | VPCD | S2H | host completes reading from L1 | VPCC | VPCD | NOP |
| 16068 | VPCC | VFC | S2H | host completes reading from L1 | VPCC | VFC | NOP |
| 16069 | VPCC | VFCPD | S2H | NA-1 | | | |
| 16070 | VPCC | VFD | S2H | NA-1 | | | |
| 16071 | VPCC | VPCC | S2H | host completes reading from L1 | VPCC | VPCC | NOP |

FIG. 16B

| | L1 State | L2 State | Sub-State | EVENT | L1 State | L2 State | Sub-State |
|---|---|---|---|---|---|---|---|
| | | | | DATA TRANSFER FROM L2 TO L1 | | | |
| 17000 | INVLD | INVLD | NOP | NA-5 | | | |
| 17001 | INVLD | VPCD | NOP | start of transfer from L2 to L1 | INVLD | VPCD | F2S |
| 17002 | INVLD | VFC | NOP | start of transfer from L2 to L1 | INVLD | VFC | F2S |
| 17003 | INVLD | VFCPD | NOP | start of transfer from L2 to L1 | INVLD | VFCPD | F2S |
| 17004 | INVLD | VFD | NOP | start of transfer from L2 to L1 | INVLD | VFD | F2S |
| 17005 | INVLD | VPCC | NOP | start of transfer from L2 to L1 | INVLD | VPCC | F2S |
| 17006 | VPCD | INVLD | NOP | NA-5 | | | |
| 17007 | VPCD | VPCD | NOP | start of transfer from L2 to L1 | VPCD | VPCD | F2S |
| 17008 | VPCD | VFC | NOP | NA-4 | | | |
| 17009 | VPCD | VFCPD | NOP | start of transfer from L2 to L1 | VPCD | VFCPD | F2S |
| 17010 | VPCD | VFD | NOP | start of transfer from L2 to L1 | VPCD | VFD | F2S |
| 17011 | VPCD | VPCC | NOP | start of transfer from L2 to L1 | VPCD | VPCC | F2S |
| 17012 | VFC | INVLD | NOP | NA-5 | | | |
| 17013 | VFC | VPCD | NOP | NA-1 | | | |
| 17014 | VFC | VFC | NOP | NA-6 | | | |
| 17015 | VFC | VFCPD | NOP | NA-1 | | | |
| 17016 | VFC | VFD | NOP | NA-1 | | | |
| 17017 | VFC | VPCC | NOP | NA-6 | | | |
| 17018 | VFCPD | INVLD | NOP | NA-5 | | | |
| 17019 | VFCPD | VPCD | NOP | NA-6 | | | |
| 17020 | VFCPD | VFC | NOP | NA-4 | | | |
| 17021 | VFCPD | VFCPD | NOP | NA-6 | | | |
| 17022 | VFCPD | VFD | NOP | NA-2 | | | |
| 17023 | VFCPD | VPCC | NOP | NA-6 | | | |
| 17024 | VFD | INVLD | NOP | NA-5 | | | |
| 17025 | VFD | VPCD | NOP | NA-6 | | | |
| 17026 | VFD | VFC | NOP | NA-4 | | | |
| 17027 | VFD | VFCPD | NOP | NA-3 | | | |
| 17028 | VFD | VFD | NOP | NA-6 | | | |
| 17029 | VFD | VPCC | NOP | NA-3 | | | |
| 17030 | VPCC | INVLD | NOP | NA-5 | | | |
| 17031 | VPCC | VPCD | NOP | start of transfer from L2 to L1 | VPCC | VPCD | F2S |
| 17032 | VPCC | VFC | NOP | start of transfer from L2 to L1 | VPCC | VFC | F2S |
| 17033 | VPCC | VFCPD | NOP | NA-1 | | | |
| 17034 | VPCC | VFD | NOP | NA-1 | | | |
| 17035 | VPCC | VPCC | NOP | start of transfer from L2 to L1 | VPCC | VPCC | F2S |

NA-1 - If L1 is full clean, L2 cannot be dirty. It's either clean also or invalid.
NA-2 - L1 cannot be fully cached and partially dirty if L2 is full dirty. Either L1 is full dirty also or L1 is partially dirty and L2 is invalid
NA-3 - Full dirty L1 invalidates L2
NA-4 - If L1 is dirty, L2 cannot be full clean.
NA-5 - Invalid so there's no data to transfer
NA-6 - Same data
NA-7 - L1 is consistent with L2, no need for sdram2flash
NA-8 - Dirty L1/L2 must be flushed to HDD first (fua) or get data from L2 instead (normal access)

FIG. 17A

| | L1 State | L2 State | Sub-State | EVENT | L1 State | L2 State | Sub-State |
|---|---|---|---|---|---|---|---|
| | | | | COMPLETION OF L2 TO L1 | | | |
| 17036 | INVLD | INVLD | F2S | NA-5 | | | |
| 17037 | INVLD | VPCD | F2S | completion of transfer from L2 to L1 | VPCD | VPCD | NOP |
| 17038 | INVLD | VFC | F2S | data transferred fills entire L1 | VFC | VFC | NOP |
| 17039 | | | | data transferred does not fill entire L1 | VPCC | VFC | NOP |
| 17040 | INVLD | VFCPD | F2S | data transferred fills entire L1 | VFCPD | VFCPD | NOP |
| 17041 | | | | data transferred does not fill entire L1 | VPCD | VFCPD | NOP |
| 17042 | INVLD | VFD | F2S | data transferred fills entire L1 | VFD | VFD | NOP |
| 17043 | | | | data transferred does not fill entire L1 | VPCD | VFD | NOP |
| 17044 | INVLD | VPCC | F2S | completion of transfer from L2 to L1 | VPCC | VPCC | NOP |
| 17045 | VPCD | INVLD | F2S | NA-5 | | | |
| 17046 | VPCD | VPCD | F2S | L1 plus data transferred fills entire L1 | VFCPD | VPCD | NOP |
| 17047 | | | | L1 plus data transferred does not fill entire L1 | VPCD | VPCD | NOP |
| 17048 | VPCD | VFC | F2S | NA-4 | | | |
| 17049 | VPCD | VFCPD | F2S | all uncached bytes in L1 are dirty in L2 | VFD | VFCPD | NOP |
| 17050 | | | | not all uncached bytes in L1 are dirty in L2 | VPCD | VFCPD | NOP |
| 17051 | VPCD | VFD | F2S | L1 plus data transferred fills entire L1 | VFD | VFD | NOP |
| 17052 | | | | L1 plus data transferred does not fill entire L1 | VPCD | VFD | NOP |
| 17053 | VPCD | VPCC | F2S | L1 plus data transferred fills entire L1 | VFCPD | VPCC | NOP |
| 17054 | | | | L1 plus data transferred does not fill entire L1 | VPCD | VPCC | NOP |
| 17055 | VFC | INVLD | F2S | NA-5 | | | |
| 17056 | VFC | VPCD | F2S | NA-1 | | | |
| 17057 | VFC | VFC | F2S | NA-6 | | | |
| 17058 | VFC | VFCPD | F2S | NA-1 | | | |
| 17059 | VFC | VFD | F2S | NA-1 | | | |
| 17060 | VFC | VPCC | F2S | NA- | | | |
| 17061 | VFCPD | INVLD | F2S | NA-5 | | | |
| 17062 | VFCPD | VPCD | F2S | NA-6 | | | |
| 17063 | VFCPD | VFC | F2S | NA-4 | | | |
| 17064 | VFCPD | VFCPD | F2S | NA-6 | | | |
| 17065 | VFCPD | VFD | F2S | NA-2 | | | |
| 17066 | VFCPD | VPCC | F2S | NA- | | | |
| 17067 | VFD | INVLD | F2S | NA-5 | | | |
| 17068 | VFD | VPCD | F2S | NA-6 | | | |
| 17069 | VFD | VFC | F2S | NA-4 | | | |
| 17070 | VFD | VFCPD | F2S | NA-3 | | | |
| 17071 | VFD | VFD | F2S | NA-6 | | | |
| 17072 | VFD | VPCC | F2S | NA-3 | | | |
| 17073 | VPCC | INVLD | F2S | NA-5 | | | |
| 17074 | VPCC | VPCD | F2S | L1 plus data transferred fills entire L1 | VFCPD | VPCD | NOP |
| 17075 | | | | L1 plus data transferred does not fill entire L1 | VPCD | VPCD | |
| 17076 | VPCC | VFC | F2S | L1 plus data transferred fills entire L1 | VFC | VFC | NOP |
| 17077 | | | | L1 plus data transferred does not fill entire L1 | VPCC | VFC | |
| 17078 | VPCC | VFCPD | F2S | NA-1 | | | |
| 17079 | VPCC | VFD | F2S | NA-1 | | | |
| 17080 | VPCC | VPCC | F2S | L1 plus data transferred fills entire L1 | VFC | VPCC | NOP |
| 17081 | | | | L1 plus data transferred does not fill entire L | VPCC | VPCC | NOP |

FIG. 17B

| | L1 State | L2 State | Sub-State | EVENT | L1 State | L2 State | Sub-State |
|---|---|---|---|---|---|---|---|
| | | | | DATA TRANSFER FROM L1 TO L2 | | | |
| 18000 | INVLD | INVLD | NOP | NA-5 | | | |
| 18001 | INVLD | VPCD | NOP | NA-5 | | | |
| 18002 | INVLD | VFC | NOP | NA-5 | | | |
| 18003 | INVLD | VFCPD | NOP | NA-5 | | | |
| 18004 | INVLD | VFD | NOP | NA-5 | | | |
| 18005 | INVLD | VPCC | NOP | NA-5 | | | |
| 18006 | VPCD | INVLD | NOP | start of L1 to L2 | VPCD | INVLD | S2F |
| 18007 | VPCD | VPCD | NOP | start of L1 to L2 | VPCD | VPCD | S2F |
| 18008 | VPCD | VFC | NOP | NA-4 | | | |
| 18009 | VPCD | VFCPD | NOP | NA-7 | | | |
| 18010 | VPCD | VFD | NOP | NA-7 | | | |
| 18011 | VPCD | VPCC | NOP | start of L1 to L2 | VPCD | VPCC | S2F |
| 18012 | VFC | INVLD | NOP | start of L1 to L2 | VFC | INVLD | S2F |
| 18013 | VFC | VPCD | NOP | NA-1 | | | |
| 18014 | VFC | VFC | NOP | NA-7 | | | |
| 18015 | VFC | VFCPD | NOP | NA-1 | | | |
| 18016 | VFC | VFD | NOP | NA-1 | | | |
| 18017 | VFC | VPCC | NOP | NA-7 | | | |
| 18018 | VFCPD | INVLD | NOP | start of L1 to L2 | VFCPD | INVLD | S2F |
| 18019 | VFCPD | VPCD | NOP | start of L1 to L2 | VFCPD | VPCD | S2F |
| 18020 | VFCPD | VFC | NOP | NA-4 | | | |
| 18021 | VFCPD | VFCPD | NOP | NA-7 | | | |
| 18022 | VFCPD | VFD | NOP | NA-4 | | | |
| 18023 | VFCPD | VPCC | NOP | start of L1 to L2 | VFCPD | VPCC | S2F |
| 18024 | VFD | INVLD | NOP | start of L1 to L2 | VFD | INVLD | S2F |
| 18025 | VFD | VPCD | NOP | start of L1 to L2 | VFD | VPCD | S2F |
| 18026 | VFD | VFC | NOP | NA-4 | | | |
| 18027 | VFD | VFCPD | NOP | NA-3 | | | |
| 18028 | VFD | VFD | NOP | NA-7 | | | |
| 18029 | VFD | VPCC | NOP | NA-3 | | | |
| 18030 | VPCC | INVLD | NOP | start of L1 to L2 | VPCC | INVLD | S2F |
| 18031 | VPCC | VPCD | NOP | start of L1 to L2 | VPCC | VPCD | S2F |
| 18032 | VPCC | VFC | NOP | NA-7 | | | |
| 18033 | VPCC | VFCPD | NOP | NA-7 | | | |
| 18034 | VPCC | VFD | NOP | NA-1 | | | |
| 18035 | VPCC | VPCC | NOP | start of L1 to L2 | VPCC | VPCC | S2F |

NA-1 - If L1 is full clean, L2 cannot be dirty. It's either clean also or invalid.
NA-2 - L1 cannot be fully cached and partially dirty if L2 is full dirty. Either L1 is full dirty also or L1 is partially dirty and L2 is invalid
NA-3 - Full dirty L1 invalidates L2
NA-4 - If L1 is dirty, L2 cannot be full clean.
NA-5 - Invalid so there's no data to transfer
NA-6 - Same data
NA-7 - L1 is consistent with L2, no need for sdram2flash
NA-8 - Dirty L1/L2 must be flushed to HDD first (fua) or get data from L2 instead (normal access)

FIG. 18A

|  | L1 State | L2 State | Sub-State | EVENT | L1 State | L2 State | Sub-State |
|---|---|---|---|---|---|---|---|
|  |  |  |  | COMPLETION OF L1 TO L2 |  |  |  |
| 18036 | INVLD | INVLD | S2F | NA-5 |  |  |  |
| 18037 | INVLD | VPCD | S2F | NA-5 |  |  |  |
| 18038 | INVLD | VFC | S2F | NA-5 |  |  |  |
| 18039 | INVLD | VFCPD | S2F | NA-5 |  |  |  |
| 18040 | INVLD | VFD | S2F | NA-5 |  |  |  |
| 18041 | INVLD | VPCC | S2F | NA-5 |  |  |  |
| 18042 | VPCD | INVLD | S2F | completion of transfer from L1 to L2 | VPCD | VPCD | NOP |
| 18043 | VPCD | VPCD | S2F | L not filled fully | VPCD | VPCD | NOP |
| 18044 |  |  |  | L2 filled fully | VPCD | VFD | NOP |
| 18045 | VPCD | VFC | S2F | NA-4 |  |  |  |
| 18046 | VPCD | VFCPD | S2F | NA-7 |  |  |  |
| 18047 | VPCD | VFD | S2F | NA-7 |  |  |  |
| 18048 | VPCD | VPCC | S2F | L2 not filled fully | VPCD | VPCD | NOP |
| 18049 |  |  |  | L filled fully | VPCD | VFCPD | NOP |
| 18050 | VFC | INVLD | S2F | completion of transfer from L1 to L2 | VFC | VFC | NOP |
| 18051 | VFC | VPCD | S2F | NA-1 |  |  |  |
| 18052 | VFC | VFC | S2F | NA-7 |  |  |  |
| 18053 | VFC | VFCPD | S2F | NA-1 |  |  |  |
| 18054 | VFC | VFD | S2F | NA-1 |  |  |  |
| 18055 | VFC | VPCC | S2F | NA-7 |  |  |  |
| 18056 | VFCPD | INVLD | S2F | completion of transfer from L1 to L2 | VFCPD | VFCPD | NOP |
| 18057 | VFCPD | VPCD | S2F | completion of transfer from L to L | VFCPD | VFCPD | NOP |
| 18058 | VFCPD | VFC | S2F | NA-4 |  |  |  |
| 18059 | VFCPD | VFCPD | S2F | NA-7 |  |  |  |
| 18060 | VFCPD | VFD | S2F | NA-4 |  |  |  |
| 18061 | VFCPD | VPCC | S2F | completion of transfer from L to L | VFCPD | VFCPD | NOP |
| 18062 | VFD | INVLD | S2F | completion of transfer from L1 to L2 | VFD | VFD | NOP |
| 18063 | VFD | VPCD | S2F | completion of transfer from L to L | VFD | VFD | NOP |
| 18064 | VFD | VFC | S2F | NA-4 |  |  |  |
| 18065 | VFD | VFCPD | S2F | NA-3 |  |  |  |
| 18066 | VFD | VFD | S2F | NA-7 |  |  |  |
| 18067 | VFD | VPCC | S2F | NA-3 |  |  |  |
| 18068 | VPCC | INVLD | S2F | completion of transfer from L1 to L2 | VPCC | VPCC | NOP |
| 18069 | VPCC | VPCD | S2F | L not filled fully | VPCC | VFCPD | NOP |
| 18070 |  |  |  | L2 filled fully | VPCC | VFCPD | NOP |
| 18071 | VPCC | VFC | S2F | NA-7 |  |  |  |
| 18072 | VPCC | VFCPD | S2F | NA-7 |  |  |  |
| 18073 | VPCC | VFD | S2F | NA-1 |  |  |  |
| 18074 | VPCC | VPCC | S2F | L2 not filled fully | VPCC | VPCC | NOP |
| 18075 |  |  |  | L filled fully | VPCC | VFC | NOP |

FIG. 18B

|  | L1 State | L2 State | Sub-State | EVENT | L1 State | L2 State | Sub-State |
|---|---|---|---|---|---|---|---|
|  |  |  |  | DATA TRANSFER FROM HDD TO L1 |  |  |  |
| 19000 | INVLD | INVLD | NOP | start of HDD to L1 transfer | INVLD | INVLD | HDD2S |
| 19001 | INVLD | VPCD | NOP | start of HDD to L1 transfer | INVLD | VPCD | HDD2S |
| 19002 | INVLD | VFC | NOP | start of HDD to L1 transfer | INVLD | VFC | HDD2S |
| 19003 | INVLD | VFCPD | NOP | start of HDD to L1 transfer | INVLD | VFCPD | HDD2S |
| 19004 | INVLD | VFD | NOP | NA-8 |  |  |  |
| 19005 | INVLD | VPCC | NOP | start of HDD to L1 transfer | INVLD | VPCC | HDD2S |
| 19006 | VPCD | INVLD | NOP | start of HDD to L1 transfer | VPCD | INVLD | HDD2S |
| 19007 | VPCD | VPCD | NOP | start of HDD to L1 transfer | VPCD | VPCD | HDD2S |
| 19008 | VPCD | VFC | NOP | NA-4 |  |  |  |
| 19009 | VPCD | VFCPD | NOP | NA-8 |  |  |  |
| 19010 | VPCD | VFD | NOP | NA-8 |  |  |  |
| 19011 | VPCD | VPCC | NOP | start of HDD to L1 transfer | VPCD | VPCC | HDD2S |
| 19012 | VFC | INVLD | NOP | occurs on Read FUA command | VFC | INVLD | HDD2S |
| 19013 | VFC | VPCD | NOP | NA-1 |  |  |  |
| 19014 | VFC | VFC | NOP | occurs on Read FUA command | VFC | VFC | HDD2S |
| 19015 | VFC | VFCPD | NOP | NA-1 |  |  |  |
| 19016 | VFC | VFD | NOP | NA-1 |  |  |  |
| 19017 | VFC | VPCC | NOP | occurs on Read FUA command | VFC | VPCC | HDD2S |
| 19018 | VFCPD | INVLD | NOP | occurs on Read FUA command | VFCPD | INVLD | HDD2S |
| 19019 | VFCPD | VPCD | NOP | occurs on Read FUA command | VFCPD | VPCD | HDD2S |
| 19020 | VFCPD | VFC | NOP | occurs on Read FUA command | VFCPD | VFC | HDD2S |
| 19021 | VFCPD | VFCPD | NOP | occurs on Read FUA command | VFCPD | VFCPD | HDD2S |
| 19022 | VFCPD | VFD | NOP | NA-2 |  |  |  |
| 19023 | VFCPD | VPCC | NOP | occurs on Read FUA command | VFCPD | VPCC | HDD2S |
| 19024 | VFD | INVLD | NOP | NA-8 |  |  |  |
| 19025 | VFD | VPCD | NOP | NA-8 |  |  |  |
| 19026 | VFD | VFC | NOP | NA-4 |  |  |  |
| 19027 | VFD | VFCPD | NOP | NA-3 |  |  |  |
| 19028 | VFD | VFD | NOP | NA-8 |  |  |  |
| 19029 | VFD | VPCC | NOP | NA-3 |  |  |  |
| 19030 | VPCC | INVLD | NOP | start of HDD to L1 transfer | VPCC | INVLD | HDD2S |
| 19031 | VPCC | VPCD | NOP | start of HDD to L1 transfer | VPCC | VPCD | HDD2S |
| 19032 | VPCC | VFC | NOP | occurs on Read FUA command | VPCC | VFC | HDD2S |
| 19033 | VPCC | VFCPD | NOP | NA-1 |  |  |  |
| 19034 | VPCC | VFD | NOP | NA-1 |  |  |  |
| 19035 | VPCC | VPCC | NOP | start of HDD to L1 transfer | VPCC | VPCC | HDD2S |

NA-1 - If L1 is full clean, L2 cannot be dirty. It's either clean also or invalid.
NA-2 - L1 cannot be fully cached and partially dirty if L2 is full dirty. Either L1 is full dirty also or L1 is partially dirty and L2 is invalid
NA-3 - Full dirty L1 invalidates L2
NA-4 - If L1 is dirty, L2 cannot be full clean.
NA-5 - Invalid so there's no data to transfer
NA-6 - Same data
NA-7 - L1 is consistent with L2, no need for sdram2flash
NA-8 - Dirty L1/L2 must be flushed to HDD first (fua) or get data from L2 instead (normal access)

FIG. 19A

| | L1 State | L2 State | Sub-State | EVENT | L1 State | L2 State | Sub-State |
|---|---|---|---|---|---|---|---|
| | | | | COMPLETION OF HDD TO L1 | | | |
| 19036 | INVLD | INVLD | HDD2S | data did not fill entire cache | VPCC | INVLD | NOP |
| 19037 | | | | data filled entire cache | VFC | INVLD | NOP |
| 19038 | INVLD | VPCD | HDD2S | HDD to L1 completed | VPCC | VPCD | NOP |
| 19039 | INVLD | VFC | HDD2S | data did not fill entire cache | VPCC | VFC | NOP |
| 19040 | | | | data filled entire cache | VFC | VFC | NOP |
| 19041 | INVLD | VFCPD | HDD2S | HDD to L1 completed | VPCC | VFCPD | NOP |
| 19042 | INVLD | VFD | HDD2S | NA-8 | | | |
| 19043 | INVLD | VPCC | HDD2S | data did not fill entire cache | VPCC | VPCC | NOP |
| 19044 | | | | data filled entire cache | VFC | VPCC | NOP |
| 19045 | VPCD | INVLD | HDD2S | data did not fill entire cache | VPCD | INVLD | NOP |
| 19046 | | | | data filled entire cache | VFCPD | INVLD | NOP |
| 19047 | VPCD | VPCD | HDD2S | data did not fill entire cache | VPCD | VPCD | NOP |
| 19048 | | | | data filled entire cache | VFCPD | VPCD | NOP |
| 19049 | VPCD | VFC | HDD2S | NA-4 | | | |
| 19050 | VPCD | VFCPD | HDD2S | NA-8 | | | |
| 19051 | VPCD | VFD | HDD2S | NA-8 | | | |
| 19052 | VPCD | VPCC | HDD2S | data did not fill entire cache | VPCD | VPCC | NOP |
| 19053 | | | | data filled entire cache | VFCPD | VPCC | NOP |
| 19054 | VFC | INVLD | HDD2S | HDD to L1 completed | VFC | INVLD | NOP |
| 19055 | VFC | VPCD | HDD2S | NA-1 | | | |
| 19056 | VFC | VFC | HDD2S | HDD to L1 completed | VFC | VFC | NOP |
| 19057 | VFC | VFCPD | HDD2S | NA-1 | | | |
| 19058 | VFC | VFD | HDD2S | NA-1 | | | |
| 19059 | VFC | VPCC | HDD2S | HDD to L1 completed | VFC | VPCC | NOP |
| 19060 | VFCPD | INVLD | HDD2S | HDD to L1 completed | VFCPD | INVLD | NOP |
| 19061 | VFCPD | VPCD | HDD2S | HDD to L1 completed | VFCPD | VPCD | NOP |
| 19062 | VFCPD | VFC | HDD2S | HDD to L1 completed | VFCPD | VFC | NOP |
| 19063 | VFCPD | VFCPD | HDD2S | HDD to L1 completed | VFCPD | VFCPD | NOP |
| 19064 | VFCPD | VFD | HDD2S | NA-2 | | | |
| 19065 | VFCPD | VPCC | HDD2S | HDD to L1 completed | VFCPD | VPCC | NOP |
| 19066 | VFD | INVLD | HDD2S | NA-8 | | | |
| 19067 | VFD | VPCD | HDD2S | NA-8 | | | |
| 19068 | VFD | VFC | HDD2S | NA-4 | | | |
| 19069 | VFD | VFCPD | HDD2S | NA-3 | | | |
| 19070 | VFD | VFD | HDD2S | NA-8 | | | |
| 19071 | VFD | VPCC | HDD2S | NA-3 | | | |
| 19072 | VPCC | INVLD | HDD2S | data did not fill entire cache | VPCC | INVLD | NOP |
| 19073 | | | | data filled entire cache | VFC | INVLD | NOP |
| 19074 | VPCC | VPCD | HDD2S | HDD to L1 completed | VPCC | VPCD | NOP |
| 19075 | VPCC | VFC | HDD2S | data did not fill entire cache | VPCC | VFC | NOP |
| 19076 | | | | data filled entire cache | VFC | VFC | NOP |
| 19077 | VPCC | VFCPD | HDD2S | NA-1 | | | |
| 19078 | VPCC | VFD | HDD2S | NA-1 | | | |
| 19079 | VPCC | VPCC | HDD2S | data did not fill entire cache | VPCC | VPCC | NOP |
| 19080 | | | | data filled entire cache | VFC | VPCC | NOP |

FIG. 19B

| | L1 State | L2 State | Sub-State | EVENT | L1 State | L2 State | Sub-State |
|---|---|---|---|---|---|---|---|
| | | | | DATA TRANSFER FROM L1 TO HDD | | | |
| 20000 | INVLD | INVLD | NOP | NA-5 | | | |
| 20001 | INVLD | VPCD | NOP | NA-5 | | | |
| 20002 | INVLD | VFC | NOP | NA-5 | | | |
| 20003 | INVLD | VFCPD | NOP | NA-5 | | | |
| 20004 | INVLD | VFD | NOP | NA-5 | | | |
| 20005 | INVLD | VPCC | NOP | NA-5 | | | |
| 20006 | VPCD | INVLD | NOP | start of L1 to HDD - flushing or write fua | VPCD | INVLD | S2HDD |
| 20007 | VPCD | VPCD | NOP | start of L1 to HDD | VPCD | VPCD | S2HDD |
| 20008 | VPCD | VFC | NOP | NA-4 | | | |
| 20009 | VPCD | VFCPD | NOP | start of L1 to HDD - flushing or write fua | VPCD | VFCPD | S2HDD |
| 20010 | VPCD | VFD | NOP | NA-8 | | | |
| 20011 | VPCD | VPCC | NOP | start o L to HDD | VPCD | VPCC | S2HDD |
| 20012 | VFC | INVLD | NOP | start of L1 to HDD - write fua | VFC | INVLD | S2HDD |
| 20013 | VFC | VPCD | NOP | NA-1 | | | |
| 20014 | VFC | VFC | NOP | start of L1 to HDD - write fua | VFC | VFC | S2HDD |
| 20015 | VFC | VFCPD | NOP | NA-1 | | | |
| 20016 | VFC | VFD | NOP | NA-1 | | | |
| 20017 | VFC | VPCC | NOP | start of L1 to HDD - write fua | VFC | VPCC | S2HDD |
| 20018 | VFCPD | INVLD | NOP | start of L1 to HDD | VFCPD | INVLD | S2HDD |
| 20019 | VFCPD | VPCD | NOP | start of L1 to HDD | VFCPD | VPCD | S2HDD |
| 20020 | VFCPD | VFC | NOP | NA-4 | | | |
| 20021 | VFCPD | VFCPD | NOP | start of L1 to HDD | VFCPD | VFCPD | S2HDD |
| 20022 | VFCPD | VFD | NOP | NA-2 | | | |
| 20023 | VFCPD | VPCC | NOP | start of L1 to HDD | VFCPD | VPCC | S2HDD |
| 20024 | VFD | INVLD | NOP | start of L1 to HDD | VFD | INVLD | S2HDD |
| 20025 | VFD | VPCD | NOP | start of L1 to HDD | VFD | VPCD | S2HDD |
| 20026 | VFD | VFC | NOP | NA-4 | | | |
| 20027 | VFD | VFCPD | NOP | NA-3 | | | |
| 20028 | VFD | VFD | NOP | start of L1 to HDD | VFD | VFD | S2HDD |
| 20029 | VFD | VPCC | NOP | NA-3 | | | |
| 20030 | VPCC | INVLD | NOP | start of L1 to HDD - write fua | VPCC | INVLD | S2HDD |
| 20031 | VPCC | VPCD | NOP | start of L1 to HDD - write fua | VPCC | VPCD | S2HDD |
| 20032 | VPCC | VFC | NOP | start of L1 to HDD - write fua | VPCC | VFC | S2HDD |
| 20033 | VPCC | VFCPD | NOP | NA-1 | | | |
| 20034 | VPCC | VFD | NOP | NA-1 | | | |
| 20035 | VPCC | VPCC | NOP | start of L1 to HDD - write fua | VPCC | VPCC | S2HDD |

NA-1 - If L1 is full clean, L2 cannot be dirty. It's either clean also or invalid.
NA-2 - L1 cannot be fully cached and partially dirty if L2 is full dirty. Either L1 is full dirty also or L1 is partially dirty and L2 is invalid
NA-3 - Full dirty L1 invalidates L2
NA-4 - If L1 is dirty, L2 cannot be full clean.
NA-5 - Invalid so there's no data to transfer
NA-6 - Same data
NA-7 - L1 is consistent with L2, no need for sdram2flash
NA-8 - Dirty L1/L2 must be flushed to HDD first (fua) or get data from L2 instead (normal access)

FIG. 20A

|   | L1 State | L2 State | Sub-State | EVENT | L1 State | L2 State | Sub-State |
|---|---|---|---|---|---|---|---|
|   |   |   |   | COMPLETION OF L1 TO HDD |   |   |   |
| 20036 | INVLD | INVLD | S2HDD | NA-5 |   |   |   |
| 20037 | INVLD | VPCD | S2HDD | NA-5 |   |   |   |
| 20038 | INVLD | VFC | S2HDD | NA-5 |   |   |   |
| 20039 | INVLD | VFCPD | S2HDD | NA-5 |   |   |   |
| 20040 | INVLD | VFD | S2HDD | NA-5 |   |   |   |
| 20041 | INVLD | VPCC | S2HDD | NA-5 |   |   |   |
| 20042 | VPCD | INVLD | S2HDD | flushed all dirty bytes | VPCC | INVLD | NOP |
| 20043 |   |   |   | did not flush all dirty bytes | VPCD | INVLD | NOP |
| 20044 | VPCD | VPCD | S2HDD | L1 and L2 has same data and all dirty bytes were flushed | VPCC | VPCC | NOP |
| 20045 |   |   |   | L1 and L2 has same data and not all dirty bytes were flushed | VPCD | VPCD | NOP |
| 20046 |   |   |   | L1 and L2 has different data and all dirty bytes in L1 were flushed | VPCC | VPCD | NOP |
| 20047 |   |   |   | L1 and L2 has different data and not all dirty bytes in L1 were flushed | VPCD | VPCD | NOP |
| 20048 | VPCD | VFC | S2HDD | NA-4 |   |   |   |
| 20049 | VPCD | VFCPD | S2HDD | flushed all dirty bytes in L1 and L2 | VPCC | VFC | NOP |
| 20050 |   |   |   | did not flush all dirty bytes | VPCD | VFCPD | NOP |
| 20051 |   |   |   | flushed all dirty bytes in L1 but not in L2 | VPCC | VFCPD | NOP |
| 20052 | VPCD | VFD | S2HDD | NA-8 |   |   |   |
| 20053 | VPCD | VPCC | S2HDD | flushed all dirty bytes | VPCC | VPCC | NOP |
| 20054 |   |   |   | did not flush all dirty bytes | VPCD | VPCC | NOP |
| 20055 | VFC | INVLD | S2HDD | completion of L1 to HDD - write_fua | VFC | INVLD | NOP |
| 20056 | VFC | VPCD | S2HDD | NA-1 |   |   |   |
| 20057 | VFC | VFC | S2HDD | completion of L1 to HDD - write_fua | VFC | VFC | NOP |
| 20058 | VFC | VFCPD | S2HDD | NA-1 |   |   |   |
| 20059 | VFC | VFD | S2HDD | NA-1 |   |   |   |
| 20060 | VFC | VPCC | S2HDD | completion of L1 to HDD - write_fua | VFC | VPCC | NOP |
| 20061 | VFCPD | INVLD | S2HDD | flushed all dirty bytes | VFC | INVLD | NOP |
| 20062 |   |   |   | did not flush all dirty bytes | VFCPD | INVLD | NOP |
| 20063 | VFCPD | VPCD | S2HDD | flushed all dirty bytes in L1 | VFC | VPCC | NOP |
| 20064 |   |   |   | did not flush all dirty bytes | VFCPD | VPCD | NOP |
| 20065 | VFCPD | VFC | S2HDD | NA-4 |   |   |   |
| 20066 | VFCPD | VFCPD | S2HDD | flushed all dirty bytes | VFC | VFC | NOP |
| 20067 |   |   |   | did not flush all dirty bytes | VFCPD | VFCPD | NOP |
| 20068 | VFCPD | VFD | S2HDD | NA-2 |   |   |   |
| 20069 | VFCPD | VPCC | S2HDD | flushed all dirty bytes | VFC | VPCC | NOP |
| 20070 |   |   |   | did not flush all dirty bytes | VFCPD | VPCC | NOP |
| 20071 | VFD | INVLD | S2HDD | flushed all dirty bytes | VFC | INVLD | NOP |
| 20072 |   |   |   | did not flush all dirty bytes | VFCPD | INVLD | NOP |
| 20073 | VFD | VPCD | S2HDD | flushed all dirty bytes | VFC | VPCC | NOP |
| 20074 |   |   |   | did not flush all dirty bytes but covered L2 contents | VFCPD | VPCC | NOP |
| 20075 |   |   |   | did not flush all dirty bytes and did not cover L2 contents | VFCPD | VPCD | NOP |
| 20076 | VFD | VFC | S2HDD | NA-4 |   |   |   |
| 20077 | VFD | VFCPD | S2HDD | NA-3 |   |   |   |
| 20078 | VFD | VFD | S2HDD | flushed all dirty bytes | VFC | VFC | NOP |
| 20079 |   |   |   | did not flush all dirty bytes | VFCPD | VPCD | NOP |
| 20080 | VFD | VPCC | S2HDD | NA-3 |   |   |   |
| 20081 | VPCC | INVLD | S2HDD | completion of L1 to HDD - write_fua | VPCC | INVLD | NOP |
| 20082 | VPCC | VPCD | S2HDD | completion of L1 to HDD - write_fua | VPCC | VPCD | NOP |
| 20083 | VPCC | VFC | S2HDD | completion of L1 to HDD - write_fua | VPCC | VFC | NOP |
| 20084 | VPCC | VFCPD | S2HDD | NA-1 |   |   |   |
| 20085 | VPCC | VFD | S2HDD | NA-1 |   |   |   |
| 20086 | VPCC | VPCC | S2HDD | completion of L1 to HDD - write_fua | VPCC | VPCC | NOP |

FIG. 20B

Initial condition before power loss. Some L2 and some L1 have dirty cache lines.

Upon external power loss, the backup power will be used to flush dirty L1 data to non-volatile L2.

MULTI-LEVELED CACHE MANAGEMENT IN A HYBRID STORAGE SYSTEM

This application is a continuation application of U.S. application Ser. No. 14/217,436 filed 17 Mar. 2014, which claims the benefit of and priority to U.S. Provisional Application 61/801,422 filed 15 Mar. 2013, each of which is hereby fully incorporated herein by reference.

BACKGROUND

Field

This invention relates to the management of data in a storage system having both volatile and non-volatile caches. It relates more specifically to the methods and algorithms used in managing multiple levels of caches for improving the performance of storage systems that make use of Flash devices as higher-level cache.

Description of Related Art

Typical storage systems comprising multiple storage devices usually assign a dedicated rotational or solid state drive as cache to a larger number of data drives. In such systems, the management of the drive cache is done by the host and the overhead brought about by this contributes to degradation of the caching performance of the storage system. Prior approaches to improving the caching performance focus on the cache replacement policy being used. The most common replacement policy or approach to selecting victim data in a cache is the Least Recently Used (LRU) algorithm. Other solutions consider the frequency of access to the cached data, replacing less frequently used data first. Still other solutions keep track of the number of times the data has been written while in cache so that it is only flushed to the media once it reaches a certain write threshold. Others even separate read cache from write cache offering the possibility for parallel read and write operations.

The use of non-volatile storage as cache has also been described in prior art, declaring that response time for such storage systems approaches that of a solid state storage rather than a mechanical drive. However, prior solutions that made use of non-volatile memory as cache did not take advantage of the architecture of the non-volatile memories that could have further increased the caching performance of the system. The storage system does not make any distinction between a rotational drive and a solid-state drive cache thus failing to recognize possible improvements that can be brought about by the architecture of the solid-state drive. Accordingly, there is a need for a cache management method for hybrid storage system that takes advantage of the characteristic of flash memory and the architecture of the solid-state drive.

SUMMARY

The present invention describes cache management methods for a hybrid storage device having volatile and non-volatile caches. Maximizing concurrent data transfer operations to and from the different cache levels especially to and from flash-based L2 cache results in increased performance over conventional methods. Distributed striping is implemented across the rotational drives maximizing parallel operations on multiple drives. The use of Fastest-To-Fetch and Fastest-To-Flush victim data selection algorithms side-by-side with the LRU algorithm results in further improvements in performance. Flow of data to and from the caches and the storage medium is managed using a cache state-based algorithm allowing the firmware application to choose the necessary state transitions that produces the most efficient data flow.

The present invention is described in several exemplary hybrid storage systems illustrated in FIGS. 1, 2, 3, and 4. The present invention is applicable to additional hybrid storage device architectures, wherein more details can be found in U.S. application Ser. No. 11/450,023, filed Jun. 6, 2008, entitled, "Configurable and Scalable Hybrid Multi-Tiered Caching Storage System using SRAM, SDRAM, Flash and Mechanical Hard Disk Drives", published Dec. 13, 2007 as U.S. Pub. No. 2007/0288692, entitled "Hybrid Multi-Tiered Caching Storage System", and issued Nov. 3, 2009 as U.S. Pat. No. 7,613,876, entitled "Hybrid Multi-Tiered Caching Storage System", each of which is incorporated herein by reference.

The methods through which read and write operations to the flash devices are improved are discussed in U.S. Pat. No. 7,506,098, entitled "Optimized Placement Policy for Solid State Storage Devices," which is incorporated herein by reference. The present invention uses such access optimizations in caching.

BRIEF DESCRIPTION OF DRAWINGS

FIG. 10 shows a cache line information table according to an embodiment of the present invention.

FIGS. 15A, 15B, 15C$_1$, 15C$_2$, 15D show the cache state transition table for Host to L1 data transfer according to an embodiment of the present invention.

FIGS. 16A and 16B show the cache state transition table for L1 to Host data transfer according to an embodiment of the present invention.

FIGS. 17A and 17B show the cache state transition table for L2 to L1 data transfer according to an embodiment of the present invention.

FIGS. 18A and 18B show the cache state transition table for L1 to L2 data transfer according to an embodiment of the present invention.

FIGS. 19A and 19B show the cache state transition table for hard disk drive to L1 data transfer according to an embodiment of the present invention.

FIGS. 20A and 20B shows the cache state transition table for L1 to hard disk drive data transfer according to an embodiment of the present invention.

DETAILED DESCRIPTION

Cache line is an unit of cache memory identified by a unique tag. A cache line consists of a number of host logical blocks identified by host logical block addresses (LBAs). Host LBA is the address of a unit of storage as seen by the host system. The size of a host logical block unit depends on the configuration set by the host. The most common size of a host logical block unit is 512 bytes, in which case the host sees storage in units of 512 bytes. The Cache Line Index is the sequential index of the cache line to which a specific LBA is mapped.

HDD LBA (Hard-Disk Drive LBA) is the address of a unit of storage as seen by the hard disk. In a system with a single drive, there is a one-to-one correspondence between the host LBA and the HDD LBA. In the case of multiple drives, host LBAs are usually distributed across the hard drives to take advantage of concurrent IO operations.

HDD Stripe is the unit of storage by which data are segmented across the hard drives. For example, if 32 block data striping is implemented across 4 hard drives, the first stripe (32 logical blocks) is mapped to the first drive, the second stripe is mapped to the second drive, and so on.

A Flash Section is a logical allocation unit in the flash memory which can be relocated independently. The section size is the minimum amount of allocation which can be relocated.

Directly-mapped, set-associative, and full-associative caching schemes can be used for managing the multiple cache levels. A cache line information table is used to store the multi-level cache states and to track valid locations of data. The firmware implements a set of cache state transition guidelines that dictates the sequences of data movements during host reads, host writes, and background operations.

Figure 1:
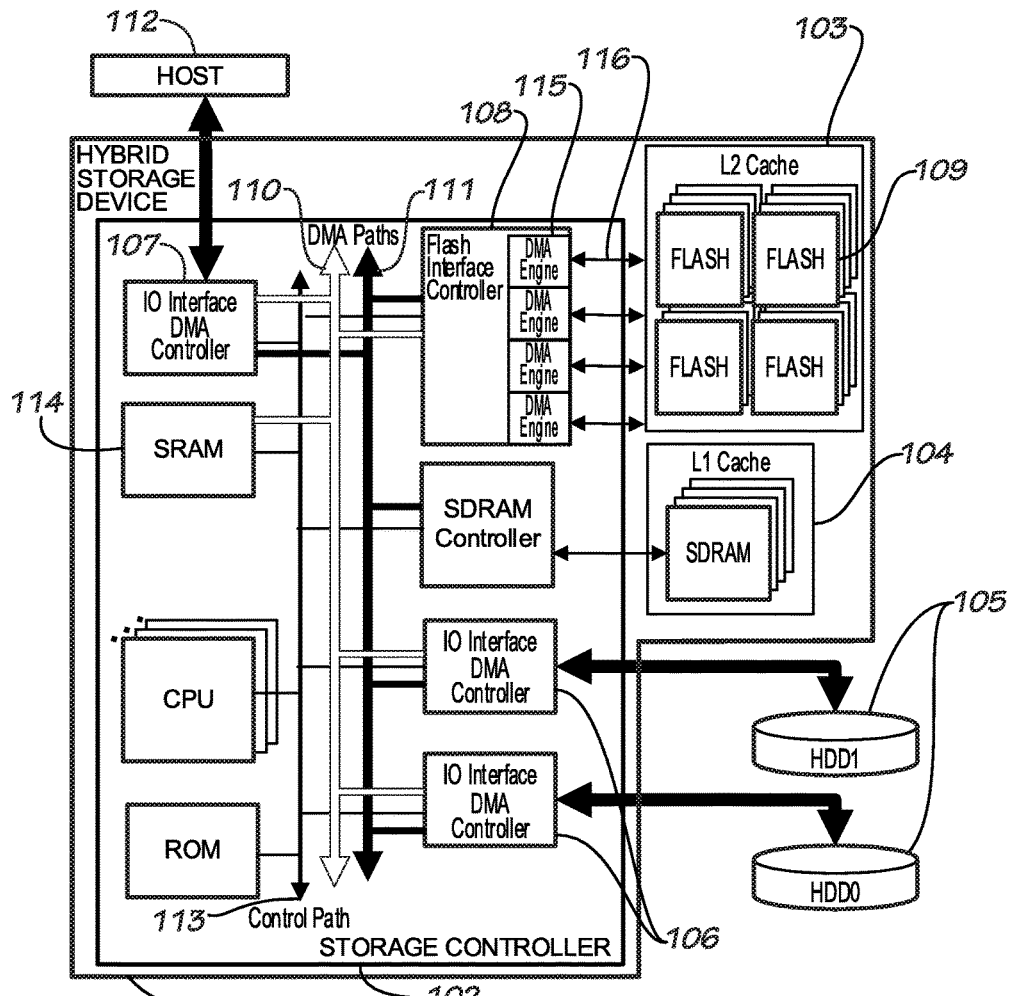
FIG. 1 is a diagram illustrating a hybrid storage device connected directly to the host and to the rotational drives through the storage controller's available TO interfaces according to an embodiment of the present invention.

FIG. 1 illustrates a hybrid storage device 101 connected directly to the host 112 and to the rotational drives 105 through the storage controller's available IO interface DMA controllers 107 and 106 respectively. The rotational drives 105 are connected to one or more IO interface DMA controllers 106 capable of transferring data between the drives 105 and the high-speed L1 cache (SDRAM) 104. Another set of IO interface DMA controllers 107 is connected to the host 112 for transferring data between the host 112 and the L1 cache 104. The Flash interface controller 108 on the other hand, is capable of transferring data between the L1 cache 104 and the L2 cache (flash devices) 103.

Multiple DMA controllers can be activated at the same time both in the storage IO interface and the Flash interface sides. Thus, it is possible to have simultaneous operations on multiple flash devices, and simultaneous operations on multiple rotational drives.

Data is normally cached in L1 104, being the fastest among the available cache levels. The IO interface DMA engine 107 connected between the host 112 and the DMA buses 110 and 111 is responsible for high-speed transfer of data between the host 112 and the L1 cache 104. There can be multiple IO interface ports connected to a single host and there can be multiple IO interface ports connected to different hosts. In the presence of multiple IO interface to host connections, dedicated engines are available in each IO interface ports allowing simultaneous data transfer operations between hosts and the hybrid device. The engines operate directly on the L1 cache memory eliminating the need for temporary buffers and the extra data transfer operations associated with them.

For each level of cache, the firmware keeps track of the number of cache lines available for usage. It defines a maximum threshold of unused cache lines, which when reached causes it to either flush some of the used cache lines to the medium or copy them to a different cache level which has more unused cache lines available. When the system reaches that pre-defined threshold of unused L1 cache, it starts moving data from L1 104 to L2 cache 103. L2 cache is slower than L1 but usually has greater capacity. L2 cache 103 consists of arrays of flash devices 109. Flash interface 108 consists of multiple DMA engines 115 and connected to multiple buses 116 connected to the flash devices. Multiple operations on different or on the same flash devices can be triggered in the flash interface. Each engine operation involves a source and a destination memory. For L1 to L2 data movements, the flash interface engines copy data directly from the memory location of the source L1 cache to the physical flash blocks of the destination flash. For L2 to L1 data movements, the flash interface engines copy data directly from the physical flash blocks of the source flash to the memory location of the destination L1 cache.

Transfers of data from L1 104 to hard disk drives 105 and vice versa are handled by the DMA controllers of the IO interfaces 106 connected to the hard disk drives 105. These DMA controllers operate directly on the L1 cache memories, again eliminating the need for temporary buffers. Data transfers between L2 103 and the hard disk drives 105 always go through L1 104. This requires synchronization between L2 and L1 be built into the caching scheme.

Although FIG. 1 shows a system where the rotational drives 105 are outside the hybrid storage device 101 connected via IO interfaces 106, slightly different architectures can also be used. For example, the rotational drives 105 can be part of the hybrid storage device 101 itself, connected to the storage controller 102 via a disk controller. Another option is to connect the rotational drives 105 to an IO controller connected to the hybrid storage controller 102 through one if its IO interfaces 106. Similarly, the connection to the host is not in any way limited to what is shown in FIG. 1. The hybrid storage device can also attach to the host through an external IO controller. It can also be attached directly to the host's network domain. More details of these various configurations can be found in FIGS. 1, 3, 4, 7, and 9 of U.S. Pat. No. 7,613,876, entitled "Hybrid Multi-Tiered Caching Storage System".

Figure 2:
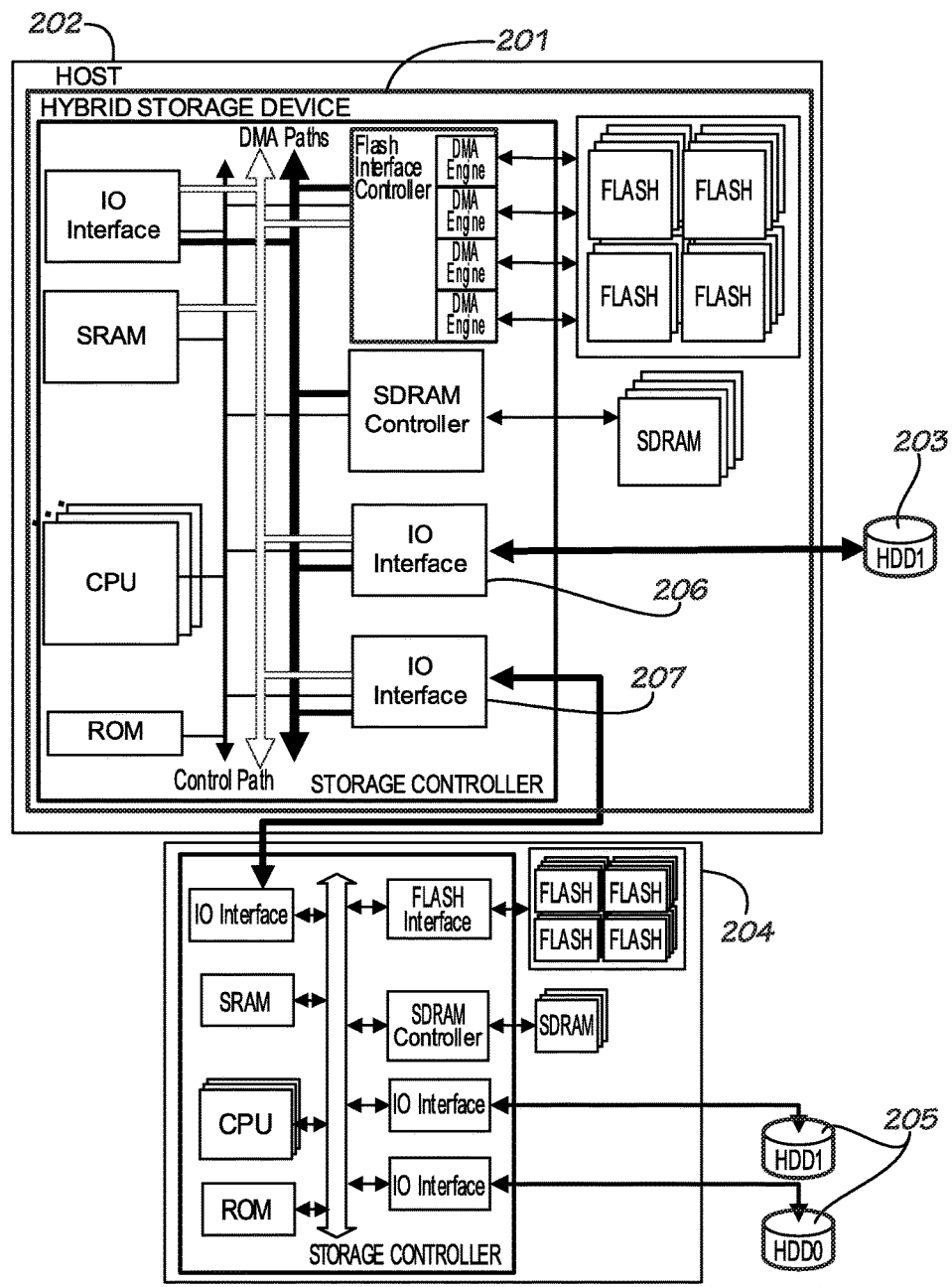
FIG. 2 is a diagram illustrating a hybrid storage device that is part of the host and connected directly or indirectly to hard disk drives through its TO interfaces according to an embodiment of the present invention.

In FIG. 2, the hybrid storage device 201 is part of the host system 202, acting as cache for a group of storage devices 203 and 205. In the example given, one of the IO interfaces 206 is connected directly to a hard disk drive 203. Another IO interface 207 is connected to another hybrid device 204 which is connected directly to another set of hard disk drives 205. Contrary to the example in FIG. 1 where the hybrid storage device is a slave device receiving IO commands from the host and translating them to subcommands delivered to the hard disk drives, and handling the caching in between these processes, FIG. 2 shows a host hybrid device doing caching of data on the host side using its own dedicated L1 and L2 caches. An example of this is a multi-ported HBA (Host Bus Adapter) with integrated L1 and L2 caches. In the HBA's point of view, it is connected to, and thus capable of caching multiple storage devices regardless of whether or not the attached storage devices are also doing caching internally. The hybrid device intercepts IO requests coming from the host application and utilizes its built-in caches as necessary.

Figure 3:
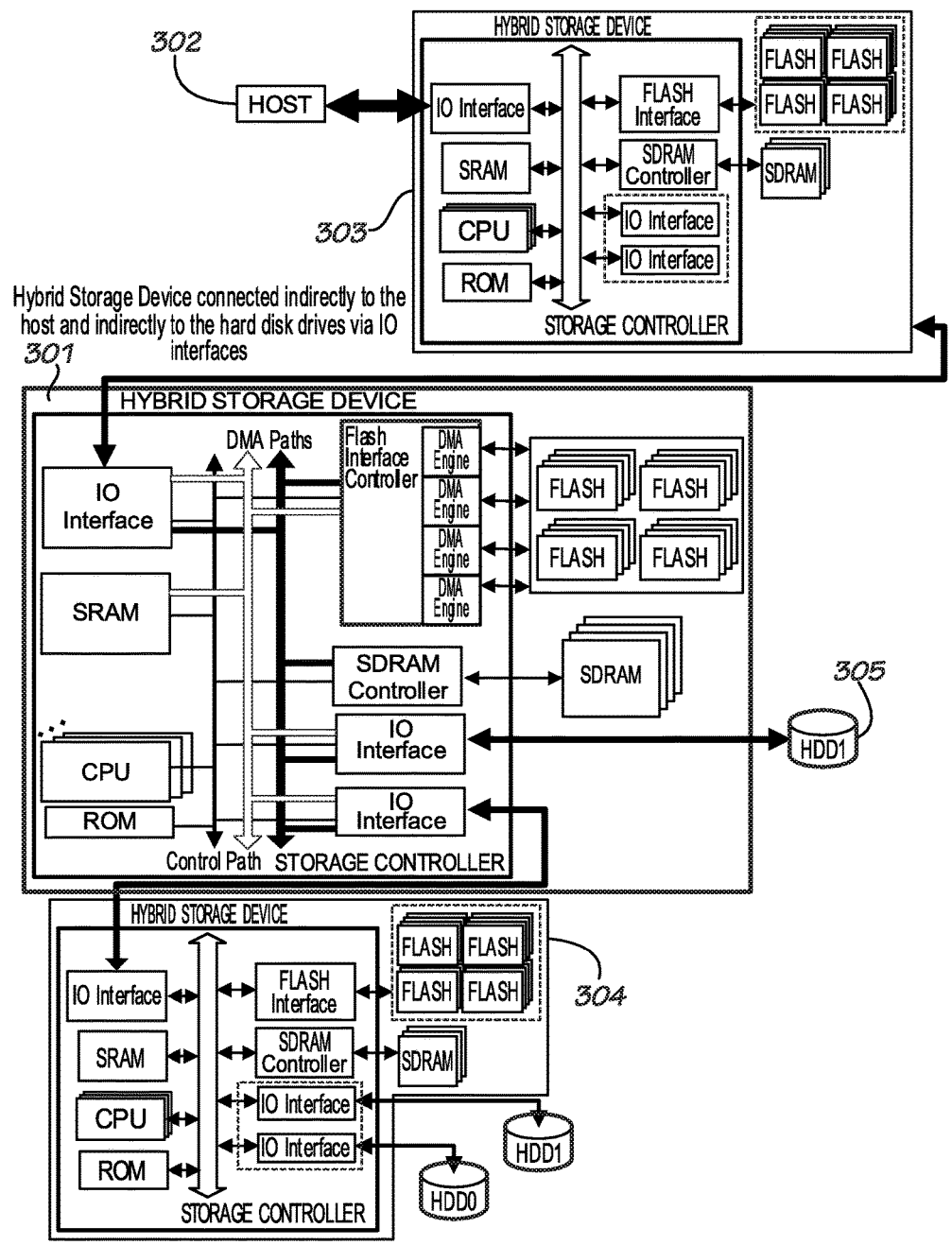
FIG. 3 is a diagram illustrating a hybrid storage device connected indirectly to the host and indirectly to the hard disk drives though its TO interfaces according to an embodiment of the present invention.

FIG. 3 is another variation of the architecture. In this case, a hybrid storage device 301 acts as a caching switch/bridge connected to the host 302 via another hybrid storage device 303, which is shown as a HBA. The hybrid storage device 301 is connected to a hybrid storage device 304 also a plain rotational drive 305. In this example, all three devices 301, 303, and 304 are capable of L1 and L2 caching.

Figure 4:
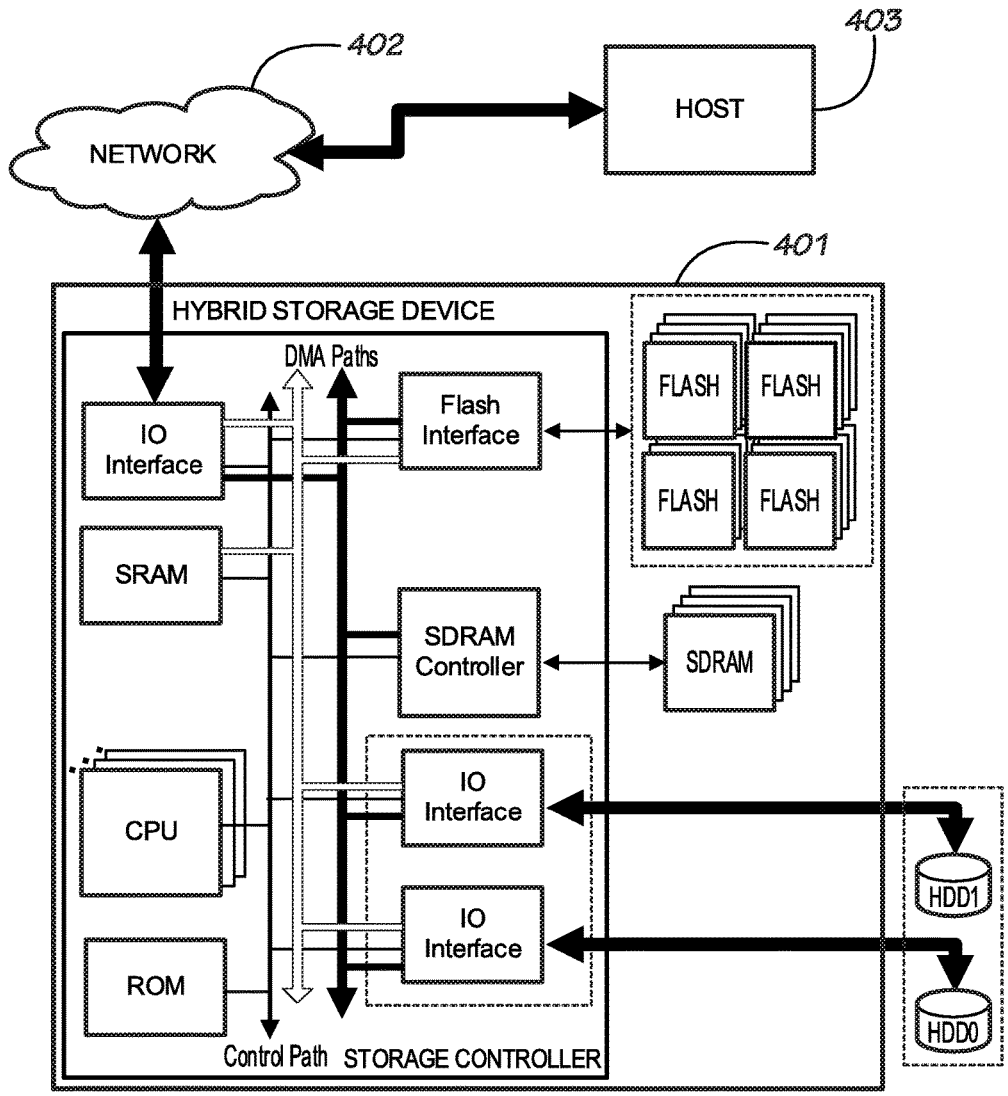
FIG. 4 is a diagram illustrating a hybrid storage device connected indirectly to the host through a network and directly to the hard disk drives through its TO interfaces according to an embodiment of the present invention.

In FIG. 4, the hybrid storage device 401 is directly connected to the network 402 where the host 403 is also connected to. In this mode, the hybrid storage device can be a network-attached storage or a network-attached cache to other more remote storage devices. If it is used as a pure cache, it can implement up to three levels of caches, L1 (SDRAM), L2 (Flash), and L3 (HDD).

In the example architectures illustrated such as FIG. 1, the host can configure the hybrid storage device to handle virtualization locally. The hybrid storage device presents the whole storage system to the host as a single large storage without the host knowing the number and exact geometry of the attached rotational drives.

A firmware application running inside the hybrid storage device is responsible for the multi-level cache management.

Data Striping

Figure 5A:
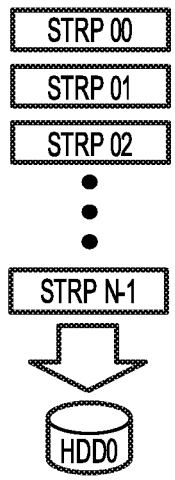
FIG. 5A shows data striping in a single drive storage system according to an embodiment of the present invention.
Figure 5B:
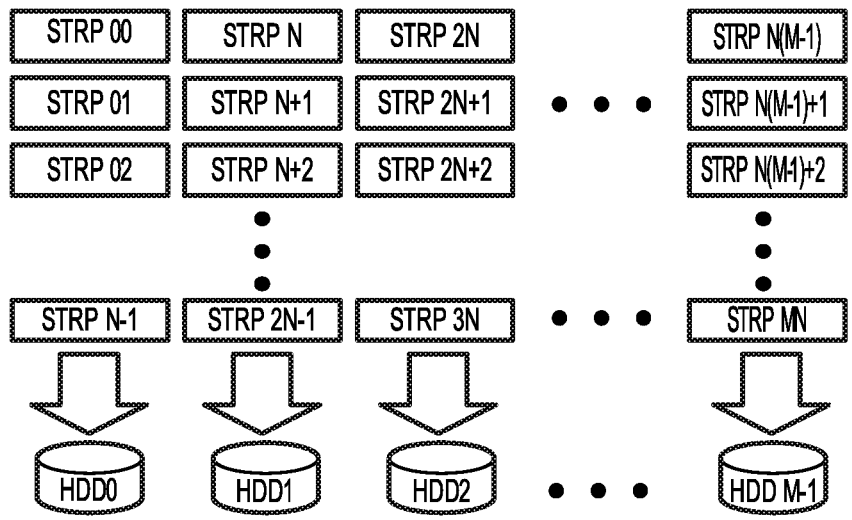
FIG. 5B shows data striping in a multiple drive storage system using sequential split without implementing parity checking according to an embodiment of the present invention.

If virtualization is implemented locally in the hybrid storage device, the device firmware can control the mapping of data across one or more rotational drives. Initially at first boot-up, the firmware will initialize the IO interfaces and detect the number and capacity of attached hard drives. It then selects the appropriate host LBA to HDD LBA mapping that will most likely improve the performance of the system. In its simplest form, the mapping could be a straightforward sequential split of the host LBA among the drives. FIG. 5a shows division of data into stripes in a single rotational drive. FIG. 5b shows sequential division of stripes among multiple rotational drives. In this mapping scheme, given for example, 3 drives with 80 GB capacity each, the first 80 GB seen by the host will be mapped to the first drive, the second 80 GB to the second drive, and the last 80 GB mapped to the third drive.

Figure 5C:
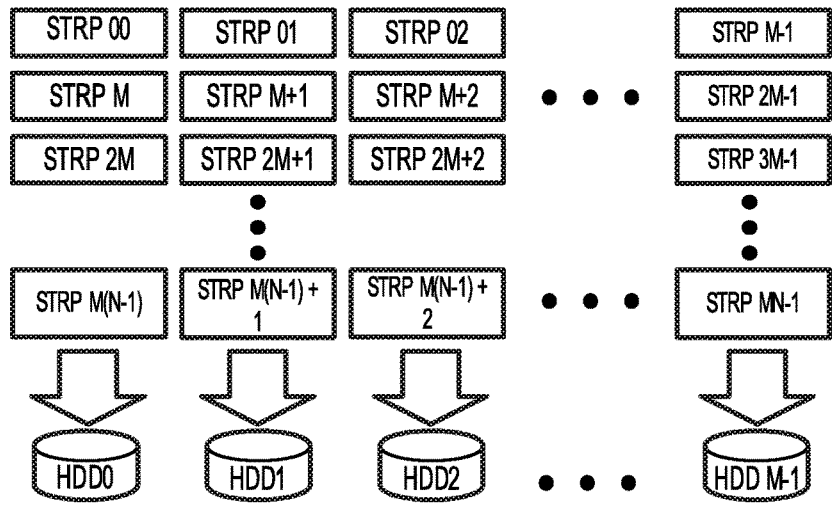
FIG. 5C shows data striping in a multiple drive storage system using distributed stripes without implementing parity checking according to an embodiment of the present invention.
Figure 5D:
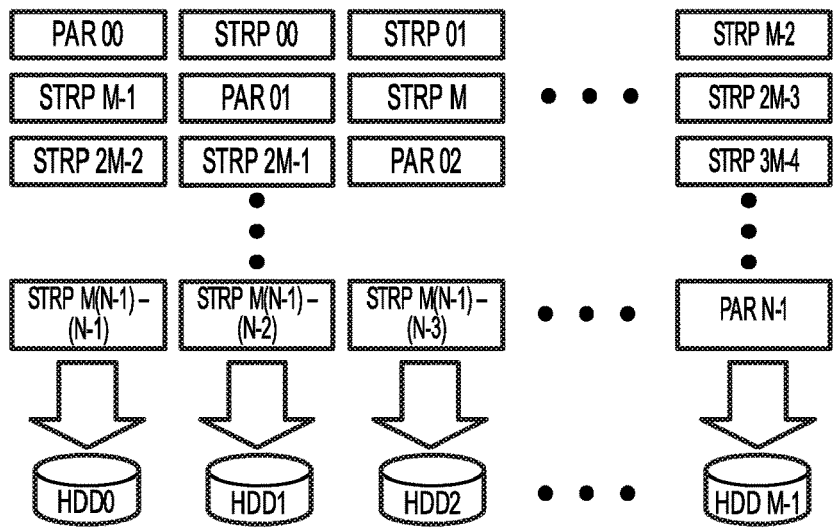
FIG. 5D shows data striping in a multiple drive storage system using distributed stripes and implementing parity checking according to an embodiment of the present invention.

This mapping scheme is simplest but not too efficient. A better mapping would spread the data across the drives to maximize the possibility of concurrent operations. In this type of mapping, the firmware will distribute the stripes across the drives such that sequential stripes are stored in multiple drives. FIG. 5c, shows distributed stripes across multiple hard drives. In a system with 3 or more hard drives, distributed parity can be added for a RAID5-like implementation as shown in FIG. 5d.

Figure 6:
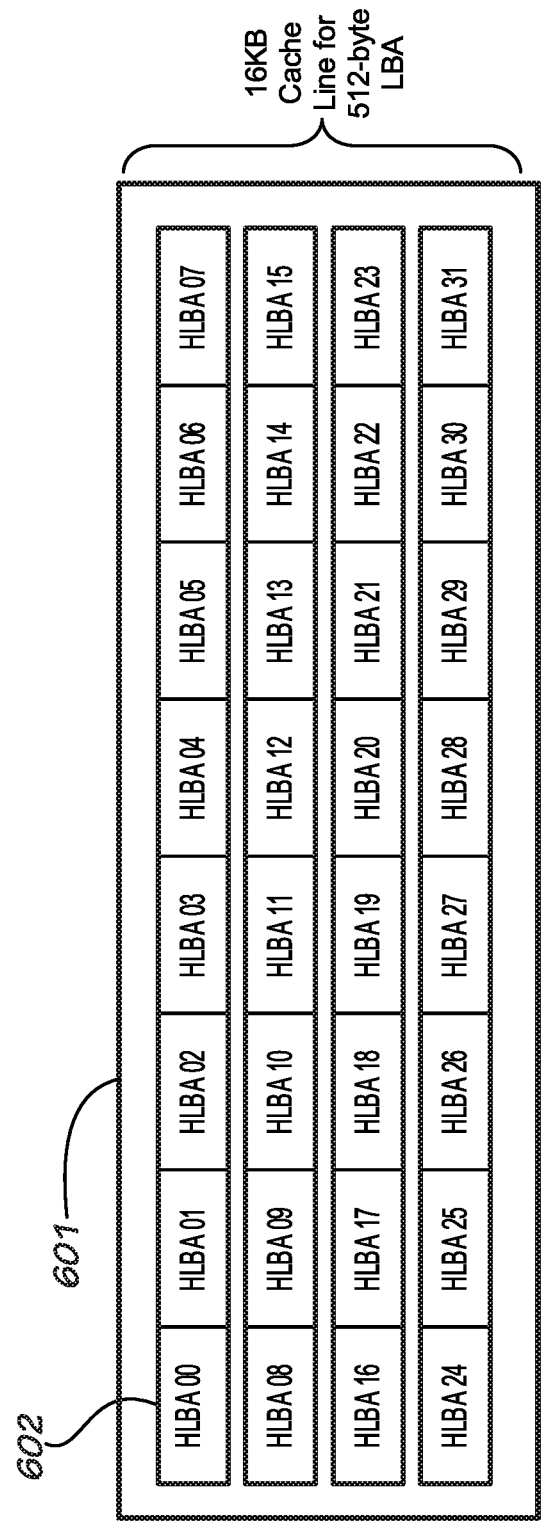
FIG. 6 shows a cache line consisting of a collection of host LBA units according to an embodiment of the present invention.

The size of each stripe is configured at first boot-up. An example configuration is setting stripe size equal to the cache line size and setting cache line size equal to the native flash block size or to the flash section size. A system with host LBU of X bytes, and with flash devices with block size of Y bytes, a data stripe and a cache line will consist of Y divided by X number of host logical blocks. FIG. 6 shows an example cache line for a 16 KB flash section and 512 byte LBU.

Figure 7:
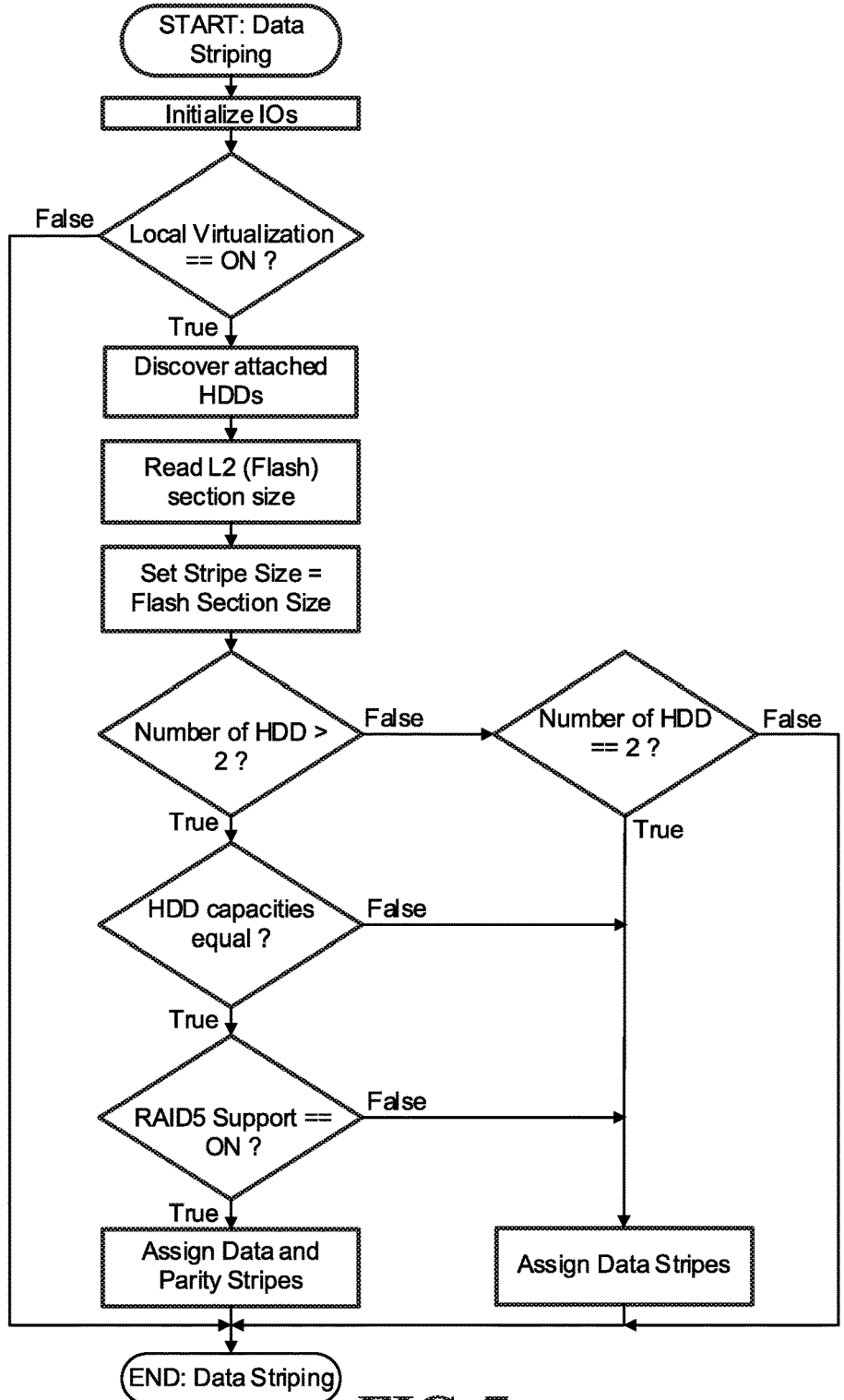
FIG. 7 shows a process flow for initializing a hybrid storage device supporting data striping according to an embodiment of the present invention.

FIG. 7 is a flowchart for the initialization part of data striping in the hybrid storage device. If local virtualization is active, firmware initiates discovery of attached hard drives, and gets the flash section size to be used as reference size for the stripe. If the number of detected drives is greater than two and the drives have equal capacities and RAID5 feature is set to on, RAID5 configuration is selected and parity stripes are assigned in addition to data stripes. If there are only two drives, plain striping is implemented.

Pre-Fetching

At initialization, the hybrid storage device firmware offers the option to pre-fetch data from the rotational drives to L1 cache. Since rotational drives are slow on random accesses, firmware by default may choose to pre-fetch from random areas in rotational drives. A more flexible option is for the firmware to provide an external service in the form of a vendor-specific interface command to allow the host to configure the pre-fetching method to be used by the firmware at boot-up.

If the system is being used for storing large contents such as video, the firmware can be configured to pre-fetch sequential data. If the system is being used for database applications, it can be configured to pre-fetch random data. If fastest boot-up time is required, pre-fetch may also be disabled.

In another possible configuration, the system may support a host-controlled Non-Volatile Cache command set. This allows the host to lock specific data in the non-volatile L2 cache so that they are immediately available at boot-up time. When the firmware detects that data was pinned by the host in the L2 non-volatile cache, it automatically pre-fetches those data.

Figure 8:
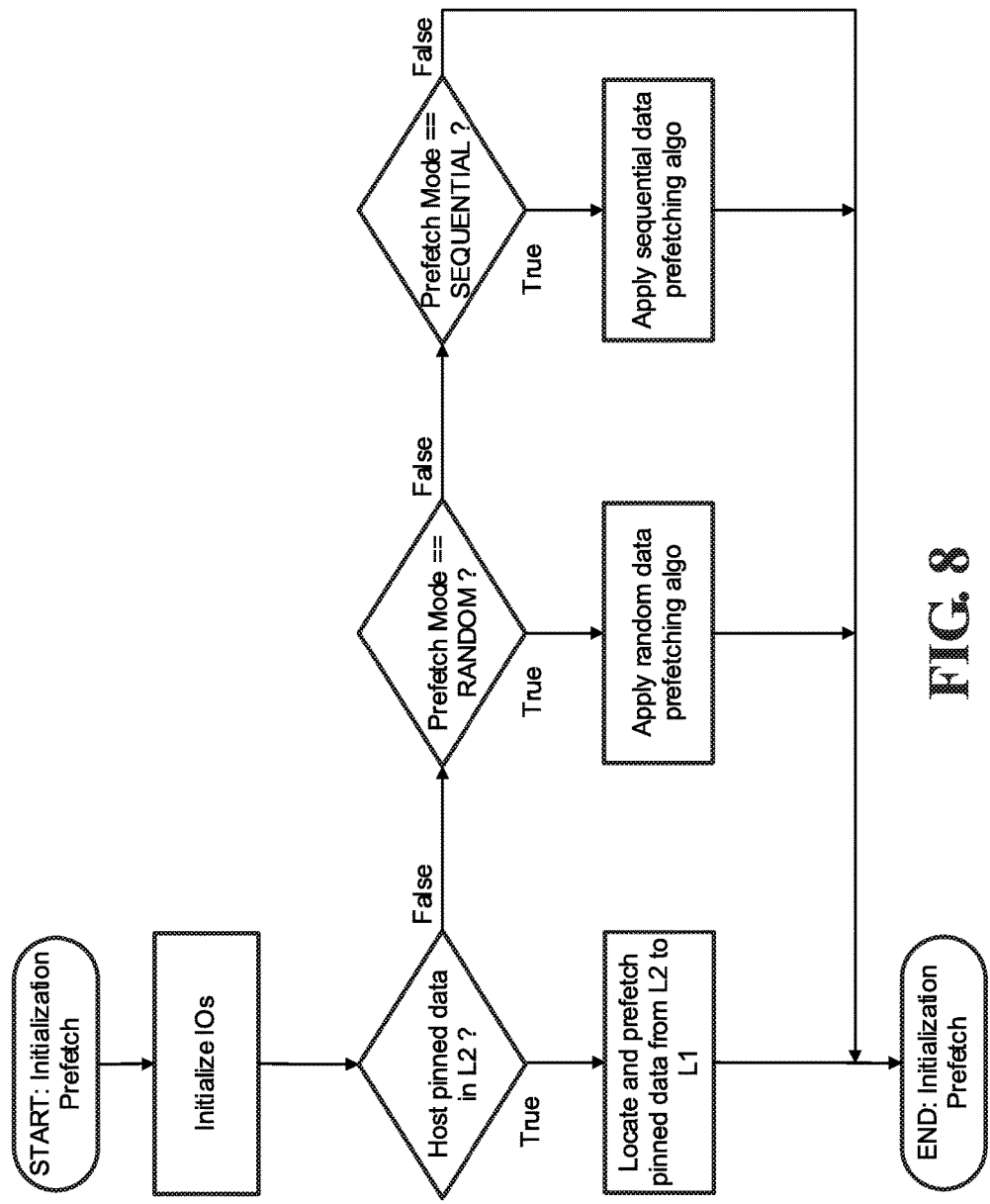
FIG. 8 shows a process flow for initializing a hybrid storage device supporting pre-fetch of data at boot-up according to an embodiment of the present invention.

FIG. 8 shows the flowchart for doing data pre-fetching at boot-up time.

Caching Mode

In FIG. 1, the rotational drives 105 have the largest storage capacity. The flash devices 103, acting as second level cache, may have less capacity. The SDRAM 104, acting as first level cache, may have the least capacity. Both L1 cache and L2 cache can either be fully-associative, set-associative, or directly-mapped. In a full-associative cache, data from any address can be stored to any of the cache lines. In a set-associative cache, data from a specific address can be mapped to a certain set of cache lines. In a directly-mapped cache, each address in storage can be cached only to one specific cache line.

Figure 9A:
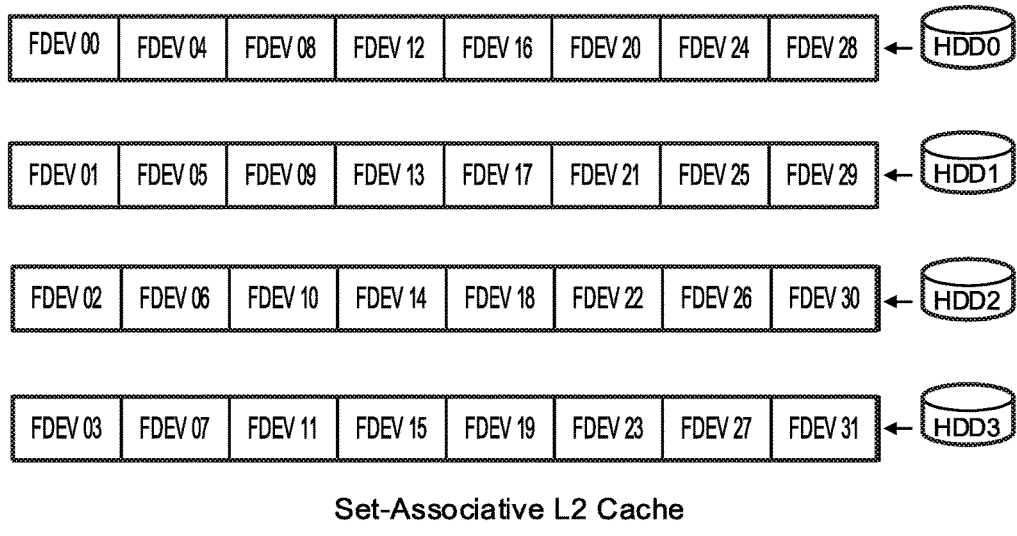
FIG. 9A is a diagram illustrating a set-associative L2 cache according to an embodiment of the present invention.

FIG. 9a shows an illustration of a set-associative L2 cache, where the flash devices are divided among the rotational drives. Data from HDD0 can be cached to any of the 8 flash devices assigned to HDD0 (FDEV 00, FDEV 04, FDEV 08, FDEV12, FDEV16, FDEV20, FDEV24, and FDEV28), data from HDD1 can be cached to any of the 8 flash devices assigned to HDD1, and so on.

Figure 9B:
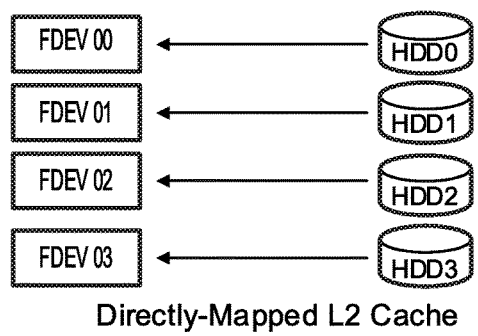
FIG. 9B is a diagram illustrating a directly-mapped L2 cache according to an embodiment of the present invention.

FIG. 9b shows an illustration of a directly-mapped L2 cache. In this setup, each of the four hard drives has dedicated flash devices where their data can be cached. In this example, data from HDD0 can only be cached in FDEV00, HDD1 in FDEV01, and so on.

Figure 9C:
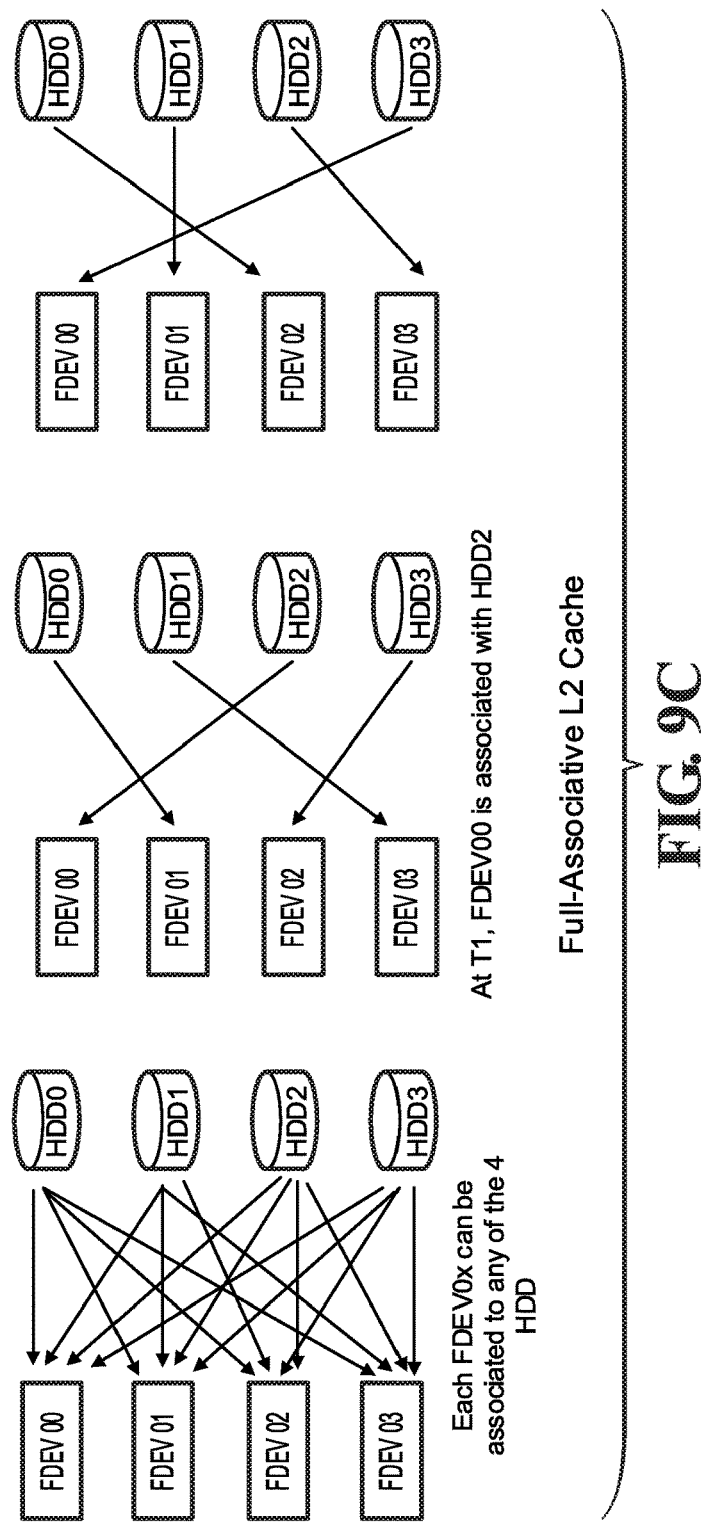
FIG. 9C is a diagram illustrating a full-associative L2 cache according to an embodiment of the present invention.

FIG. 9c is an illustration of a full-associative L2 cache. In this setup, data from any of the four drives can be cached to any of the four flash devices.

Full-associative caching has the advantage of cache usage efficiency since all cache lines will be used regardless of the locations of data being accessed. In the full-associative caching scheme, the firmware keeps cache line information for each set of available storage. In a system with N number of cache lines, where N is computed as the available cache memory divided by the size of each cache line, the firmware will store information for M number of cache lines, where M is computed as the total storage capacity of the system divided by the cache line size. This information is used to keep track of the state of each storage stripe.

FIG. 10 shows an example table for storing cache line information in a full-associative caching system. Since each storage stripe has its own entry in the table, firmware can easily determine a stripe's caching state and location.

L1 Index is the cache line/cache control block number. HDD ID is the sequential index of the rotational drive where the data resides. HDD LBA is the first hard-disk LBA assigned to the cache line. L1 Address is the actual memory address where data resides in L1, and L2 Address is the physical address of the location of data in L2.

The HDD ID and HDD LBA can be derived at runtime to minimize memory usage of the table.

L1 Cache State and L2 Cache State specify whether the SDRAM and/or the flash contain valid data. If valid, it also specifies if data is clean or dirty. A dirty cache contains a more up-to-date copy of data than the one in the actual storage media, which in this case is the rotational drive.

Cache Sub-State specifies whether cache is locked because of on-going transfer between SDRAM and Host (sdram2host or host2sdram), SDRAM and Flash (sdram2flash or flash2sdram), or SDRAM and rotational drive (sdram2hdd or hdd2sdram).

Direct-mapping is less efficient in terms of cache memory usage, but takes less storage for keeping cache line information. In a system with N number of cache lines, where N is computed as the available cache memory divided by the size of each cache line, the firmware can store information for as few as N number of cache lines. When checking for cache hits, firmware derives the cache line index from the host LBA, and looks directly to the assigned cache line information. Firmware compares the cache-aligned host LBA to the start of the currently cached LBA range and declares a hit if they are the same.

At initialization, firmware allocates memory for storing the cache information. The amount of memory required for this depends on the caching method used as discussed above.

Address Translation

Cache states stored in the cache line information or cache control block outlined in FIG. 10 specify the validity of data copy in L1 and L2 caches. After inspection of cache states, the next step in processing an IO command is to locate the exact address of the target data, which is stored also in the cache line table in FIG. 10. If data is neither in L1 nor in L2, a HostLBA2HDDLBA translation formula is used to derive the addresses of the hard disk logical blocks where the data is stored.

The host LBA size is usually smaller than the flash block of L2, thus a set of logical blocks is addressed by a single physical block. For example, given a 512-byte host LBA and 16 KB flash block, 32 LBAs will fit into one flash block. Therefore, only one entry in the table is needed for each set of 32 host logical blocks.

The cache information table is stored in non-volatile memory and fetched at boot-up time. In systems with very large storage capacities, it might not be practical to copy the entire table to volatile memory at boot-up time due to boot-up speed requirement and limitation of available volatile memory. At boot-up only a small percentage of the table is copied to volatile memory. In effect, the cache control block table is also cached. If the table entry associated with an IO command being serviced is not in volatile memory, it will be fetched from the non-volatile memory and will replace a set of previously cached entries.

The HostLBA2HDDLBA translation formula depends on the mapping method used to distribute the host logical blocks across the rotational drives. For example, if host data is striped across 4 rotational drives and parity is not implemented, the formula would look like the following:

HDDLBA=StripeSz*(NumHDD/SDRAMIdx)+ HostLBA % StripeSz.

The index to the rotational drive can be derived through the formula:

HDDIdx=SDRAMIdx % NumHDD

In the first equation, StripeSz is specified in terms of logical block units.

Cache State Transitions

The firmware keeps track of data in the L1 and L2 caches using a set of cache states which specifies the validity and span of data in each cache line. The cache state information is part of the cache information table in FIG. 10. Each cache level has its own cache state, and in addition, the field cache sub-state specifies whether the cache line is locked due to an ongoing data transfer between caches, between the medium and a cache, or between the host and a cache. Although the cache states are presented in the table as one data field, the representation in the actual implementation is not restricted to using a single variable for each cache state. For example, it may be a collection of flags and page bitmaps but when treated collectively still equate to one of the possible distinct states. The page bitmap is the accurate representation of which parts of the cache line are valid and which are dirty. As an example, the cache line 601 of FIG. 6 has 32 host LBAs and the state of each LBA (whether valid, invalid, clean, or dirty) can be tracked by using two 32-bit bitmap ValidBitmap and DirtyBitmap. Each bit in the two variables represents one LBA in the cache line. For ValidBitmap, a bit set to one means the data in the corresponding LBA is valid. For DirtyBitmap, a bit set to one means the data in the corresponding LBA is more up to date than what is stored in the medium. The six possible cache states are: Invalid, Valid Partially Cached Dirty, Valid Fully Cached Partial Dirty, Valid Full Dirty, Valid Full Clean, and Valid Partially Cached Clean. The seven possible cache sub-states are: NOP, H2S, S2H, F2S, S2F, HDD2S and S2HDD.

A sub-state of NOP (No Operation) indicates that the cache is idle. H2S indicates that the cache line is locked due to an ongoing transfer of data from the host to L1. S2H indicates that the cache line is locked due to an ongoing transfer of data from L1 to host. F2S indicates that the cache line is locked due to an ongoing transfer from L2 to L1. S2F indicates that the cache line is locked due to an ongoing transfer from L1 to L2. HDD2S indicates that the cache line is locked due to an ongoing transfer from the hard disk to L1. Finally, S2HDD indicates the cache line is locked due to an ongoing transfer from L1 to the hard disk drive.

An Invalid cache line does not contain any data or contains stale data. Initially, all caches are invalid until filled-up with data during pre-fetching or processing of host read and write commands. A cache line is invalidated when a more up-to-date copy of data is written to a lower-level cache thus making the copy of the data in higher level caches invalid (15038, 15040, 15041, 15043, 15046, 15048, 15050, 15055, 15057, 15059, 15060, 15062, 15068, 15071, 15072, 15074, 15076, 15080, 15084, 15085, 15090, 15095, 15096, 15100, 15101, 15103, 15105, 15109, 15115, 15116, 15119, 15120, 15124, 15125, 15127, 17049 and 17050). For example if a dirty cache line in L1 is copied to L2 so that L1 can be freed up during an L1 cache full condition, and later new version of that data is written to L1 by host, the copy in L2 becomes old and unusable, so the firmware invalidates the cache line in L2. From an invalid state, a write to an L1 cache line by host will result to switching of state to either Valid Partially Cached Dirty (15037, 15039, 15040, 15042, 15044, 15045, 15047, 15049 and 15050) or Valid Full Dirty (15036, 15038, 15041, 15043, 15046 and 15048), depending on whether the data spans the entire cache line or not. On the other hand, a read from the medium to L1 makes an Invalid cache line either Valid Partially Cached Clean (19036, 19038, 19039, 19041 and 19043) or Valid Full Clean (19037, 19040 and 19044). Finally, a read from L2 to an invalid L1 could result to inheritance of L2's state by L1 (17037, 17038, 17040, 17042 and 17044). However, if the data from L2 is not enough to fill the entire L1 cache line, the resulting state of L1 would either be Valid Partially Cached Clean (17039) or Valid Partially Cached Dirty (17041 and 17043). From an invalid state, a write to an L2 cache line will result to inheritance of state from L1 to L2 (18042, 18050, 18056, 18062, and 18068).

Valid Partially Cached Dirty state indicates that the cache line is partially filled with data and some or all of these data are dirty. A dirty copy of data is more up-to-date than what is stored in the actual medium. An example sequence that will result to this state is a partial Write FUA command to an Invalid cache line followed by a partial normal Write command. The Write FUA command partially fills the L1 cache line with clean data (19036, 19038, 19039, 19041 and 19043), and the normal Write command makes the partial L1 cache line dirty (15114, 15117, 15118, 15121, 15127 and 15128). L1 cache will take on a Valid Partially Cached Dirty state whenever new data transferred from the host or L2 cache is not enough to fill its entire cache line (15037, 15039, 15040, 15042, 15044, 15045, 15047, 15049, 15050, 15053, 15058, 15059, 15066, 15067, 15070, 15075, 15076, 15114, 15117, 15118, 15121, 15127, 15128, 17037, 17041, 17043, 17047, 17052, 17054 and 17075). Transfer of data from hard disk drive or from L2 to a Valid Partially Cached Dirty L1 occurs when the firmware wants to fill-up the un-cached portions of the L1 cache. When the transfer completes, the L1 cache either becomes Valid Full Dirty (17049 and 17051) or Valid Fully Cached Partial Dirty (17046, 17050, 17053, 19046, 19048 and 19053), depending on whether the entire cache line became dirty or not. However, for cases wherein data transferred from the hard disk drive or L2 cache is not enough to fill all un-cached portion of the L1 cache, its state remains in Valid Partially Cached Dirty (17047, 17052, 17054, 19045, 19047 and 19052). Flushing of dirty bytes from a Valid Partially Cached Dirty L1 to the medium will either cause its state to change to Valid Partially Cached Clean (20042, 20044, 20046, 20049, 20051 and 20053) or stay in Valid Partially Cached Dirty (20043, 20045, 20047, 20050 and 20054) depending on whether all dirty bytes were flushed to the medium or just a portion of it. A host write to a Valid Partially Cached Dirty L1, either makes it Valid Full Dirty, Valid Fully Cached Partial Dirty, or leave it as Valid Partially Cached Dirty, depending on the span of data written by the host. If the new data covers the entire cache, it naturally becomes Valid Full Dirty (15051, 15055, 15062, 15068, and 15071). If the new data fills all un-cached bytes and all clean bytes, L1 still becomes Valid Full Dirty (15052, 15056, 15057, 15063, 15065, 15069, 15072 and 15074). If the new data fills all un-cached bytes but some bytes remained clean, L1 becomes Valid Fully Cached Partial Dirty (15054, 15060, 15064 and 15073). Finally, if the new data does not fill all un-cached, L1 stays as Valid Partially Cached Dirty (15053, 15058, 15059, 15066, 15067, 15070, 15075 and 15076). L2 will switch to Valid Partially Cached Dirty state if a Valid Partially Cached Dirty L1 is copied to it (18042, 18043 and 18048) and copied data does not fill the entire cache line of L2. Data transfer from the host to L1 could invalidate some of the data in L2 effectively causing L2's state to switch to Valid Partially Cached Dirty (15044, 15047, 15063, 15065, 15067, 15069, 15070, 15098 and 15110). L2 will likewise switch to Valid Partially Cached Dirty if it shares the same set of data with L1, and some of the dirty bytes in L1 were flushed to the medium (20079). When new data is written by the host to L1 overlaps with the data in L2, the L2 copy becomes invalid (15038, 15040, 15055, 15057, 15059, 15060, 15090, 15105, 15115 and 15116) or Valid Partially Cached Clean (15092 and 15118), otherwise it will stay in its Valid Partially Cached Dirty state (15039, 15056, 15058, 15091, 15093, 15106 and 15117). A transfer from L1 to L2 could also change L2's state from Valid Partially Cached Dirty to Valid Full Dirty (18044 and 18063) or Valid Fully Cached Partial Dirty (18057, 18069 and 18070), depending on whether the entire cache line became dirty or not as a result of the data transfer. If the dirty bytes in L1 is flushed to the medium incidentally coincides with the dirty bytes in L2, the L2 copy becomes Valid Partially Cached Clean (20044, 20062, 20072 and 20073.

A Valid Full Clean state indicates that the entire cache line is filled with data that is identical to what is stored in the actual medium. This happens when un-cached data is read from the medium to L1 (19037, 19040, 19044, 19073, 19076 and 19080), or when data in L1 is flushed to the medium (20049, 20060, 20062, 20065, 20068, 20070, 20072 and 20077). A data transfer from L1 could also result to a Valid Full Clean state for L2 if data copied to L2 matches what is stored in the hard disk (18050 and 18075). Likewise, L1 will switch to a Valid Full Clean state (17038, 17076 and 17080) following a transfer from L2, if cached data in L2 matches what is stored in the hard disk and transferred data from L2 is enough to fill the entire L1 cache line. When written with new data, a Valid Full Clean either becomes Valid Full Dirty (15077, 15080, and 15084) or Valid Fully Cached Partial Dirty (15078, 15081, 15085 and 15086), depending on whether the new data spans the entire cache line or not. A Valid Full Clean L2 could become Valid Partially Cached Clean (15042, 15081 and 15121) or could be invalidated (15041, 15080, 15119 and 15120) depending on whether new data written to L1 by the host invalidates a portion or the entire content of L2.

The Valid Fully Cached Partial Dirty state indicates that the entire cache line is filled up with data and some of the data are dirty. An example sequence that will result to such state is a Read FUA command of the entire cache line followed by a partial Write command. The Read FUA command copies the data from the medium to L1, making L1 Valid Full Clean (19037, 19040, 19044, 19054, 19056, 19059, 19073, 19076 and 19080), and the following partial Write command makes some of the data in the cache line dirty (15078, 15081, 15085 and 15086). Writing data to un-cached portions of a partially filled L1 could likewise result to a Valid Fully Cached Partial Dirty state (15054, 15060, 15064, 15073, 15113, 15116, 15120, 15125, 15126, 17046, 17050, 17053, 17074, 19046, 19048 and 19053). Writing this L1 cache line to L2 in turn, makes L2 inherit the state of L1 as Valid Fully Cached Partial Dirty (18056, 18057 and 18061). Similarly, copying a Valid Fully Cached Partial Dirty L2 to L1 will make L1 inherit the state of L2 (17040 and 17050). Transferring data from L1 to un-filled portions of L2 would likewise cause L2's state to switch to Valid Fully Cached Partial Dirty (18049, 18069 and 18070). A Valid Fully Cached Partial Dirty L1 will remain in this state until a portion of the dirty bytes in L1 were flushed to the medium after which it would shift to a Valid Full Clean state (20061, 20063, 20066 and 20069). Furthermore, when the host writes new data to the L1 cache, L1 either stays as Valid Fully Cached Partial Dirty (15089, 15092, 15097, 15098, 15102 and 15103) or becomes Valid Full Dirty (15087, 15088, 15090, 15091, 15093, 15095, 15096, 15100 and 15101). A Valid Fully Cached Partial Dirty L2 cache, on the other hand, either gets invalidated (15043, 15062, 15095 and 15096), switches to Valid Partially Cached Dirty state (15044, 15063, 15065, 15067 and 15098) or changes state to Valid Partially Cached Clean (15045, 15064, 15066 and 15097) following a transfer from the host to L1. Copying data from a Valid Fully Cached Partial Dirty L2 to L1 would likewise invalidate the contents of L2 (17049 and 17050). Flushing all cached dirty bytes from L1 will cause L2's state to change from Valid Fully Cached Partial Dirty to Valid Full Clean (20049 and 20065), otherwise, L2 stays in Valid Fully Cached Partial Dirty state (20050, 20051 and 20067).

The Valid Full Dirty state indicates that the entire cache line contains newer data than what is stored in the medium. L1 may become Valid Full Dirty from any state (i.e. Invalid: 15036, 15038, 15041, 15043, 15046 and 15048; VPCD: 15051, 15052, 15055, 15056, 15057, 15062, 15063, 15065, 15068, 15069, 15071, 15072 and 15074; VFCPD: 15087, 15088, 15090, 15091, 15093, 15095, 15096, 15100 and 15101; VFD: 15104, 15105, 15106, 15109 and 15110; VFC: 15077, 15080 and 15084; VPCC: 15112, 15115, 15119 and 15124) once the host writes enough data to it to make all its data dirty. Aside from this, a Valid Full Dirty L1 may also be a result of a previously empty or Valid Partially Cached Dirty L1 that has been filled up with dirty bytes from L2 (17042, 17049 and 17051). A Valid Full Dirty L1 will stay at this state until flushed out to the medium, after which it will become Valid Full Clean (20071, 20073 and 20078) or Valid Fully Cached Partial Dirty (20072, 20074, 20075 and 20079). A Valid Full Dirty L2 is a result of data transfer from a Valid Full Dirty L1 to L2 (18062 and 18063) or when new data copied from L1 is enough to fill all portions of L2 (18044). L2 will stay at this state until the host writes new data to L1 which effectively invalidates portions or the entire data in L2. If only a portion of cached data in L2 is invalidated a Valid Full Dirty L2 switches to Valid Partially Cached Dirty state (15047, 15069, 15070 and 15110), otherwise it switches to Invalid state (15046, 15068 and 15109). The state of L2 could also change from Valid Full Dirty to Valid Partially Cached Dirty (20079) or Valid Full Clean (20078) depending on whether all or just a portion of the dirty bytes in L1 was flushed to the medium.

The Valid Partially Cached Clean state indicates that the cache is partially filled with purely clean data. For L1, this may be a result of a partial Write FUA (20081, 20082, 20083 and 20086), or partial Read FUA command (19036, 19038, 19039, 19041, 19043, 19072, 19074, 19075 and 19079), or flushing of a partially cached dirty L1 to the hard disk drive (20042, 20044, 20046, 20049, 20051 and 20053) or data transferred from L2 to L1 cache did not fill entire L1 cache line (17039, 17044, 17077 and 17081). A Valid Partially Cached Clean will transition to Valid Full Clean if remaining un-cached data are read from the medium (19073, 19076 and 19080) or from L2 (17076 and 17080) to L1. When host writes to a Valid Partially Cached Clean L1, the L1 state will transition to Valid Full Dirty, Valid Fully Cached Partial Dirty, or Valid Partially Cached Dirty. If the written data covers the entire cache line, the L1 becomes Valid Full Dirty (15112, 15115, 15119 and 15124). If the new data does not cover the entire cache line, L1 becomes Valid Partially Cached Dirty (15114, 15117, 15118, 15121, 15127 and 15128). If the new data does not cover the entire cache line but was able to fill all un-cached data, L1 becomes Valid Fully Cached Partial Dirty (15113, 15116, 15120, 15125 and 15126). When data from L2 is copied to a Valid Partially Cached Clean L1, it could likewise transition to Valid Partially Cached Dirty state (17075), Valid Fully Cached Partial Dirty (17074), Valid Full Clean (17076 and 17080), or Valid Partially Cached Clean (17077 and 17081). A Valid Partially Cached Clean L2 is the result of a Valid Partially Cached Clean L1 being written to L2 (18068 and 18074), or a Valid Partially Cached Dirty L1 being flushed out to the medium (20044, 20053 and 20054). A Valid Partially Cached Clean L2 could likewise result from a host to L1 transfer whenever some of the data in L2 gets invalidated (15042, 15045, 15064, 15066, 15081, 15092, 15097, 15118 and 15121). When host writes to L1, the entire contents of a Valid Partially Cached Clean L2 would be invalidated if the data transferred by the host overlaps with the contents of L2 (15038, 15040, 15055, 15057, 15059, 15060, 15090, 15085, 15105, 15115 and 15116) otherwise it stays in Valid Partially Cached Clean state (15092 and 15118). Transferring new data bytes from L1 will cause a transition of L2's state from Valid Partially Cached Clean to Valid Partially Cached Dirty state (18048) or Valid Fully Cached Partial Dirty state (18049 and 18061) depending on whether copied data from L1 fills the entire L2 cache line or not. A Valid Partially Cached Clean L2 could also transition to Valid Full Clean (18075) if data transferred from L1 fills empty cache bytes of L2, otherwise, L2 stays in Valid Partially Cached Clean state (18074).

FIG. 15, FIG. 16, FIG. 17, FIG. 18, FIG. 19 and FIG. 20 show the complete tables showing the state transitions that occur in a hybrid storage system with two levels of cache. For systems with more than two cache levels, the additional table entries can easily be derived using the same concepts used in the existing table.

Read Command

Figure 11A:
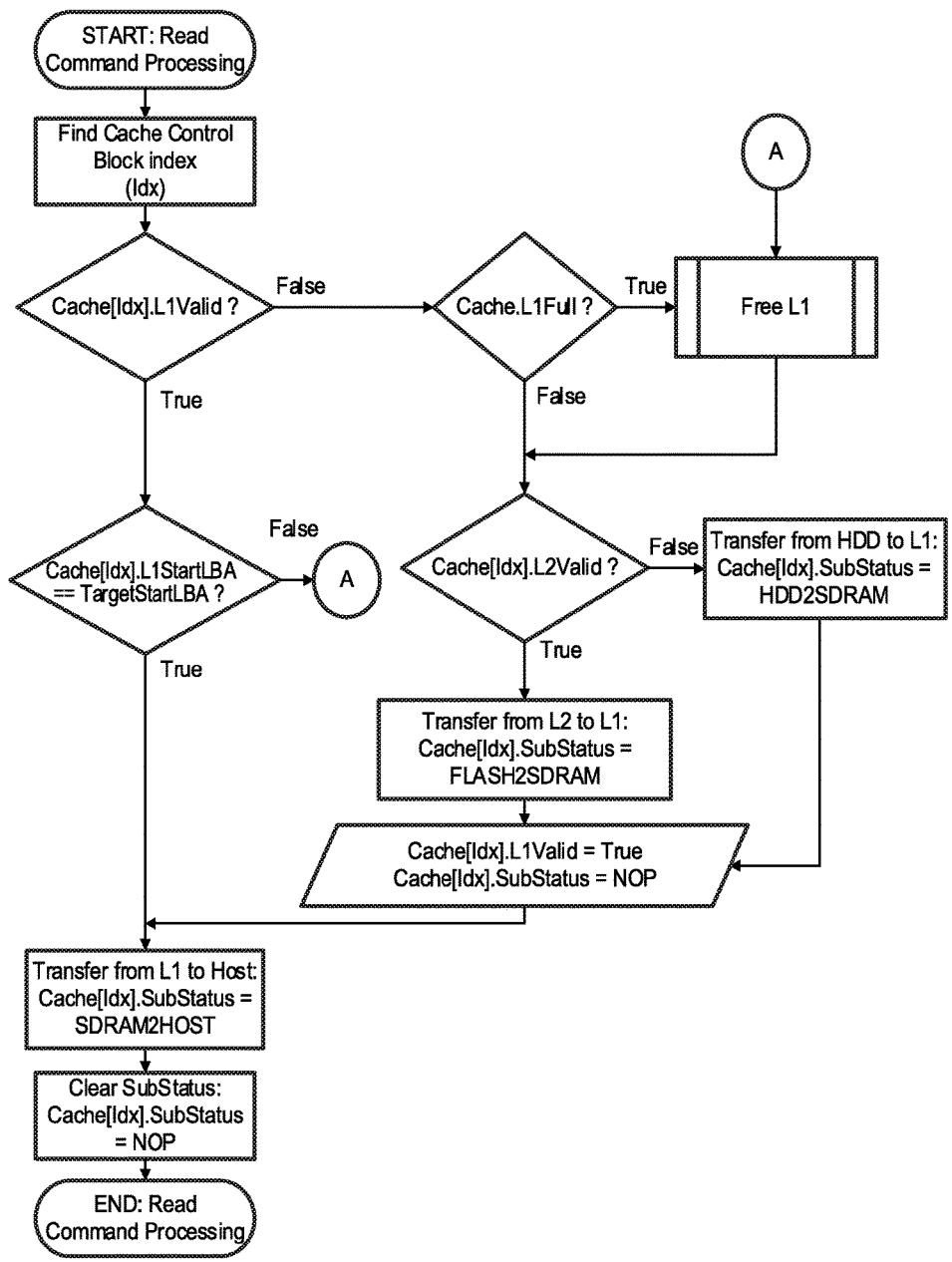
FIG. 11A shows a process flow for servicing host read commands according to an embodiment of the present invention.
Figure 11B:
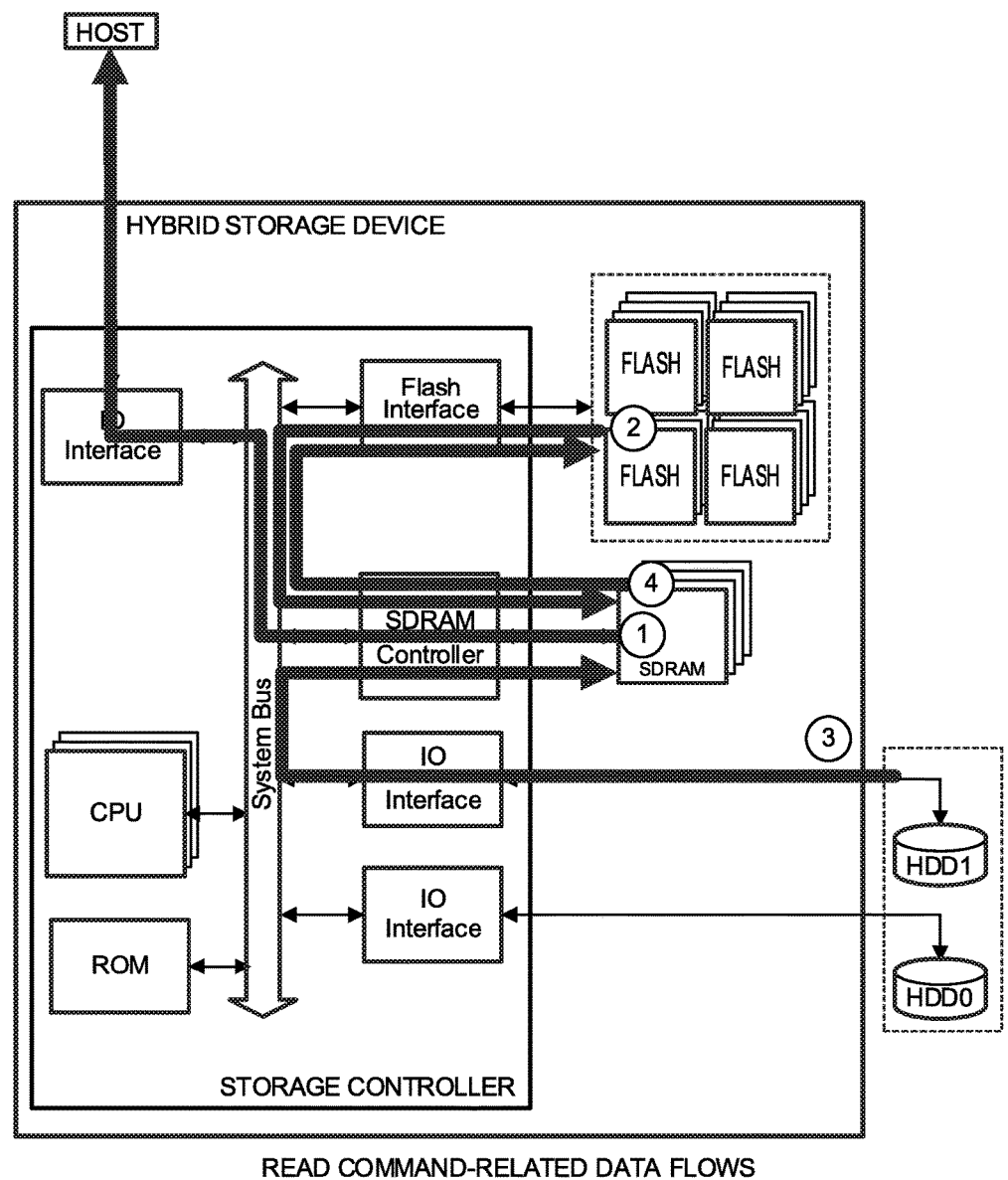
FIG. 11B is a diagram illustrating host read command-related data flows according to an embodiment of the present invention.
Figure 12A:
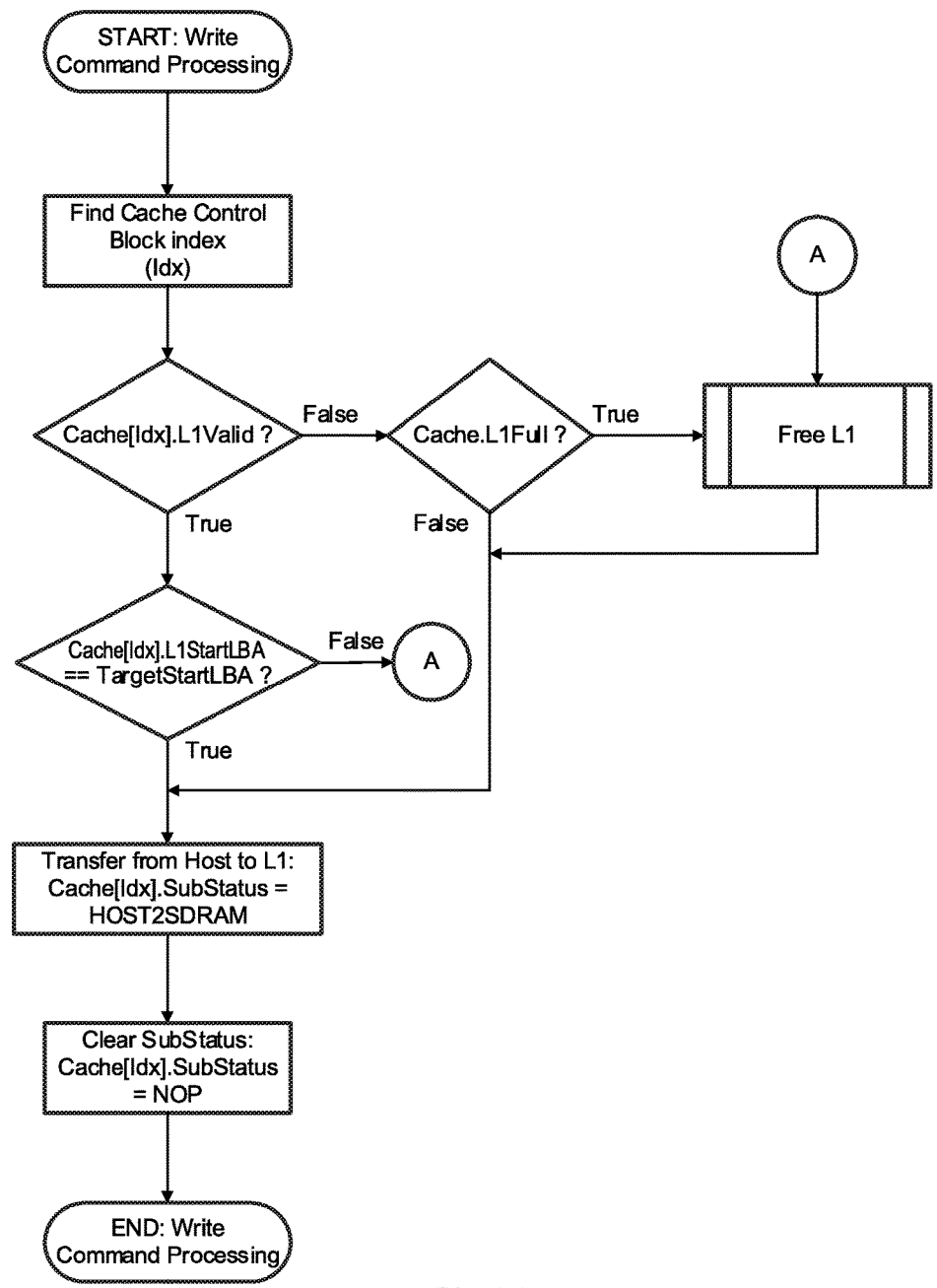
FIG. 12A shows a process flow for servicing host write commands according to an embodiment of the present invention.
Figure 12B:
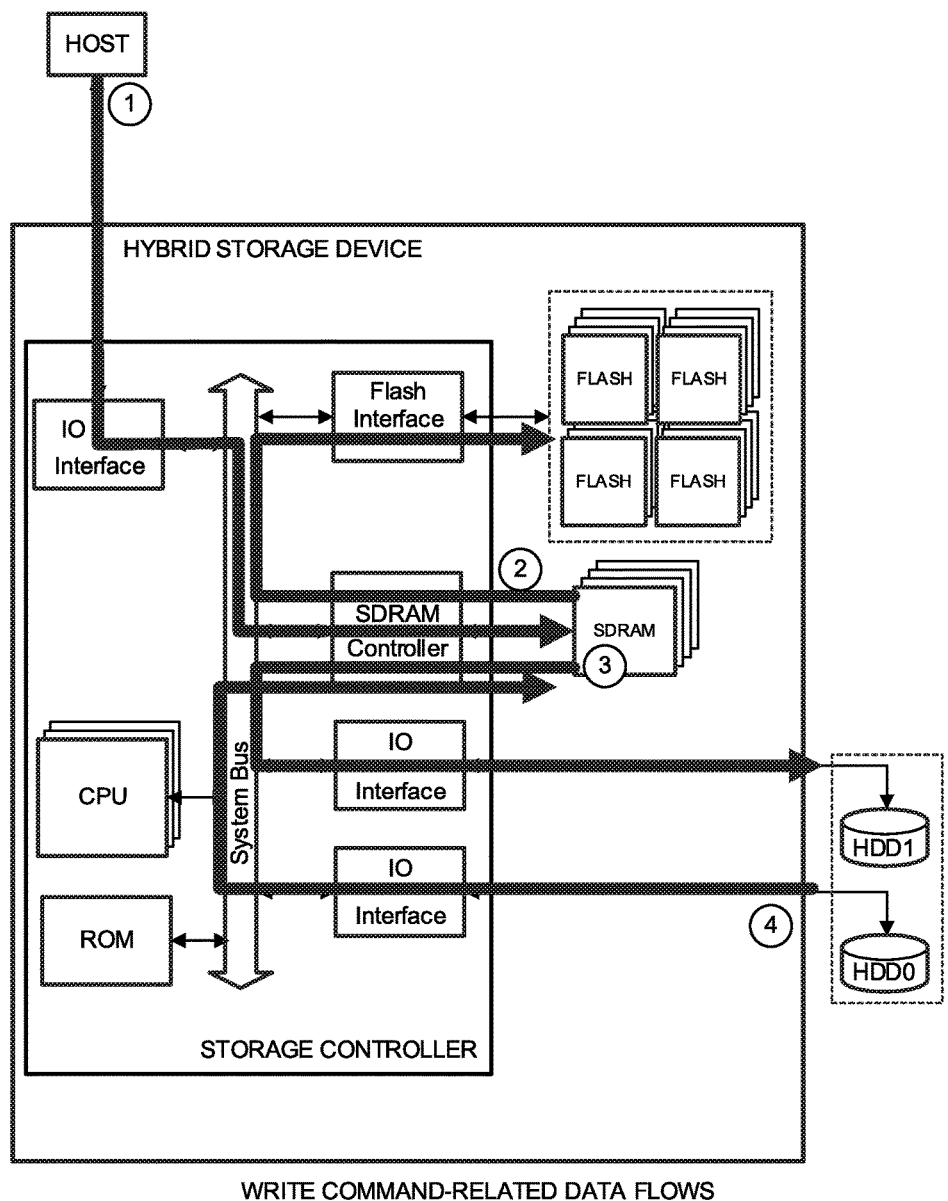
FIG. 12B is a diagram illustrating write command-related data flows according to an embodiment of the present invention.

The succeeding paragraphs discuss in details, the processing of a Read command by a hybrid storage device as described by the flow chart illustrated in FIG. 11a. The process performs different types of cache operations which make use of different cache transition tables. The cache transition tables used are also discussed.

When the firmware receives a Read command from the host, it derives the cache control block index (SDRAM Index) based on the host LBA. Then it checks the designated cache control block if the requested LBA is in L1 cache.

If L1 cache is valid and the associated cache control block entry is for the requested block, firmware starts data transfer from L1 cache to host and updates cache sub-status to S2H (SDRAM to host). Note that there are 5 defined valid cache states (valid full clean (VFC), valid full dirty (VFD), valid partially cached clean (VPCC), valid partially cached dirty (VPCD), and valid fully cached partial dirty (VFCPD)), and before firmware can initiate L1 cache to host data transfer and update the cache sub-state to S2H, it must check first if there is an ongoing locked cache operation. Should there be any ongoing locked cache operation, the firmware will wait until the operation is finished (or current cache sub-state becomes NOP) before initiating the data transfer from L1 cache to host. FIG. 16 lists the 5 defined valid states for L1 cache (and other states) and the combination with L2 cache state and cache sub-state values for allowable and non-allowable data transfer from L1 cache to host. As an example, assuming the requested data being targeted by the received Read command from the host is LBA 0-99 and is determined to be in L1 cache based on the cache line information table. Based on FIG. 16, firmware may execute read from L1 cache to host provided that current cache sub-state is NOP. Note also that S2H operation can be initiated regardless of the valid current state of L2 cache since content of the L1 cache is always the latest or most updated copy.

If L1 cache is valid but a different entry is stored in the associated cache control block (for the case of directly mapped cache), the firmware initiates the freeing of that cache. If that cache is clean, it can be freed instantly without any flush operation. But if the cache is dirty, firmware gets the associated flash physical location of data from cache control info and initiates copying of data to L2 cache after determining that there is enough space for the L1 cache content to be flushed, which is faster than flushing to rotational drive. Then it updates sub-status to sdram2flush (S2F). Refer to "movement from L1 cache to L2 cache" for detailed discussion on this cache operation. FIG. 18 lists the cache state transition for L1 cache to L2 cache data transfer.

However, if L2 cache is full, flushing to rotational drive will be initiated instead, and sub-status will be set to S2HDD (SDRAM to hard disk drive). Flushing of L2 cache to rotational drives can also be done in the background when firmware is not busy servicing host commands. After flushing of L1, firmware proceeds with the steps below as if data is not in L1 cache. Refer to "flushing of L1 cache" subsection of this document for a detailed discussion on the flushing of L1 cache mentioned in the Read operation. FIG. 20 lists the cache state transition for L1 cache to rotational drive data transfer.

If data is not in L1 cache, firmware checks state of L2 cache.

If L2 cache is valid, firmware gets the physical location of data based on the L2 address field of the cache control info table and starts transfer from L2 cache to L1 cache, and updates sub-status to F2S (flash to SDRAM). FIG. 17 lists the current L1 cache state, L2 cache state, and cache sub-state condition requirements for F2S operation. Based on the table, F2S operation can be initiated when current cache sub-state is NOP and current L1 cache state can be INVLD, VPCD, or VPCC. The same as the previously mentioned cache operations, F2S can only be initiated by firmware if there is no ongoing locked cache operation. If there is no available L1 cache (L1 cache full), firmware selects an L1 cache victim. If the selected victim is clean, or if it is dirty but consistent with the copy in L2 cache, it is freed instantly. Otherwise, it is flushed to the rotational drive. The cache is then invalidated and assigned to the current command being serviced. For example, the read command is requesting LBA 20-25 which is located in L2 cache. Assuming the configuration is 10 LBAs per L1 cache line or index, the requested LBAs are mapped to L1 index #2 of the cache control information table. To start the transfer of the data from L2 cache to L1 cache, firmware checks L1 cache state if it is not yet full. If not full, firmware searches for an available L1 address (ex. 0x0000_3000), assigned it to L1 index #2, and set the cache sub-state value from NOP to F2S. However, if current L1 cache is full (VFC, VFD, or VFCPD), an L1 address is selected. Assuming the selected L1 address is 0x0001_0000, firmware checks from the L1 segment bitmap if the content of this address is clean or dirty. If clean, then the address is invalidated. If dirty, firmware flushes to the rotational drive if needed, before invalidating the selected L1 address. Once invalidated, firmware initiates LBA 20-29 transfer from L2 cache to L1 cache address 0x0001_0000 once the current cache sub-state is NOP. After completing the data transfer, firmware updates the L1 cache state and sets cache sub-state back to NOP.

If L2 cache is invalid, the firmware determines physical location of data in rotational drives, starts transfer of data from rotational drive to L1 cache, and updates sub-status to HDD2S (hard disk drive to SDRAM). For example, LBA 100-199 is being requested by a received Read command from the host, and based on the cache control information table, this LBA range is not in the cache (L1 and L2). After determining, the physical location in the hard disk using the HostLBA2HDDLBA translation formula, firmware selects a free L1 cache address and initiates the data transfer from the hard disk to the selected L1 cache address when no L1 cache operation is happening.

Note that HDD2S cache operation can also be initiated for other values of L2 cache state. FIG. 19 lists L1 cache state, L2 cache state, and cache sub-state current values, the allowable event for each cache combinations, and the resulting states per event. Based on the figure, HDD2S can be initiated when—(1) current L1 or L2 cache states is not full dirty, (2) current L1 cache state is VPCD and current L2 cache state is valid full, (3) current L1 cache state is VFC and current L2 cache state is dirty, (4) current L1 cache state is VFCPD and current L2 cache state is VFD, (5) current L1 cache state is VPCC and current L2 cache state is VFCPD or VFP, and (6) there's no ongoing cache operation. The case when current L1 cache state is VFC and VFCPD, and HDD2S is initiated, is applicable only when the received command is Read FUA where clean data is read directly from the hard disk regardless if there's a cache hit or not. Note also that if L1 cache is full, flushing of L1 cache is done before fetching from HDD can occur.

Upon completion of S2H, firmware clears cache sub-status (NOP), sends command status to host, and completes command. FIG. 16 also lists the cache state transitions when completing the data transfer from L1 cache to host. The figure details the corresponding next L1 and L2 cache states based on their current states after finishing the data transfer. Based on the figure, L1 cache and L2 cache states are retained even after the host completed reading from L1 cache (16042, 16403, 16045-16048, 16050, 16053-16055, 16057, 16059-16061, 16064, 16066-16068, and 16071). However, cache sub-state transitions to NOP after the operation.

Upon completion of F2S, firmware updates cache control block (L1 cache is now valid) and starts transfer from L1 cache to host. Sub-status is marked as S2H. FIG. 17 also lists the cache state transitions when completing the data transfer from L2 cache to L1 cache. The figure details the corresponding next L1 and L2 cache states based on their current states after finishing the data transfer. As illustrated in the figure, cache sub-state always transitions to NOP after the operation.

If current L1 cache state is invalid, its next state is set depending on the current L2 cache state and the type of L2 to L1 data transfer. If current L2 cache state is VPCD or VPCC, the L1 cache state is also set to the L2 cache state after the operation (17037 and 17044). If current L2 cache state is VFC, VFCPD, or VFD, current L1 cache state is set depending on the 2 type of L2 to L1 data transfer event—(1) entire L1 cache is filled after transferring the data from L2 cache and (2) L1 cache is not filled after the data transfer. If (1), L1 cache is set to the L2 cache state (17038, 17040, and 17042). If (2), L1 cache state is set to VPCC if current L2 cache state is VFC (17039), set to VPCD if current L2 cache state is VFCPD (17041), or set to VPCD is current L2 cache state is VFD (17043).

If current L1 cache state is VPCD, its next state is set depending on the current L2 cache state. If current L2 cache state is also VPCD, L1 cache state is set based on the 2 events described on the previous paragraph. If (1), L1 cache state is set to VFCPD (17046). If (2), L1 cache state is set to VPCD (17047). If current L2 cache state is VFCPD, L1 cache state is set based on another 2 L2 to L1 data transfer events—(1) all un-cached bytes in L1 are dirty in L2 and (2) not all un-cached bytes in L1 are dirty in L2. (1), L1 cache state is set to VFD (17049). If (2), L1 cache state is set to VFCPD (17050). For the 2 cases, L2 cache state is set to INVLD after F2S operation. If current L2 cache state is VFD, L1 cache is set based on the former 2 events—(1) entire L1 cache is filled after the operation and (2) L1 cache is not filled after the operation. If (1), L1 cache state is set to VFD (17051). If (2), L1 cache state is set to VPCD (17052). If current L2 cache state is VPCC, L1 cache state is set based also on the 2 previous events. If (1), L1 cache state is set to VFCPD (17053). If (2), L1 cache state is set to VPCD (17054).

If current L1 cache state is VPCC, its next state is set to VFCPD or VFC if current L2 cache state is VPCD or valid clean, respectively (17074 or 17076/17080) for the case when the entire L1 cache is filled after the data transfer. L1 cache state is set to VPCD or VPCC if current L1 cache state is VPCD or valid clean (17075 or 17077/17081) for the case the entire L1 cache is not filled after the data transfer.

Upon completion of HDD2S, firmware updates cache control block (L1 cache is now valid) and starts transfer from L1 cache to host. FIG. 19 also lists the cache state transitions when completing the data transfer from rotational disks to L1 cache. The figure details the corresponding next L1 and L2 cache states based on their current states after finishing the data transfer. Cache sub-state always transitions to NOP after the operation. Note that although L2 cache state is not affected since the operation only involves the L1 cache and the rotational drive, its current state affects the L1 cache succeeding cache state as listed in the figure.

If current L1 cache state is INVLD, its next state is set depending on the current L2 cache state. If current L2 cache state is INVLD, VFC, or VPCC, L1 cache state is set based on 2 events—(1) data from the hard drive did not fill the entire cache and (2) data from the hard drive filled the entire cache. If (1), L1 cache state is set to VPCC (19036, 19039, and 19043). If (2), L1 cache state is set to VFC (19037, 19040, and 19044). If current L2 cache state is VPCD, L1 cache state is set to VPCC (19038). If current L2 cache state is VFCPD, L1 cache state is set to VPCC (19041).

If current L1 cache state is VPCD and current L2 cache state is INVLD, VPCD, or VPCC, the L1 cache state is set based also on the 2 events discussed on the previous paragraph. If (1), L1 cache state is set to VPCD (19045, 19047, and 19052). If (2), L1 cache state is set to VFCPD (19046, 19048, and 19053).

If current L1 cache state is VFC or VFCPD, the state is retained after the operation (19054, 19056, 19059-19063, and 19065).

If current L1 cache state is VPCC its next state is set depending on the current L1 cache state. If current L2 cache state is INVLD, VFC, or VPCC, the L1 cache state is set based also on the 2 events discussed on a previous paragraph. If (1), L1 cache state is set to VPCC (19072, 19075, and 19079). If (2), L1 cache state is set to VFC (19073, 19076, and 19080). If current L2 cache state is VPCD, L1 cache state is set to retained (19074).

In the background, when interface is not busy, firmware initiates copying if L1 cache to L2 cache, flushing of L1 cache to rotational drives, and flushing of L2 cache to rotational drives.

Note that when the received command is Read FUA, the data is fetched from the rotational drive regardless if there is a cache hit or not. If there is, however, a cache hit for the Read FUA command and the cache is dirty, the cache is flushed to the rotational drive before the data is fetched.

Write Command

When firmware receives a Write command from the host, it derives the cache control block index (SDRAM Index) based on the host LBA. Then it checks the designated cache control block if requested LBA is in L1 cache.

If L1 cache state is invalid (INVLD) and there is no ongoing locked operation (NOP), firmware start transfer from host to L1 cache and updates cache sub-status to H2S. After completion of host2sdram transfer, firmware updates cache sub-status to NOP. If the write data uses all of the cache line space, L1 cache state becomes VFD (e.g. 15036), otherwise L1 cache state becomes VPCD (e.g. 15037). For the case when write data uses all of the L1 cache line space, the copy in L2 cache becomes INVLD (e.g. 15038).

If L1 cache state is valid (VPCD, VFC, VFCPD, VFD, VPCC), there is no ongoing locked operation (NOP), and the associated cache contains the correct set of data, firmware start transfer from host to L1 cache and updates cache sub-status to host2sdram. After completion of host2sdram transfer, firmware updates cache sub-status to NOP.

If L1 previous cache state is VPCD, there are 4 options: (1) if write data uses all of the cache line space, L1 cache state becomes VFD (e.g. 15055). (2) If write data is less than the cache line space, there's no more free cache line space, and there's no more clean cache area, L1 cache state becomes VFD (e.g. 15057). (3) If write data is less than the cache line space and there's still some free cache line space, L1 cache state becomes VPCD (e.g. 15058). (4) If write data is less than the cache line space, there's no more free cache line space, and there's still some clean cache area, L1 cache state becomes VFCPD (e.g. 15060).

If L1 previous cache state is VFC, there are 2 options: (1) if write data uses all of the cache line space, L1 cache state becomes VFD (e.g. 15080), (2) if write data is less than the cache line space, L1 cache state becomes VFCPD (e.g. 15081), since not all the cache data were over written.

If L1 previous cache state is VFCPD, there are 3 options: (1) If write data uses all of the cache line space, L1 cache state becomes VFD (e.g. 15087). (2) If write data is less than the cache line space and there's no more clean cache line space, L1 cache state becomes VFD (e.g. 15088). (3) If write data is less than the cache line space, and there's still some clean cache area, L1 cache state becomes VFCPD (e.g. 15089).

If L1 previous cache state is VFD, there is only 1 option: (1) L1 cache state remains at VFD no matter what the write data size is (e.g. 15105).

If L1 previous cache state is VPCC, there are 3 options: (1) if write data uses all of the cache line space, L1 cache state becomes VFD (e.g. 15115), (2) If write data is less than the cache line space and there's still some free cache line space, L1 cache state becomes VPCD (e.g. 15117). (3) If write data is less than the cache line space, there's no more free cache line space, and there's still some clean cache area, L1 cache state becomes VFCPD (e.g. 15116).

If L1 cache state is valid but the associated cache block does not contain the correct set of data (for the case of a directly-mapped cache), the firmware initiates freeing of that cache block. If that cache is clean, it can be freed instantly without any flush operation. But if the cache is dirty, firmware gets the associated flash physical location of data from LBA2FlashPBA table and initiates copying of data to L2 cache, which is faster than flushing to rotational drive. Then it updates sub-status to sdram2flash. However, if L2 cache is full, flushing to rotational drive will be initiated instead, and sub-status will be set to sdram2hdd. Flushing of L2 cache to rotational drives can be done in the background when firmware is not busy servicing host commands. After flushing of L1, firmware proceeds with the steps below as if data is not in L1 cache.

If data is not in L1 cache, firmware requests for available L1 cache. If there is no available L1 cache (L1 cache full), firmware selects an L1 cache victim. If the selected victim is clean, or if it is dirty but consistent with the copy in L2 cache, it is freed instantly. Otherwise, it is flushed to the rotational drive. The cache is invalidated (INVLD) and then assigned to the current command being serviced. Processing of the firmware continues as if the L1 cache state is INVLD (see discussion above).

After the L1 cache state is updated due to a host-write (H2S), L2 cache state is also updated. For the case when write data occupies only a part of the L1 cache line space and the write data did not cover all the copy in L2 cache, the copy in L2 cache becomes partially valid (VPCC, VPCD), since some parts of the L2 cache copy is invalidated (whether partially or fully dirty previously) (e.g. 15039). For the case when write data occupies only a part of the L1 cache line space and the write data covered all the copy in L2 cache, the copy in L2 cache becomes INVLD (e.g. 15038).

Upon completion of host2sdram (H2S), firmware sends command status to host and completes the command. But if the write command is of the write FUA (first unit access) type, host2sdram (H2S) and sdram2hdd (S2HDD) is done first before the command completion status is sent to the host. Once all L1 cache data is written to the HDD, L1 cache state becomes clean (VFC, VPCC) (e.g. 20060, 20042).

In the background, when interface is not busy, firmware initiates flushing of L1 cache to L2 cache, L2 cache to rotational drives, and L1 cache to rotational drives.

Flushing Algorithm

For a full-associative cache implementing a write-back policy, flushing is usually done when there is new data to be placed in cache, but the cache is full and the selected victim data to be evicted from the cache is still dirty. Flushing will clean the dirty cache and allow it to be replaced with new data.

Flushing increases access latency due to the required data transfer from L1 volatile cache to the much slower rotational drive. The addition of L2 nonvolatile cache allows faster transfers from L1 to L2 cache when the L1 cache is full, effectively postponing the flushing operation and allowing it to be more optimized.

To reduce latency and enhance the cache performance, flushing can be done as a background operation. The LRU and LFU are the usual algorithms used to identify the victim data candidates, but the addition of a Fastest-to-Flush algorithm takes advantage of the random access performance of the L2 cache. It optimizes the flushing operation by selecting dirty victim data that can be written concurrently to the L2 cache, and thus minimizing access time. The overhead brought about by flushing of cache can then be reduced by running concurrent flush operations whenever possible. Depending on processor availability, flushing may be scheduled regularly or during idle times when there are no data transfers between the hybrid storage system and the host or external device.

Flushing of L1 Cache

Flushing of L1 cache will occur only if copy of data in L1 cache is more updated than the copy in the rotational drive. This may occur, for example, when a non FUA write command hits the L1 cache.

Flushing of L1 cache is triggered by the following conditions:

1. Eviction caused by shared cache line—In set-associative or directly-mapped caching mode, if the cache or cache set assigned to a specific address is valid but contains another data, that old data must be evicted to give way to the new data that needs to be cached. If the old data is clean, the cache is simply overwritten. If the old data is dirty, the cache is flushed first before writing the new data.

2. L1 cache is full—If an IO command being processed could not request for a cache due to a cache-full condition, a victim must be selected to give way to the current command. If the victim data is clean, the cache is simply overwritten. If the victim data is dirty, the cache is flushed first before writing the new data.

In either (1) or (2), the victim data will be moved to either L2 cache or rotational drive. Ideally in this case, firmware will move L1 cache data to L2 cache first, since movement to L2 cache is faster. Refer to "Movement from L1 Cache to L2 Cache" for a detailed discussion. In case the L2 Cache is full, firmware will have to move L1 cache data to the rotational drive.

3. Interface is not busy—Flushing may also be done in the background when drive is not busy servicing host commands. L1 cache is flushed directly to the rotational drive first, then if number of available L1 caches has reached a pre-defined threshold, data is also copied to L2 cache, in anticipation for more flushing due to L1 cache full condition. Refer to "Movement from L1 Cache to L2 Cache" for a detailed discussion.

When moving data from L1 cache to rotational drive, the firmware takes advantage of concurrent drive operations by selecting cache lines that can be flushed in parallel among the least recently used candidates. The firmware also takes into consideration the resulting access type to the destination drives. The firmware queues the request according to the values of the destination addresses such that the resulting access is a sequential type.

Before firmware can initiate the flushing operation from L1 cache to rotational drive, it must check first if there is an ongoing locked cache operation. If there is an ongoing locked cache operation, the firmware will have to wait until the operation is finished before initiating the data transfer. When the current cache sub-state finally becomes NOP, it will be changed back to S2HDD and the L1 cache flushing will start. This change in cache sub-state indicates a new locked cache operation. After the L1 cache is flushed, cache sub-state goes back to NOP to indicate that the cache is ready for another operation.

FIG. 20 lists the valid combinations of L1 and L2 cache states and cache sub-state values that will allow data transfers from L1 cache to rotational drive. It also shows the resulting cache states and cache sub-state values when an L1 cache to rotational drive data transfer is initiated, and when it is completed. The L1 cache to rotational drive data transfer may be initiated by an L1 cache flushing operation or write FUA operation. The succeeding discussion will focus on the L1 cache flushing operation.

The L1 cache flushing operation may be initiated only for valid but dirty L1 cache states—either VPCD (rows 2006, 2007, 2009, 20011), VFCPD (rows 20018, 20019, 20021, 20023) or VFD (rows 20024, 20025, 20028). Upon completion of the flushing operation, the L1 cache is declared clean. If the flushing operation was not completed, the cache page bitmap is updated to reflect the dirty bytes that were cleaned. The L2 cache state and cache page bitmap are also updated accordingly.

In the first case 2006 L1 cache state is VPCD and L2 cache state is INVLD. An example case is when the partially cached data in L1 was updated by a write operation and is now inconsistent with the data in the rotational drive, but there is no copy yet in the L2 cache. If all the dirty data are flushed 20042, L1 cache state is changed to VPCC to indicate that the partially cached data is now consistent with data in the rotational drive. However if not all dirty bytes were flushed 20043, L1 cache state stays at VPCD, with the cache page bitmap updated to reflect the dirty bytes that were cleaned. L2 cache state stays INVLD.

In the second case 2007 both L1 and L2 cache state is VPCD. An example case is when the partially cached dirty data in L1 was initially evicted to L2, then a cache miss happens and data is partially cached in L1. L1 was then updated by a write operation. This will also occur when the partially cached dirty data in L1 was initially evicted to L2, then an L2 cache hit occurs and L2 data is copied back to L1. L1 and L2 can have the same data, but they can also have different data if the L1 cache is subsequently updated by a write operation. If L1 and L2 have the same data and all the dirty data are flushed 20044, both L1 and L2 cache states are changed to VPCC to indicate that the partially cached data is now consistent with data in the rotational drive. If L1 and L2 have the same data but not all dirty bytes in L1 were flushed 20045, L1 and L2 cache state stays at VPCD, with the cache page bitmap updated to reflect which pages were cleaned. If L1 and L2 have different data and all the dirty data are flushed 20046, L1 cache state is changed to VPCC to indicate that the partially cached data is now consistent with data in the rotational drive. Since L2 cache contains different data, L2 cache state stays at VPCD. If L1 and L2 have different data and not all dirty bytes were flushed 20047, L1 cache state stays at VPCD but the cache page bitmap is updated to reflect which dirty bytes were cleaned. Since L2 cache contains different data, L2 cache state stays at VPCD.

In the third case 2009, L1 cache state is VPCD and L2 cache state is VFCPD. An example case is when the fully cached dirty data in L1 was initially evicted to L2, then an L2 cache hit occurs and some L2 cache data is copied back to L1. L1 dirty data can initially be the same as L2 dirty data, but they can have different dirty data if the L1 cache is subsequently updated by a write operation. If all the dirty data in L1 and L2 are flushed 20049, L1 cache state is changed to VPCC and L2 cache state is changed to VFC to indicate that cached data in both locations are now consistent with data in the rotational drive. If not all dirty bytes in L1 were flushed 20050, L1 cache state stays at VPCD and L2 cache state stays at VFCPD with the cache page bitmap updated to reflect which dirty bytes were cleaned. If all dirty bytes in L1 were flushed but does not cover all the dirty bytes in L2 20051, only the L1 cache state is changed to VPCC. L2 cache state stays at VFCPD with cache page bitmap updated to reflect which dirty bytes were cleaned.

In the fourth case 20011, L1 cache state is VPCD and L2 cache state is VPCC. An example case is when clean, partially cached data in L1 was initially evicted to L2, then an L2 cache hit occurs, L2 cache data is copied back to L1 and a subsequent write operation updated the data in L1 cache. This will also occur when a cache miss occurs, data is partially cached in L1, and a subsequent write operation updated the data in L1 cache. If all the dirty data are flushed 20053, L1 cache state is changed to VPCC to indicate that the partially cached data is now consistent with data in the rotational drive. However if not all dirty bytes were flushed 20054, L1 cache state stays at VPCD with the cache page bitmap updated to reflect which dirty bytes were cleaned. In both cases, L2 cache state stays at VPCC since it is not affected by the L1 cache flushing operation.

In the fifth case 20018, L1 cache state is VFCPD and L2 cache state is INVLD. An example case is when fully cached data in L1 is updated by a write operation and is now inconsistent with the data in the rotational drive, but there is no copy yet in the L2 cache. If all the dirty data are flushed 20061, L1 cache state is changed to VFC to indicate that the fully cached data is now consistent with data in the rotational drive. If not all dirty bytes were flushed 20062, L1 cache state stays at VFCPD with the cache page bitmap updated to reflect which dirty bytes were cleaned. L2 cache state stays INVLD.

In the sixth case 20019, L1 cache state is VFCPD and L2 cache state is VPCD. An example case is when partially cached dirty data in L1 was initially evicted to L2, then an L2 cache hit occurs, L2 cache data is copied back to L1, and another read operation completes the cache line. A subsequent write operation may also add more dirty bytes in L1. If all dirty bytes in L1 and L2 were flushed 20063, L1 cache state is changed to VFC and L2 cache state is changed to VPCC to indicate that the fully cached data is now consistent with the data in the rotational drive. If all dirty bytes in L1 were flushed but does not cover all dirty bytes in L2 20064, L1 cache state is changed to VFC but L2 cache state stays at VPCD with the cache page bitmap updated to reflect which dirty bytes were cleaned. If not all dirty bytes were flushed 20065, L1 cache state stays at VFCPD and L2 cache state stays at VPCD with the cache page bitmap updated to reflect which dirty bytes were cleaned.

In the seventh case 20021, both L1 and L2 cache state is VFCPD. An example case is when fully cached partially dirty data in L1 was initially evicted to L2, and then an L2 cache hit occurs, L2 cache data is copied back to L1. If all the dirty data are flushed 20066, both L1 and L2 cache states are changed to VFC to indicate that the fully cached data is now consistent with the data in the rotational drive. If not all dirty bytes were flushed 20066, L1 and L2 cache state becomes VPCD, with the cache page bitmap updated to reflect the dirty bytes that were cleaned.

In the eighth case 20023, L1 cache state is VFCPD and L2 cache state is VPCC. An example case is when clean partially cached was initially evicted to L2, then a read operation completed the L1 cache, and a subsequent write operation made the L1 cache partially dirty. If all the dirty data are flushed 20069, the L1 cache state becomes VFC to indicate that the fully cached data is now consistent with the data in the rotational drive. If not all the dirty data are flushed 20070, L1 cache state becomes VPCD, with the cache page bitmap updated to reflect the dirty bytes that were cleaned. L2 cache state stays at VPCC.

In the ninth case 20024, L1 cache state is VFD and L2 cache state is INVLD. An example case is when the fully cached data in L1 becomes fully inconsistent with the rotational drive due to a write operation, but there is no copy yet in the L2 cache. If all the dirty data are flushed 20071, the L1 cache state becomes VFC to indicate that the fully cached data is now consistent with the data in the rotational drive. If not all the dirty data are flushed 20072, L1 cache state becomes VPCD, with the cache page bitmap updated to reflect the dirty bytes that were cleaned. Since L2 is not involved in the flushing operation, L2 cache state stays INVLD.

In the tenth case 20025, L1 cache state is VFD and L2 cache state is VPCD. An example case is when partially cached dirty data was initially evicted to L2, and a subsequent write operation made the L1 cache completely dirty. If all the dirty data are flushed 20073, the L1 cache state becomes VFC to and the L2 cache state becomes VPCC to indicate that cached data is now consistent with the data in the rotational drive. If not all the dirty cache data were flushed 20074 20075, L1 cache state becomes VPCD, with the cache page bitmap updated to reflect the dirty bytes that were cleaned. If the L1 flushing operation did not cover all L2 dirty data 20075, L2 cache state stays at VPCD, with the cache page bitmap updated to reflect the dirty bytes that were cleaned. Otherwise if the L1 flushing operation covered all L2 dirty data 20074, L2 cache state becomes VPCC.

In the eleventh case 20028, both L1 cache state is VFD. An example case is when full dirty data was initially evicted to L2, and then an L2 cache hit occurs, L2 cache data is copied back to L1. If all the dirty data are flushed 20078, L1 and L2 cache state becomes VFC to indicate that the fully cached data is now consistent with the data in the rotational drive. If not all the dirty data are flushed 20079, L1 and L2 cache state becomes VPCD, with the cache page bitmap updated to reflect the dirty bytes that were cleaned.

Criteria for Choosing L1 Cache Victims

1. LRU—Least Recently Used data is most likely to be invalidated first than more recently used ones.
2. Fastest to Flush—Groups of data that can be flushed to rotational drives concurrently, and will form sequential type of accesses to rotational drives will be prioritized. In moving data from L1 to L2 cache, groups of data that can be moved to L2 cache concurrently will be prioritized.

Flushing of L2 Cache

Flushing of L2 cache will occur only if copy of data in L2 cache is more updated than the copy in the rotational drive, and the copy in L1 cache has been invalidated already. This may occur for example when dirty data has been evicted from the L1 cache and the firmware transferred it to the faster L2 cache instead of the rotational drive.

In moving data from L2 cache to rotational drive the firmware will take advantage of the data distribution among the flash chips and among the rotational drives to maximize parallelism.

Figure 13:
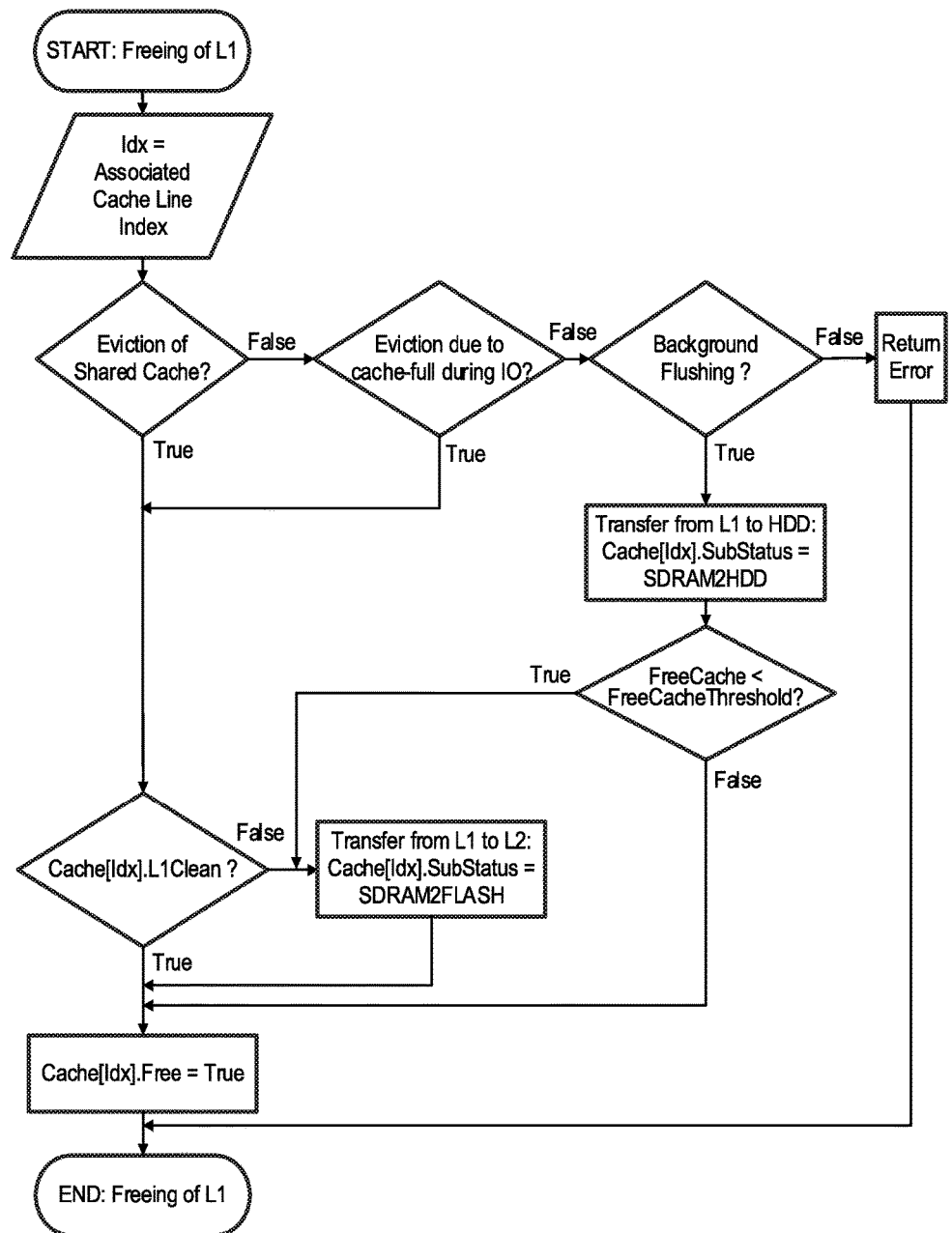
FIG. 13 shows a process flow for freeing L1 cache according to an embodiment of the present invention.

Rather than deciding plainly based on the LRU algorithm, firmware will take into consideration the source and target physical locations of the data that needs to be moved from flash to rotational drive. As shown in FIG. 13, moving data from L2 cache to rotational drive can be optimized by taking into account which data can be flushed to rotational drive concurrently.

Similarly, the firmware also takes advantage of the speed of rotational drives in sequential access. Therefore, data movements are queued in such a way that writing them to the rotational drives will be more in the form of sequential accesses rather than random.

Flushing of the L2 cache consists of a two-step data transfer: transfer from L2 to L1, and transfer from L1 to rotational drive.

FIG. 17 lists the valid combinations of L1 and L2 cache states and cache sub-state values that will allow data transfers from L2 cache to L1 cache. It also shows the resulting cache states and cache sub-state values when an L2 cache to L1 cache data transfer is initiated, and when it is completed. The L2 cache to L1 cache data transfer may be initiated by an L2 cache flushing operation or an L2 cache hit. The succeeding discussion focuses on the data transfer due to an L2 cache flushing operation.

A flushing operation is only done when L2 cache is dirty (L2 cache state is VPCD, VFCD or VFD) and the dirty bytes in L2 cache does not correspond to the dirty bytes in the L1 cache. Upon completion of the L2 cache to L1 cache transfer of dirty data, the L1 cache will contain all dirty bytes in L2 cache. The flushing operation is then completed by an L1 to rotational drive transfer. The succeeding discussion focuses on the L2 cache to L1 cache data transfer due to an L2 cache flushing operation. See the section "Flushing of L1 cache" for the detailed discussion of the L1 cache to rotational drive data transfer.

Before firmware can initiate the flushing operation by transferring data from L2 cache to L1 cache, it must check first if there is an ongoing locked cache operation. If there is an ongoing locked cache operation, the firmware will have to wait until the operation is finished before initiating the data transfer. When the current cache sub-state finally becomes NOP, it will be changed back to F2S and the L2 cache flushing will be initiated. This change in cache sub-state indicates a new locked cache operation. After the L2 cache to L1 cache data transfer is completed, cache sub-state goes back to NOP to indicate that the cache is ready for another operation.

In the first case 17001, L2 cache state is VPCD and L1 cache state is INVLD. An example case is when partially cached dirty data in L1 was evicted to L2. After dirty data in L2 is transferred to L1, L1 cache state is changed to VPCD 17037, with the cache page bitmap updated to reflect the new dirty bytes in L1. L2 cache state stays at VPCD.

In the second case 17003, L2 cache state is VFCPD and L1 cache state is INVLD. An example case is when fully cached partially dirty data in L1 was evicted to L2. After dirty data in L2 is transferred to L1, L1 cache state is changed to VPCD 17041, with the cache page bitmap updated to reflect the new dirty bytes in L1. L2 cache state stays at VFCPD.

In the third case 17004, L2 cache state is VFD and L1 cache state is INVLD. An example case is when full dirty data in L1 was evicted to L2. After all dirty data in L2 is transferred to L1; L1 cache state is changed to VFD 17042. If not all dirty data in L2 is transferred to L1, L1 cache state is changed to VPCD 17041, with the cache page bitmap updated to reflect the new dirty bytes in L1. L2 cache state stays at VPCD.

In the fourth case 17007, both L1 and L2 cache states are VPCD. An example case is when the partially cached dirty data in L1 was initially evicted to L2, then a cache miss happens and data is partially cached in L1. L1 was then updated by a write operation. This results in some dirty data in L2 that is not present in L1. After dirty data in L2 is transferred to L1, L1 cache state is still VPCD 17047, with the cache page bitmap updated to reflect the new dirty bytes in L1. L2 cache state stays at VPCD.

In the fifth case 17009, L2 cache state is VFCPD and L1 cache state is VPCD. An example case is when fully cached partially dirty data in L1 was initially evicted to L2, and then a subsequent write operation created dirty bytes in L1 that is not on L2. After dirty data transferred from L1 to L2 completes the L1 cache line, L1 cache state becomes VFD 17049. If the L1 cache line is not completed, L1 cache state becomes VFCPD 17050. L2 cache state becomes INVLD in both cases.

In the sixth case 17010, L2 cache state is VFD and L1 cache state is VPCD. An example case is when full dirty data in L1 was initially evicted to L2, and then a subsequent write operation created dirty bytes in L1 that is not on L2. After dirty data transferred from L1 to L2 completes the L1 cache line, L1 cache state becomes VFD 17051. If the L1 cache line is not completed, L1 cache state becomes VFCPD 17051. The cache page bitmap updated to reflect the new dirty bytes in L1. L2 cache state remains VFD in both cases.

In the seventh case 17031, L2 cache state is VPCD and L1 cache state is VPCC. An example case is when partially cached dirty data in L1 was initially evicted to L2, and a cache miss occurs during a read operation. After dirty data transferred from L1 to L2 completes the L1 cache line, L1 cache state becomes VFCPD 17074. If the L1 cache line is not completed, L1 cache state becomes VPCD 17075. The cache page bitmap updated to reflect the new dirty bytes in L1. L2 cache state remains VCPD in both cases.

Criteria for Choosing L2 Cache Victims

1. LRU—Least Recently Used data is most likely to be invalidated first than more recently used ones.

2. Fastest to Fetch—Groups of data that can be fetched from flash devices concurrently therefore requiring less time will be prioritized.

3. Fastest to Flush—Groups of data that can be flushed to rotational drives concurrently, and will form sequential type of accesses to rotational drives will be prioritized.

Figure 14:
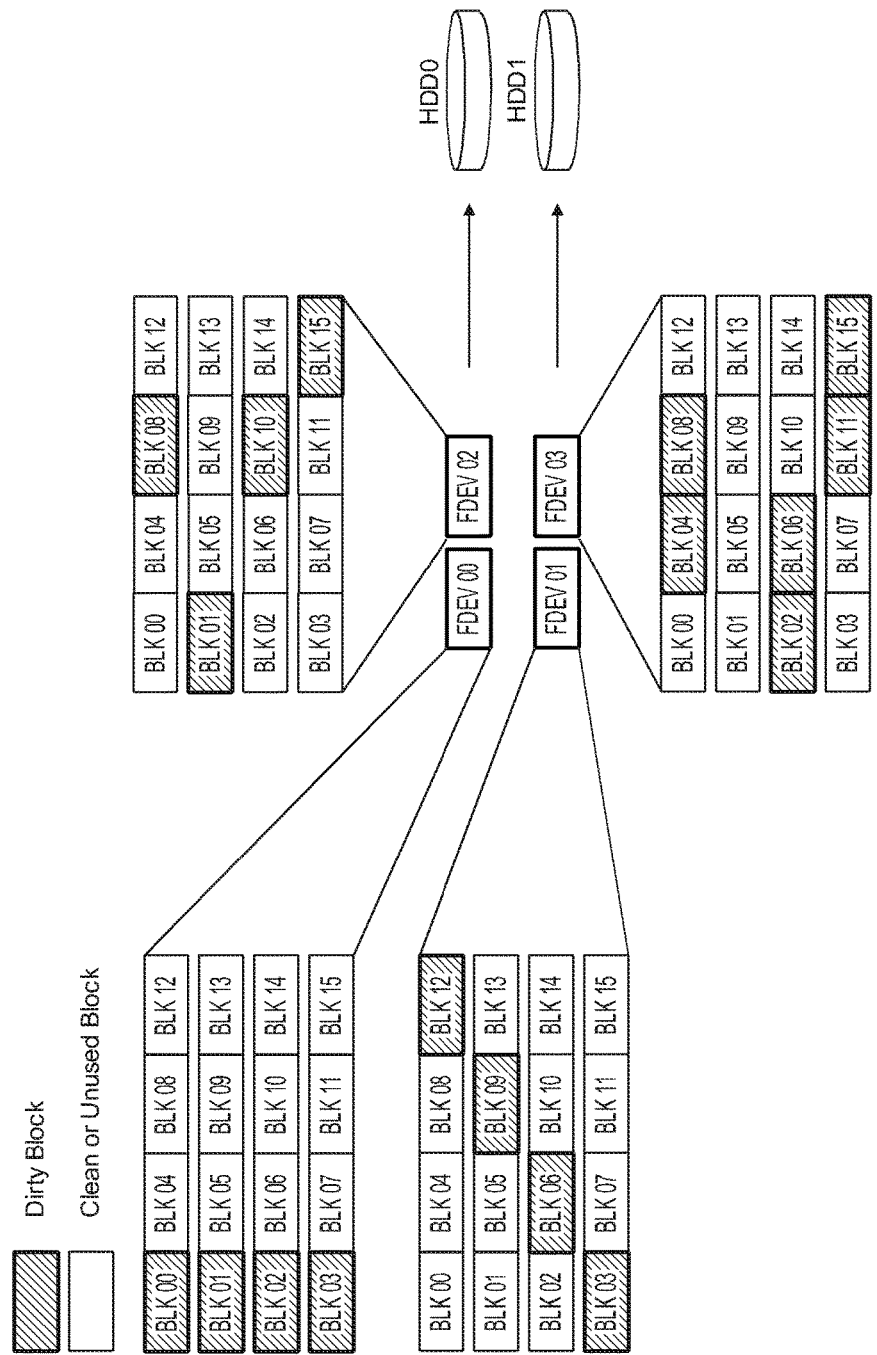
FIG. 14 shows a diagram illustrating optimized fetching of data from L2 and flushing to HDD according to an embodiment of the present invention.

The drawing in FIG. 14 shows an example scenario where four flash devices all have dirty blocks that need to be flushed to the two rotational drives. The following are the steps to flush the dirty L2 cache blocks to the rotational drives using the "Fastest to fetch" and "Fastest to flush" criteria.

1. Allocate resources for the maximum number of flash DMA engines that could simultaneously transfer data from flash to SDRAM, given the list of dirty blocks.

2. Among the groups of data that can be fetched simultaneously from flash, choose the blocks that are sequentially closer in the rotational drives. Start transferring data from flash to SDRAM. Activate as many concurrent operations as possible.

3. When a transfer has completed, start moving data from SDRAM to rotational drives.

For example, if FLASH2SDRAM transfer of FDEV01: BLK03, FDEV02:BLK01, and FDEV03:BLK02 completed already, start SDRAM2HDD movement of FDEV01: BLK03 and FDEV02:BLK01 first since they are going to separate rotational drives. We selected FDEV01:BLK03 over FDEV03:BLK02 because FDEV01:BLK03's location in HDD1 is sequentially lower than FDEV03:BLK02's location, therefore achieving greater potential for sequential type of access. Keep doing these every time a transfer from flash to SDRAM completes.

Movement from L1 Cache to L2 Cache

Once the actual amount of storage being used by the application has grown considerably, the chances of L1 cache hits will be lesser and the chances of L1 cache being full will be greater. This is the case where the presence of data in L2 cache can significantly improve the performance of the system. When the firmware detects that the percentage of used L1 cache has reached a pre-defined threshold, it starts copying data to L2 cache in the background during idle times. The more data there is in the L2 cache, the lesser chances that the firmware will have to access data in the rotational drives.

If directly-mapped L1 caching scheme is used, it is possible that only a small percentage of available L1 is being utilized, and some of the frequently accessed data blocks are mapped to the same L1 cache entry, therefore requiring frequent eviction of those associated cache blocks. In such situations, it will also be helpful if those frequently accessed and frequently evicted data are stored in L2 cache for faster access. A method to identify these blocks of data is to keep track of the data access counts. If the access count of a block belonging to the LRU list reaches a pre-defined threshold, the firmware will copy it to L2 cache. This method is a combination of the LRU and LFU (Least-Frequently Used) algorithm, which implies that the most recently used and most frequently used data, should be prioritized by the caching scheme.

In moving data from L1 cache to L2 cache, the firmware takes advantage of concurrent flash device operations by selecting cache lines that can be flushed in parallel among the candidates.

As stated earlier the L1 cache to L2 cache data movement is initiated by two possible conditions. First, this operation is initiated during host read or writes to data that is not cached in the L1 cache, specifically during an L1 cache full condition. In this case, an L1 entry should be freed and the firmware determines that the associated data should be transferred to the L2 cache. The motivation for opting to transfer first to the L2 cache instead of flushing back to the HDD in this situation is that L1 to L2 transfers can be performed faster. Completing the transfer faster will allow quicker freeing of L1 space and improve response time to the host read or write request. The second event that triggers the L1 cache to L2 cache data movement is when it is initiated by the background process that maintains the threshold for the minimum number of available L1 cache lines and the firmware determines that the associated data should be transferred to the L2 cache. The motivation for opting to transfer first to the L2 cache instead of flushing back to the HDD in this situation is if the associated data is among the most frequently accessed data, but less recently used than other such data. This avoids the cache full condition but since the data is still frequently used, it is preferable to keep a copy in the L2 cache so it can be retrieved faster.

For both conditions, the operation commences with the selection of L1 cache lines that will next be transferred to the L2 cache. The selection categories shall be applied only to those cache line information table entries that have NOP sub-state or those that are not undergoing any other data movement. They shall also only be applied if the cache state table entry specifies that the data in the L1 cache is a more updated copy than that in the L2 cache or that the data is cached only in L1. Hence, there are eleven possible initial cache states for table entries in the cache line information table that will proceed with L1 to L2 transfer.

In the first case 18012, the selected entry's L1 cache state is VFC and its L2 cache state is INVLD. This occurs if the data in the L1 cache had already been flushed to the HDD but there is no copy in L2 cache. To indicate that L1 is being copied to L2, the cache sub-state will be changed from NOP to S2F. Upon successful completion of the data transfer 18050, the L2 copy is now consistent with the L1 copy and the L2 cache state will be changed to VFC also. The cache sub-state will return to NOP to indicate that the data is no longer in transit. The firmware may now opt to free the L1 space for use by other entries and set the L1 cache state to invalid.

In the second case 18006, the selected entry's L1 cache state is VPCD and its L2 cache state is INVLD. In this case the data copy in L1 has had updates in some parts and is now inconsistent with the data counterpart in the HDD, but there is no copy yet in the L2. To indicate that L1 is being copied to L2, the cache sub-state will be changed from NOP to S2F. Upon successful completion of the data transfer 18042, the L2 copy is now consistent with the L1 copy and the L2 cache state will be changed to VPCD also. The cache sub-date will return to NOP to indicate that the data is no longer in transit. The firmware may now opt to free the L1 space for use by other entries and set the L1 cache state to invalid.

In the third case 18007, the selected entry's L1 cache state is VPCD and its L2 cache state is also VPCD. This occurs when a partially dirty data exists in both L2 and L1 but they are not exactly the same parts so that data in L1 is not consistent with data in L2. To indicate that the updated data parts in L1 is being copied to the L2 cache the cache sub-state will be changed from NOP to S2F. Upon successful completion of the data transfer 18043, the L2 copy now also contains the updates from the L1 copy. If the updates fill up all unfilled bytes in the L2 cache then the L2 cache state is changed to VFD. If not the L2 cache state is still to VPCD but the L2 cache contains the complete copy of the dirty bytes. The cache sub-state will return to NOP to indicate that the data is no longer in transit. The firmware may now opt to free the L1 space for use by other entries and set the L1 cache state to invalid.

In the fourth case 18011, the selected entry's L1 cache state is VPCD and its L2 cache state is VPCC. This occurs when partial data is cached in L1 and some or all those data is dirty. Partial data is also cached in L2 but the data in L2 is consistent with that in the HDD. Hence all the updated parts in L1 are not yet in L2. To indicate that L1 is being copied to L2, the cache sub-state will be changed from NOP to S2F. Upon successful completion of the data transfer 18048, the L2 copy now also contains the updates from the L1 copy. If the updates fill up all unfilled bytes in the L2 cache then the L2 cache state is changed to VFCPD since the L2 had formerly clean bytes but was filled up with some dirty bytes from L1. If the updates do not fill up the L2 cache, the L2 cache state is still to VPCD but the L2 cache contains the complete copy of the dirty bytes. The cache sub-state will return to NOP to indicate that the data is no longer in transit. The firmware may now opt to free the L1 space for use by other entries and set the L1 cache state to invalid.

In the fifth case 18018, the selected entry's L1 cache state is VFCPD and its L2 cache state is INVLD. In this case the data is fully cached in L1 but has had updates in some parts and is now inconsistent with the data counterpart in the HDD. There is no valid copy in the L2 cache. To indicate that L1 is being copied to L2, the cache sub-state will be changed from NOP to S2F. Upon successful completion of the data transfer 18056, the L2 copy is now consistent with the L1 copy and the L2 cache state will be changed to VFCPD also. The cache sub-date will return to NOP to indicate that the data is no longer in transit. The firmware may now opt to free the L1 space for use by other entries and set the L1 cache state to invalid.

In the sixth 18019, the selected entry's L1 cache state is VFCPD and the L2 cache state is VPCD. In this case the data is fully cached in L1 but has had updates in some parts. The data is not fully cached in L2 but the some parts in the L2 data are updated. Some or all of the updated data parts in L2 are not in L1. To indicate that the inconsistent data parts are being copied to L2, the cache sub-state is changed from NOP to S2F. Upon successful completion of the data transfer 18057, the L2 copy is now consistent with the L1 copy and the L2 cache state will be changed to VFCPD also. The cache sub-date will return to NOP to indicate that the data is no longer in transit. The firmware may now opt to free the L1 space for use by other entries and set the L1 cache state to invalid.

In the seventh case 18023, the selected entry's L1 cache state is VFCPD and the L2 cache state is VPCC. The data is fully cached in L1 but has had updates in some parts. The data is not fully cached in L2 but all data in the L2 cache are clean. To indicate that the inconsistent data parts are being copied to L2, the cache sub-state is changed from NOP to S2F. Upon successful completion of the data transfer 18061, the L2 copy is now consistent with the L1 copy and the L2 cache state will be changed to VFCPD also. The cache sub-date will return to NOP to indicate that the data is no longer in transit. The firmware may now opt to free the L1 space for use by other entries and set the L1 cache state to invalid.

In the eighth case 18030, the L1 cache state is VPCC and the L2 cache state is INVLD. In this case the data is fully cached in L1 but has had updates in some parts and is now inconsistent with the data counterpart in the HDD. There is no valid copy in the L2 cache. To indicate that L1 is being copied to L2, the cache sub-state will be changed from NOP to S2F. Upon successful completion of the data transfer 18056, the L2 copy is now consistent with the L1 copy and the L2 cache state will be changed to VFCPD also. The cache sub-date will return to NOP to indicate that the data is no longer in transit. The firmware may now opt to free the L1 space for use by other entries and set the L1 cache state to invalid.

In the ninth 18031 the selected entry's L1 cache state is VPCC and the L2 cache state is VPCD. In this case the data is partially cached in L1 and the copy is clean. The data is also not fully cached in L2 but some or all parts in the L2 data are updated. To indicate that the data in L1 but not in L2 are being copied to L2, the cache sub-state is changed from NOP to S2F. Upon successful completion of the data transfer, if the updates from L1 did not fill all unfilled bytes in L2, then L2 state will remain at VPCD. If the updates fill up all unfilled bytes in L2 then L2 state will change to VFCPD. The cache sub-date will return to NOP to indicate that the data is no longer in transit. The firmware may now opt to free the L1 space for use by other entries and set the L1 cache state to invalid.

In the tenth case 18035, the selected entry's L1 cache state is VPCC and the L2 cache state is also VPCC. This means the data is not fully cached in both L1 and L2 but they contain different data and the data in both caches are clean. To indicate that the data parts in L1 are being copied to L2, the cache sub-state is changed from NOP to S2F. Upon successful completion of data transfer 18073, if updates from L1 did not fill all unfilled bytes in L2, then L2 state will remain at VPCC. If the updates fill up all unfilled bytes in L2 then L2 state will change to VFC. The cache sub-date will return to NOP to indicate that the data is no longer in transit. The firmware may now opt to free the L1 space for use by other entries and set the L1 cache state to invalid.

In the eleventh case 18024, the L1 cache state is VFD and the L2 cache state is INVLD. This occurs when the data counterpart in the HDD was entirely updated in L1 cache but there is no copy yet in the L2 cache or that there is a copy in the L2 but it was invalidated because the data was entirely replaced. To indicate that the data in L1 is being copied to the L2 cache, the cache sub-state will be changed from NOP to S2F. Upon successful completion of the data transfer 18062, the L2 copy is now consistent with the L1 copy and the L2 cache state is changed to VFD also. The cache sub-state will return to NOP to indicate that the data is no longer in transit. The firmware may now opt to free the L1 space for use by other entries and set the L1 cache state to invalid.

In all cases during the state when the data is in transit from L1 to L2, i.e. the cache sub-state is S2F; any request from the host to update the data can still be accepted by aborting the pending L1 to L2 data transfers. To indicate that the data from the host is being accepted, the cache sub-state will be changed from S2F to H2S. If the host updated the data in L1 entirely, then after accepting the data the L1 cache state will be VFD and L2 cache state will be invalidated. If the host did not update the data in L1 entirely but any of those already data transferred to the L2 cache were among those updated, then L2 cache state will also be invalidated and L1 cache state will be VFCPD or VPCD. The sub-state can be changed from H2S to NOP after accepting the update to indicate that there is no more data transfer going on. If the firmware still opts to make a copy of the data in L2 cache, the it will have to re-initiate the L1 to L2 data movement operation with the L2 cache state initially INVLD and with L1 cache state VFD (case 11 18024) or VFCPD (case 5 18018) or VPCD (case 2 18006). If the host updated those data parts in L1 that have not been transferred to L2 cache and those data parts that have been copied to L2 were untouched, then the pending L1 to L2 transfers can actually proceed using the more updated data parts in L1. The sub-state can be changed from H2S back to S2F and proceed with the previously aborted L1 to L2 transfer. As much as possible, the firmware avoids the situation where an L1 to L2 transfer gets aborted by selecting least recently used entries for this transfer. This lessens the probability that the host will update that particular data.

Read Buffering

In some applications such as video streaming, storage accesses are typically large sequential reads. In such cases, it is more efficient to allocate a certain amount of high-speed buffer that can be used to store data from the flash media or the rotating drives for immediate forwarding to the host through the host IO interface. Every time the host issues a read command, the firmware checks if the data is in L1. If not, it checks if data is in L2. If data is in L2, the firmware fetches it and stores it to the high-speed buffer and immediately transfers it to the host. If data is not in L2, the firmware fetches it from the rotating drives, stores it to the buffer, and forwards it to the host. This scheme further improves performance by creating a dependency link between the DMA controllers, such that the completion of a specific data transfer (e.g. flash to buffer) may trigger the start of another data transfer (e.g. buffer to host), without intervention from the local processors.

In FIG. 1, the Read Buffering scheme can be implemented using the internal SRAM 114 which has a dedicated data link to the flash interface 108 and the other IO interfaces 106 and 107. Here, the SRAM 114 can be used as the high-speed buffer for moving data from flash 109 to host 112 or from rotating drives 105 to host 112.

Power-Loss Data Recovery

For hybrid devices equipped with back-up power such as those illustrated in FIG. 2 to FIG. 9 of U.S. Pat. No. 7,613,876, entitled "Hybrid Multi-Tiered Caching Storage System", the non-volatile L2 cache will serve as temporary storage for dirty data that haven't been flushed to the hard drives at the instant the power loss occurred. The limitations in the speed of a hard drive and its high power requirement makes it impractical to provide a back-up power supply capable of keeping the device alive while flushing all dirty data from L1 and L2 to the hard drives. The flash-based L2 requires less power and allows faster saving of data due to its capability to execute simultaneous operations on multiple flash devices.

Figure 21A:
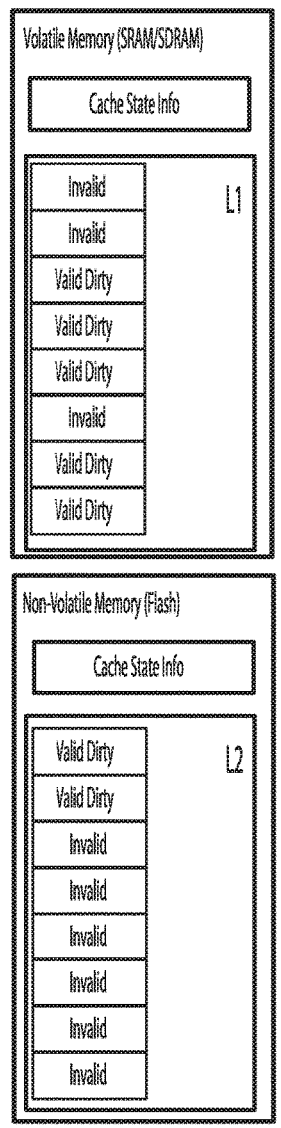
FIG. 21A shows an example initial state of L1 and L2 during normal operation before a power loss occurs.
Figure 21B:
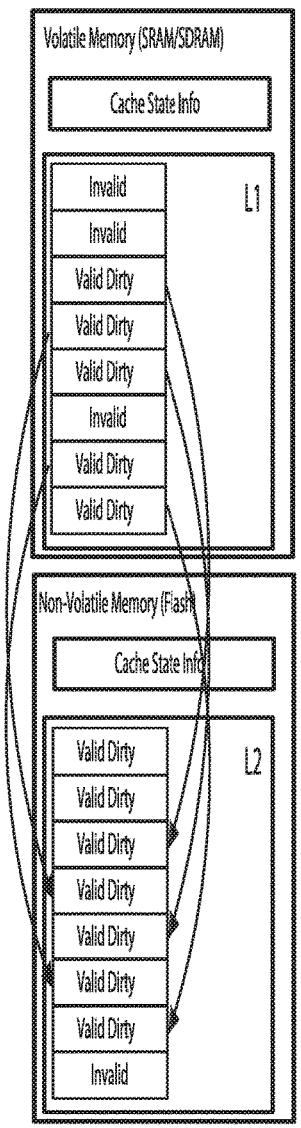
FIG. 21B illustrates the step of flushing valid dirty data from L1 to L2 upon detection of external power loss, using a backup power source.
Figure 21C:
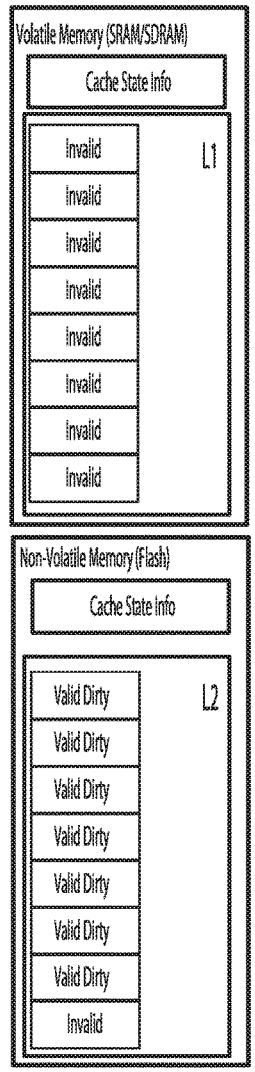
FIG. 21C shows the state of L1 and L2 before the backup power source is completely used up.
Figure 21D:
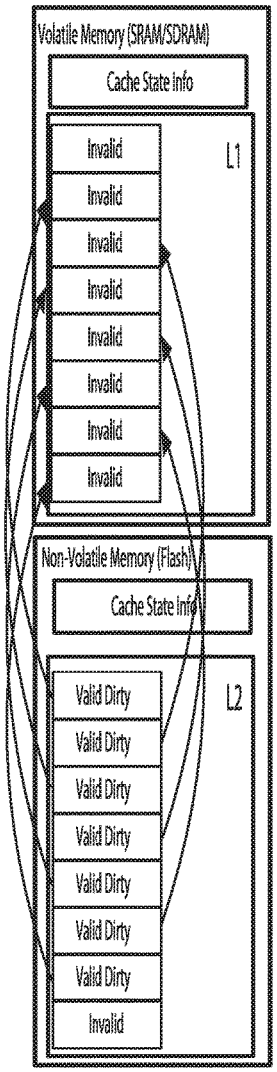
FIG. 21D shows the state of L1 and L2 upon next boot-up coming from an external power interruption. It also shows the step of copying valid dirty data from L2 to L1 in preparation for flushing to rotational drives or transferring to host.
Figure 21E:
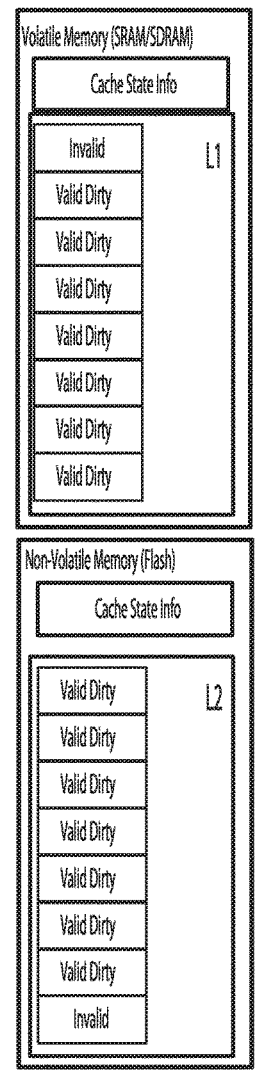
FIG. 21E shows the state of L1 and L2 after the valid dirty data from L2 have been copied to L1.

FIG. 21a shows an example state of L1 and L2 during normal IO operations, before an external power loss occurs. When the firmware detects the loss of external power, any dirty copies of data in L1 will be moved to L2 and the corresponding cache line information indicating the validity of the copy in L2 will be saved to non-volatile memory accordingly as shown in FIG. 21b and FIG. 21c. Similarly, dirty data in L2 that has no copy in L1 will be kept in L2 and the corresponding cache line information will be saved also. The firmware assumes that the back-up power supply has enough charge to allow completion of data transfer operations from L1 to L2. When external power resumes, the device can proceed to its normal boot-up sequence since the state of all data had been saved in the cache line information. When the host tries to read data whose latest copy is still in L2 after the previous power interruption, the firmware will read the corresponding cache line information from non-volatile memory and find out that L2 cache is dirty as shown in FIG. 21d. For example, if the L2 cache is full dirty and host is trying to read the entire cache line, the firmware will copy the data from L2 to L1 (17042) and give that copy in L1 to the host (16064). If the host sends a Read FUA command instead of a normal Read command, the firmware will fetch the data from L2 to L1 (17042), flush it from L1 to hard drive (20078), and finally read the copy in the hard drive that has just been updated and send it to host (19056 followed by 16050).

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless.

It is also within the scope of the present invention to implement a program or code that can be stored in a machine-readable or computer-readable medium to permit a computer to perform any of the inventive techniques described above, or a program or code that can be stored in an article of manufacture that includes a computer readable medium on which computer-readable instructions for carrying out embodiments of the inventive techniques are stored. Other variations and modifications of the above-described embodiments and methods are possible in light of the teaching discussed herein.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

We claim:

1. A data storage apparatus, comprising:
a first cache for storing data, wherein the first cache comprises volatile memory;
a second cache for storing data, the second cache being in communication with the first cache, wherein the second cache comprises non-volatile memory including a plurality of flash memory devices;
one or more host interface controllers for communicating between the first cache and one or more external host systems;
a first group of IO interface DMA controllers for communicating between the first cache and a plurality of external rotational disk drives; and
a first flash interface DMA controller for communicating between the second cache and the first cache;
wherein the data storage apparatus is configured to perform operations comprising:
storing data in the first cache;
storing data in the second cache; and
performing data transfers, wherein the data transfers include:
transferring data between the first cache and the second cache using the first flash interface DMA controller;
transferring data between the first cache and the one or more external host systems using the one or more host interface controllers; and
transferring data between the first cache and the plurality of external rotational disk drives using the first group of IO interface DMA controllers; and
wherein the first flash interface DMA controller includes including a plurality of flash interface engines and a plurality of flash buses, wherein each flash interface engine is coupled to the flash memory devices in the second cache via a corresponding flash bus, wherein the first flash interface DMA controller is configured to perform concurrent flash operations selected from a group comprising:
a first concurrent flash operation comprising a first flash operation associated with a first flash memory device performed concurrently with a second flash operation associated with a second flash memory device, different from the first flash memory device; and
a second concurrent flash operation comprising a first flash operation associated with a first flash memory device performed concurrently with a second flash operation also associated with the first flash memory device.

2. The data storage apparatus of claim 1, further comprising:
a volatile memory buffer configured to:
receive and store data fetched from the second cache; and
forward data stored in the volatile memory buffer to a first external host system of the one or more external host systems, wherein data residing in the second cache, when requested by the first external host system, is transferred from the second cache to the first external host system without being stored in the first cache.

3. The data storage apparatus of claim 1, wherein one of the one or more host interface controllers or one of the first group of IO interface DMA controllers, and the first flash interface DMA controller concurrently execute separate data transfer tasks using separate DMA paths.

4. The data storage apparatus of claim 1,
wherein at least one of the one or more external host systems accesses data comprising one or more logical block units (LBUs), each LBU comprising one or more stripes, said one or more stripes being distributed among one or more rotational disk drives; and
wherein a size of each stripe equals a cache line size, said cache line size being equal to a native flash section size.

5. The data storage apparatus of claim 1, wherein at least one of the one or more external host systems comprises an external host and an external hybrid storage device, said external hybrid storage device comprising:
a third cache for storing data; wherein the third cache comprises volatile memory;
a fourth cache for storing data, the fourth cache being in communication with the third cache; wherein the fourth cache comprises non-volatile memory;

a one or more host interface controllers for communicating between the third cache and the external host; and
a fourth group of IO interface DMA controllers for communicating between the third cache and the one or more host interface controllers; and
a second flash interface DMA controller for communicating between the third cache and the fourth cache;
wherein the third cache and the fourth cache are managed independent of the first and second cache.

6. The data storage apparatus of claim 1,
wherein at least one of the one or more external host systems comprises an external host and a network; and
wherein at least one of the one or more host interface controllers communicates between the first cache and the external host via the network.

7. The data storage apparatus of claim 1, wherein at least one of the first cache the second cache reside in the one or more external host systems.

8. The data storage apparatus of claim 1, wherein the first cache and the second cache both reside in the one or more external host systems.

9. An apparatus for storing data, wherein the apparatus comprises:
A central processing unit (CPU) for executing software application;
a first cache for storing data, the first cache being in communication with the CPU;
wherein the first cache comprises volatile memory;
a second cache for storing data, the second cache being in communication with the first cache; wherein the second cache comprises non-volatile memory;
a first group of IO interface DMA controllers for communicating between the first cache and a plurality of external rotational disk drives; and
a first flash interface DMA controller for communicating between the second cache and the first cache
wherein the first flash interface DMA controller includes including a plurality of flash interface engines and a plurality of flash buses, wherein each flash interface engine is coupled to the flash memory devices in the second cache via a corresponding flash bus, wherein the first flash interface DMA controller is configured to perform concurrent flash operations selected from a group comprising:
a first concurrent flash operation, comprising a first flash operation associated with a first flash memory device, performed concurrently with a second flash operation associated with a second flash memory device, different from the first flash memory device; and
a second concurrent flash operation comprising a first flash operation associated with a first flash memory device performed concurrently with a second flash operation also associated with the first flash memory device.

10. The apparatus of claim 9, wherein at least one of the plurality of external rotational disk drives comprises:
a third cache for storing data, wherein the third cache comprises volatile memory;
a fourth cache for storing data, the fourth cache being in communication with the third cache, wherein the fourth cache comprises non-volatile memory;
a second group of IO interface DMA controllers for communicating between the third cache and the first group of IO interface controllers;
a third group of IO interface DMA controllers for communicating between the third cache and a plurality of external rotational disk drives; and
a second flash interface DMA controller for communicating between the fourth cache and the third cache.

11. The apparatus of claim 9, further comprising:
a computer readable medium including computer-executable instructions for supporting RAID functionality, device level virtualization, and pre-fetching.

12. A method for storing data, the method comprising:
storing data in a first cache, wherein the first cache comprises volatile memory;
storing data in a second cache, wherein the second cache comprises non-volatile memory including a plurality of flash memory devices;
transferring data between the first cache and the second cache using a first flash interface DMA controller;
transferring data between the first cache and one or more external hosts using one or more host interface controllers; and
transferring data between the first cache and any of a plurality of external rotational disk drives using a first group of IO interface DMA controllers;
wherein the first flash interface DMA controller includes including a plurality of flash interface engines and a plurality of flash buses, wherein each flash interface engine is coupled to the flash memory devices in the second cache via a corresponding flash bus, wherein the first flash interface DMA controller is configured to perform concurrent flash operations selected from a group comprising:
a first concurrent flash operation comprising a first flash operation associated with a first flash memory device performed concurrently with a second flash operation associated with a second flash memory device, different from the first flash memory device; and
a second concurrent flash operation comprising a first flash operation associated with a first flash memory device performed concurrently with a second flash operation also associated with the first flash memory device.

13. The method of claim 12, further comprising:
maintaining a cache information table state indicative of a state of the cache line in the first cache, and a second state indicative a state of the cache line in the second cache;
wherein the cache information table includes LBA status bits including a valid/invalid bit and a clean/dirty bit, for each of the plurality of LBAs included in the cache line;
wherein if the data is currently being transferred between the first cache and the host, or between the first cache and the second cache, or between the first cache and the external rotational disk drives, the direction of data is tracked using the cache sub-status, wherein the cache sub-status is determined, at least in part, by the source and destination of the data transfer;
wherein the LBA already in transit, or being transferred between the first cache and the second cache or between the external host and the first cache or between the external rotational disk drives and the first cache, are tracked using in-transit LBA status bits; and
wherein if the data is not in the first cache and not in the second cache and not in-transit, a translation formula is used to determine the location of the data within one of the external rotational disk drives.

14. The method of claim 12 further comprising:
for each transfer of data, determining a next state of the first cache and a next state of the second cache based on a previous state of the first cache, a previous state of the second cache, a source and destination of the data being transferred, and whether any portions of a destination cache line that were invalid before said transfer remain invalid after said transfer.

15. The method of claim 12, further comprising;
responsive to detecting particular conditions, copying data from the first cache to the second cache, wherein the particular conditions include:
   a percentage of used cache lines in the first cache greater than or equal to a particular percentage of total cache lines in the first cache; and
   the storage device being in an idle state, wherein the idle state is indicated by an absence of IO requests from the one or more external host systems; and
wherein if a loss of external power supply is detected, the copying of data from the first cache to the second cache is executed with the aid of an internal back-up power source.

16. The method of claim 12, further comprising:
selecting a cache line for copying from the first cache to the second cache; wherein said selecting includes identifying a first cache line, wherein the first cache line comprises a cache line with a valid full clean state in the first cache and an invalid state in the second cache.

17. The method of claim 12 further comprising;
transferring data from the first cache to the second cache until a usage of the second cache equals or exceeds a particular usage threshold; and
responsive to the usage of the second cache reaching or exceeding the particular usage threshold and further responsive to detecting an idle storage device, wherein the idle storage device is indicated by an interval during which no IO requests are received from the external hosts wherein a length of the interval exceeds a particular length, flushing data to the external rotational disk drives.

18. The method of claim 12, further comprising:
selecting among the candidate cache lines for flushing to the external rotational disk drives;
wherein said candidate cache lines include a cache line containing less recently used data and a cache line containing more recently used data and wherein selecting among the candidate includes selecting the cache line containing less recently used data before selecting the cache line containing more recently used data;
wherein cache lines that form consecutive locations in the rotational disk drive are preferred among the least recently used candidates so that the resulting access is a sequential type; and
wherein cache lines that belong to different rotational disk drives and can be transferred concurrently using different IO interface DMA controllers are transferred simultaneously.

19. The method of claim 12, further comprising;
preventing data loss due to external power source interruption by flushing dirty data in the first cache to the second cache using power provided a backup power source; and
maintaining a copy of the cache information table in non-volatile memory for retrieval of the information for the second cache upon next boot-up of the storage device.

* * * * *